United States Patent
Kurioka et al.

(10) Patent No.: US 11,582,370 B2
(45) Date of Patent: Feb. 14, 2023

(54) IMAGING OPTICAL SYSTEM, AND IMAGING DEVICE AND CAMERA SYSTEM PROVIDED WITH SAME

(71) Applicant: Panasonic Intellectual Property Management Co., Ltd., Osaka (JP)

(72) Inventors: Yoshiaki Kurioka, Osaka (JP); Takahiro Kitada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 713 days.

(21) Appl. No.: 16/437,372

(22) Filed: Jun. 11, 2019

(65) Prior Publication Data

US 2019/0312999 A1 Oct. 10, 2019

Related U.S. Application Data

(63) Continuation of application No. PCT/JP2017/045241, filed on Dec. 18, 2017.

(30) Foreign Application Priority Data

Dec. 28, 2016 (JP) .............................. JP2016-254962

(51) Int. Cl.
*G02B 7/02* (2021.01)
*G03B 17/14* (2021.01)
(Continued)

(52) U.S. Cl.
CPC ........... *H04N 5/2254* (2013.01); *G02B 7/021* (2013.01); *G02B 13/18* (2013.01); *G02B 15/20* (2013.01); *G03B 17/14* (2013.01)

(58) Field of Classification Search
CPC .... G02B 15/144501; G02B 15/144503; G02B 15/144505; G02B 15/144507;
(Continued)

(56) References Cited

U.S. PATENT DOCUMENTS 4,540,249 A 9/1985 Mogami
2002/0176177 A1 11/2002 Takatsuki
(Continued)

FOREIGN PATENT DOCUMENTS

JP 58-5707 1/1983
JP 6-289297 10/1994
(Continued)

OTHER PUBLICATIONS

International Search Report dated Mar. 20, 2018 in International (PCT) Application No. PCT/JP2017/045241.

*Primary Examiner* — Ephrem Z Mebrahtu
(74) *Attorney, Agent, or Firm* — Wenderoth, Lind & Ponack, L.L.P.

(57) ABSTRACT

An imaging optical system includes lens group Gm located on that is closest to an object among lens groups in which a distance between the lens groups changes during zooming, the lens groups having negative power. Lens group Gm includes, in order from the object side toward an image side, lens element LGmF1 having the negative power, lens element LGmF2 having the negative power, both surfaces of lens element LGmF2 having an aspherical shape, and at least two lens elements having power. The present disclosure provides the imaging optical system having good various aberrations such as spherical aberration, astigmatism, and distortion and an imaging device and a camera system that are provided with the imaging optical system.

21 Claims, 21 Drawing Sheets

(51) Int. Cl.
*H04N 5/225* (2006.01)
*G02B 15/20* (2006.01)
*G02B 13/18* (2006.01)

(58) Field of Classification Search
CPC .... G02B 15/144509; G02B 15/144511; G02B 15/144513; G02B 15/144515; G02B 15/1451; G02B 15/1455; G02B 15/1461; G02B 15/1465; G02B 15/24; G02B 15/26; G02B 15/28; G02B 15/22; G02B 15/16; G02B 15/163; G02B 15/177; G02B 15/20; G02B 15/146; G02B 15/142; G02B 15/1421; G02B 15/1425; G02B 15/143; G02B 15/1431; G02B 15/143101; G02B 15/143103; G02B 15/143105; G02B 15/143107; G02B 15/1435; G02B 15/143501; G02B 15/143503; G02B 15/143505; G02B 15/143507; G02B 15/144; G02B 15/1441; G02B 15/144101; G02B 15/144103; G02B 15/144105; G02B 15/144107; G02B 15/144109; G02B 15/144111; G02B 15/144113; G02B 15/144115; G02B 15/1445; G02B 15/145; G02B 15/14

See application file for complete search history.

(56) References Cited

U.S. PATENT DOCUMENTS

| | | | |
|---|---|---|---|
| 2003/0179466 A1 | 9/2003 | Takatsuki | |
| 2005/0200967 A1 | 9/2005 | Yamasaki et al. | |
| 2006/0061872 A1 | 3/2006 | Yamasaki | |
| 2006/0187556 A1* | 8/2006 | Inoko | G02B 15/145531 359/680 |
| 2009/0116120 A1 | 5/2009 | Saruwatari | |
| 2010/0290133 A1 | 11/2010 | Sano et al. | |
| 2011/0002046 A1 | 1/2011 | Wada et al. | |
| 2011/0032606 A1 | 2/2011 | Imaoka | |
| 2014/0029109 A1 | 1/2014 | Maetaki | |
| 2014/0185144 A1* | 7/2014 | Kubota | G02B 13/16 359/680 |
| 2015/0185448 A1 | 7/2015 | Kawamura | |
| 2015/0226946 A1* | 8/2015 | Miyazaki | G02B 15/1465 359/680 |
| 2016/0109692 A1 | 4/2016 | Shibata | |
| 2016/0124181 A1* | 5/2016 | Noda | G02B 13/009 359/680 |
| 2016/0124200 A1* | 5/2016 | Obikane | G02B 15/20 348/240.3 |
| 2016/0282590 A1* | 9/2016 | Saito | G02B 13/04 |
| 2018/0196241 A1* | 7/2018 | Shibayama | G02B 27/0037 |

FOREIGN PATENT DOCUMENTS

| | | |
|---|---|---|
| JP | 2002-277737 | 9/2002 |
| JP | 2005-257896 | 9/2005 |
| JP | 2006-084971 | 3/2006 |
| JP | 2007-240731 | 9/2007 |
| JP | 2007-304268 | 11/2007 |
| JP | 2008-275713 | 11/2008 |
| JP | 2009-115958 | 5/2009 |
| JP | 2010-266577 | 11/2010 |
| JP | 2011-013469 | 1/2011 |
| JP | 2011-028144 | 2/2011 |
| JP | 2011-053663 | 3/2011 |
| JP | 2011-180602 | 9/2011 |
| JP | 2014-26211 | 2/2014 |
| JP | 2014-071405 | 4/2014 |
| JP | 2015-99175 | 5/2015 |
| JP | 2015-166851 | 9/2015 |
| JP | 5798255 | 10/2015 |
| JP | 5861971 | 2/2016 |
| JP | 2016-71179 | 5/2016 |

* cited by examiner

IMAGING OPTICAL SYSTEM, AND IMAGING DEVICE AND CAMERA SYSTEM PROVIDED WITH SAME

TECHNICAL FIELD

The present disclosure relates to an imaging optical system having good various aberrations, and an imaging device and a camera system which are provided with the imaging optical system.

BACKGROUND ART

PLT 1 discloses a zoom lens including a first lens group having positive refractive power, a second lens group having negative refractive power, a third lens group having positive refractive power, a fourth lens group having negative refractive power, and a fifth lens group having positive refractive power in order from an object side toward an image side. In the zoom lens, the fifth lens group is fixed, and the first lens group, the second lens group, the third lens group, and the fourth lens group are moved in an optical axis direction, thereby changing magnification.

CITATION LIST

Patent Literature

PTL 1: Unexamined Japanese Patent Publication No. 2016-71179

SUMMARY OF THE INVENTION

According to one aspect of the present disclosure, in an imaging optical system, lens group Gm located on that is closest to an object among lens groups in which a distance between lens groups changes during zooming, the lens groups having negative power, includes, in order from the object side toward an image side: lens element LGmF1 having the negative power; lens element LGmF2 having the negative power, both surfaces of lens element LGmF2 having an aspherical shape; and at least two lens elements having power.

According to another aspect of the present disclosure, in an imaging optical system, lens group Gm located on that is closest to an object among lens groups having negative power includes, in order from the object side toward an image side: lens element LGmF1 having the negative power; lens element LGmF2 having the negative power, both surfaces of lens element LGmF2 having an aspherical shape; and at least two lens elements having power. Lens element LGmF1 is a lens element having the strongest power among the lens elements located on the object side with respect to an aperture diaphragm.

The present disclosure can provide the imaging optical system having good various aberrations, and the imaging device and the camera system that are provided with the imaging optical system.

DESCRIPTION OF EMBODIMENTS

Figure 1:
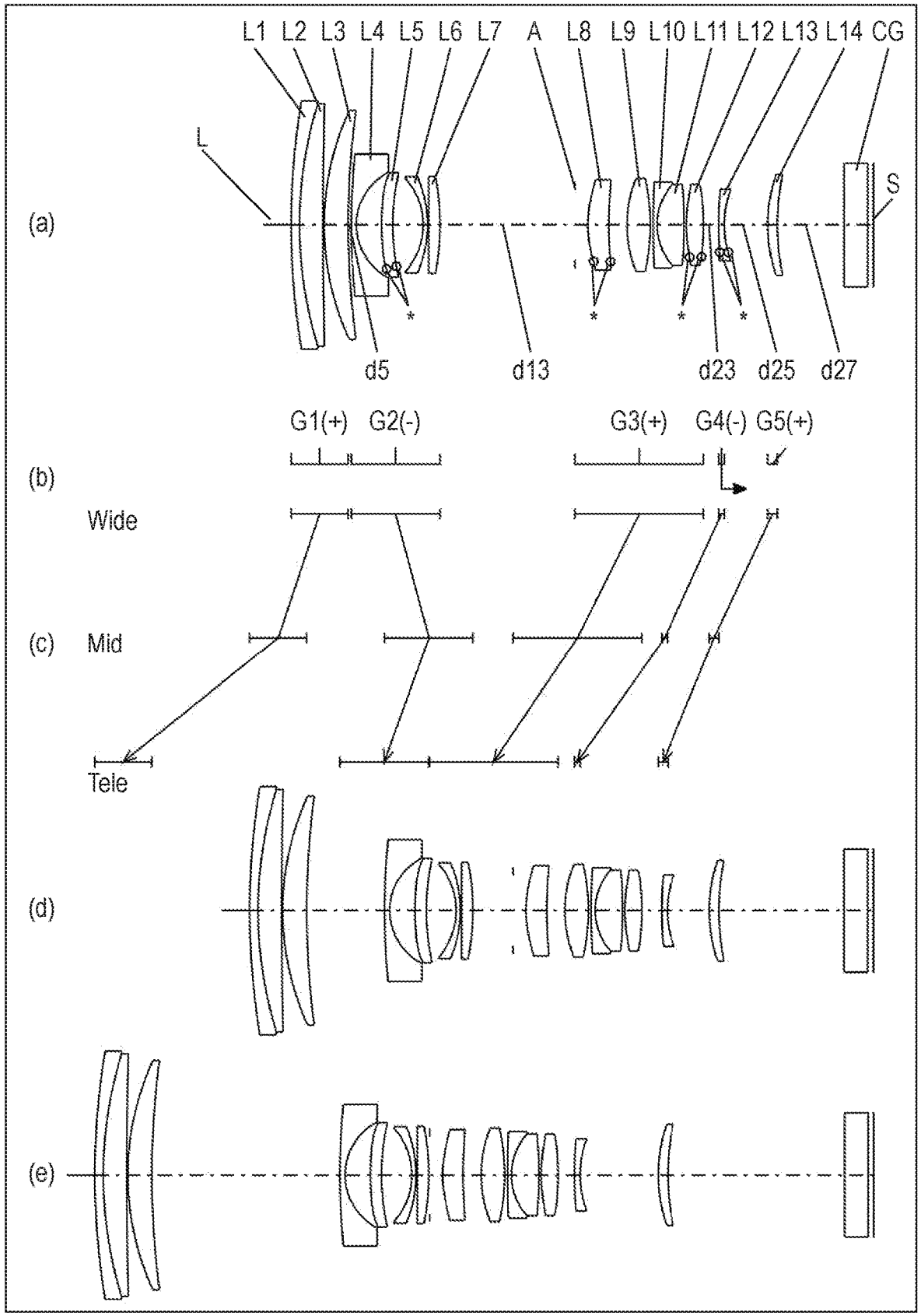
FIG. 1 is a view illustrating lens arrangement in an infinity focusing state of an imaging optical system according to a first exemplary embodiment.
Figure 2:
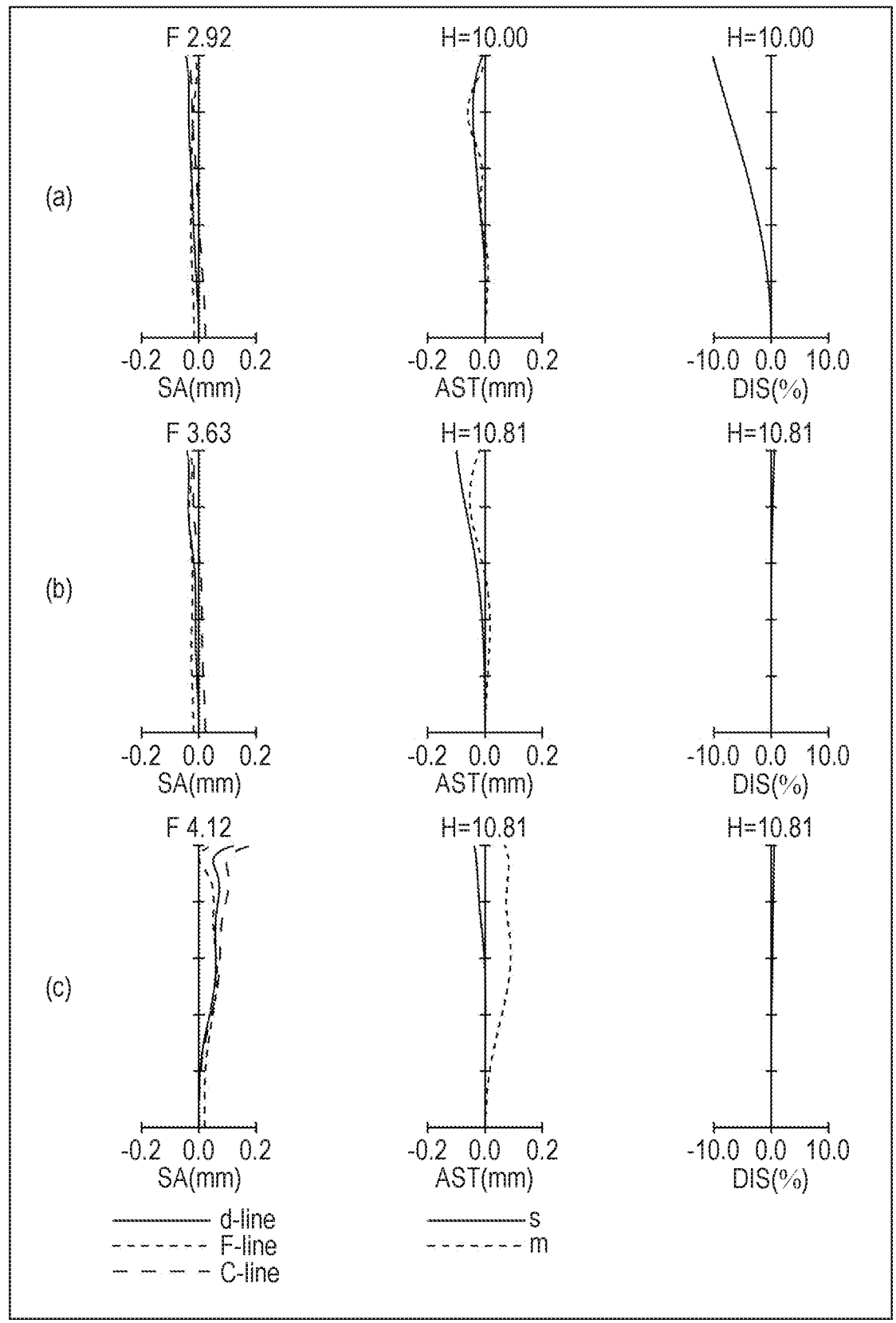
FIG. 2 is a view illustrating a longitudinal aberration in the infinity focusing state of an imaging optical system according to a first numerical example of the first exemplary embodiment.
Figure 3:
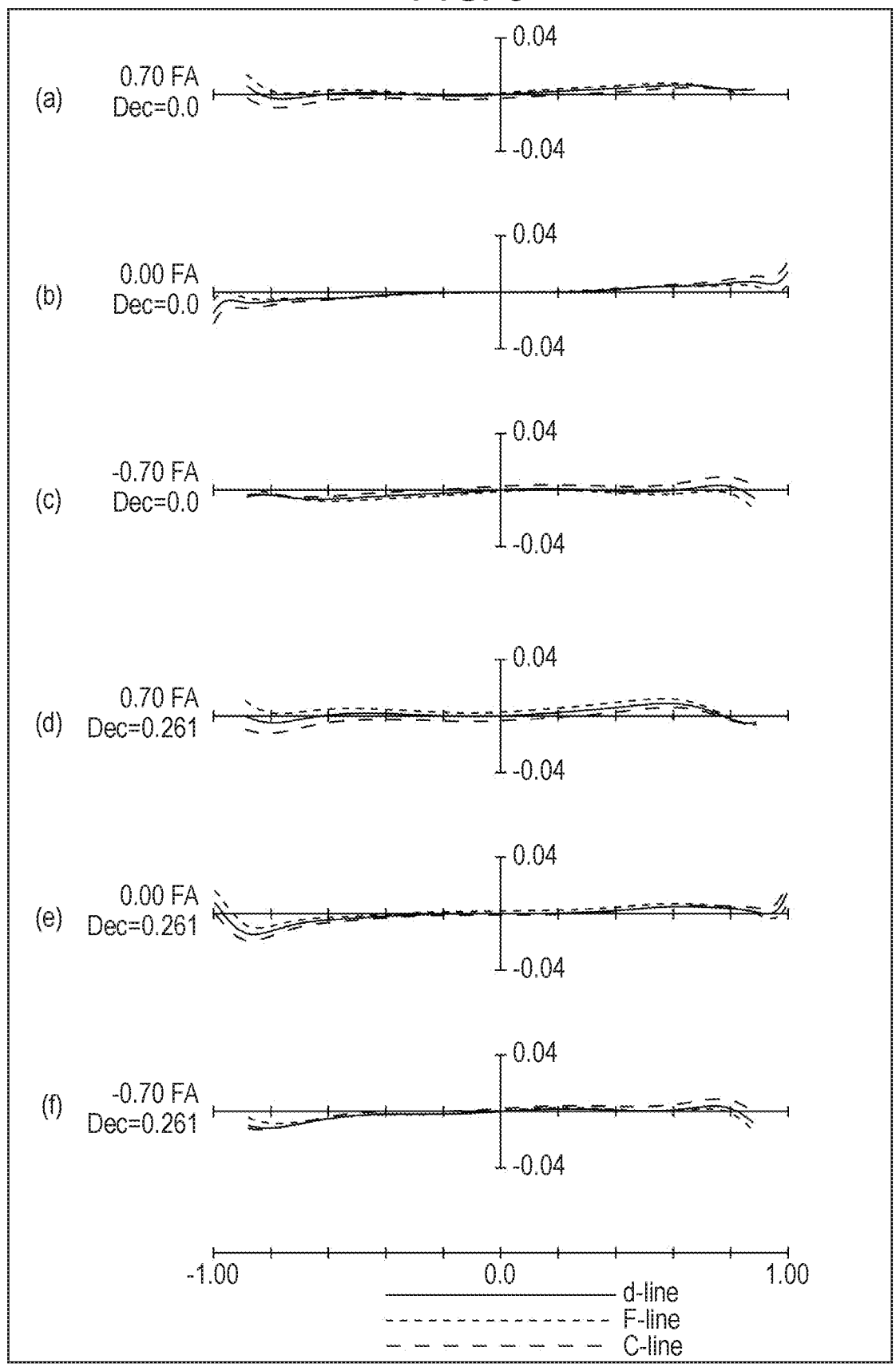
FIG. 3 is a view illustrating a lateral aberration in a basic state in which image blur is not corrected and an image blur correction state at a telephoto end of the imaging optical system of the first numerical example.

Hereinafter, exemplary embodiments will be described in detail with reference to the drawings. However, descriptions in more detail than necessary may be omitted. For example, a detailed description of a matter which is already well-known and a repeated description for a substantially identical configuration may be omitted. This is to avoid unnecessarily redundancy in the following description, and to facilitate understanding by those skilled in the art.

The accompanying drawings and the following description are provided to help those skilled in the art to sufficiently understand the present disclosure, and are not intended to limit the subject matter of the claims.

First to Sixth Exemplary Embodiments

Imaging optical systems according to first to sixth exemplary embodiments will be described below with reference to the drawings.

The imaging optical system of each exemplary embodiment includes first lens group G1, second lens group G2, third lens group G3, and fourth lens group G4, fifth lens group G5, and sixth lens group G6 that constitute a succeeding lens group, for example.

FIGS. 1, 4, 7, 10, 13, 16 are views illustrating lens arrangement of the imaging optical system in an infinity focusing state.

Parts (a) of FIGS. 1, 4, 7, 10, 13, 16 illustrate the lens arrangement at a wide-angle end (shortest focal distance state: focal distance fw). Parts (d) of FIGS. 1, 4, 7, 10, 13, 16 illustrate the lens arrangement at an intermediate position (intermediate focal distance state: focal distance fM=/(fw*fT)). Parts (e) of FIGS. 1, 4, 7, 10, 13, 16 illustrate the lens arrangement at a telephoto end (longest focal distance state: focal distance fT). An aspect ratio is identical in parts (a), (d), (e) of FIGS. 1, 4, 7, 10, 13, 16.

A polygonal-line arrow illustrated in parts (c) of FIGS. 1, 4, 7, 10, 13, 16 indicates positions of each lens group in states of a wide-angle end (Wide), an intermediate position (Mid), and a telephoto end (Tele), which are connected from top to bottom. The arrow simply connects by the line the wide-angle end and the intermediate position, and the intermediate position and the telephoto end, but does not indicate actual movement of each lens group.

In parts (b) of FIGS. 1, 4, 7, 10, 13, 16, the lens groups are designated by numerals G1 to G6, corresponding to the positions of the lens groups illustrated in part (a).

An asterisk * attached to a surface of a specific lens element in parts (a) of FIGS. 1, 4, 7, 10, 13, 16 indicates that the surface is an aspherical surface.

Symbols (+) and (−) attached to the numeral of each lens group (G1 to G6) in parts (b) of FIGS. 1, 4, 7, 10, 13, 16 correspond to power of each lens group. That is, the symbol (+) indicates positive power, and the symbol (−) indicates negative power. An arrow added to the lens group indicated in fourth lens group G4 of the first to fifth exemplary embodiments and third lens group G3 of the sixth exemplary embodiment conveniently indicates a movement direction of the lens group during focusing from an infinity focusing state to a proximity focusing state. The moving lens element, the lens group, and the moving direction thereof will specifically be described in detail below in each exemplary embodiment.

In parts (a), (d), (e) of FIGS. 1, 4, 7, 10, 13, 16, a straight line drawn at a rightmost side indicates a position of image plane S (an object-side surface of the imaging device). Consequently, the left side of the drawings corresponds to the object side. Parallel plate CG such as a low-pass filter and a cover glass is disposed between image plane S and the last-stage lens group facing image plane S.

First Exemplary Embodiment

An imaging optical system according to a first exemplary embodiment will be described below with reference to FIG. 1.

FIG. 1 illustrates the lens arrangement of the imaging optical system of the first exemplary embodiment and operation of the imaging optical system.

As illustrated in FIG. 1, the imaging optical system of the first exemplary embodiment includes, in order from an object side toward an image side, first lens group G1 having the positive power, second lens group G2 having the negative power, aperture diaphragm A, third lens group G3 having the positive power, fourth lens group G4 having the negative power, fifth lens group G5 having the positive power, and parallel plate CG. Fourth lens group G4 and fifth lens group G5 constitute the succeeding lens group. Second lens group G2 is exemplified by lens group Gm. Third lens group G3 is exemplified by lens group Gp. Fourth lens group G4 is exemplified by lens group Gf.

First lens group G1 includes first lens element L1 having the negative power, second lens element L2 having the positive power, and third lens element L3 having the positive power, in order from the object side toward the image side. First lens element L1 and second lens element L2 constitute a cemented lens that is bonded using an adhesive such as an ultraviolet curing resin.

Second lens group G2 includes fourth lens element L4 having the negative power, fifth lens element L5 having the negative power, sixth lens element L6 having the negative power, and seventh lens element L7 having the positive power, in order from the object side toward the image side. Fourth lens element L4 is exemplified by lens element LGmF1. Fifth lens element L5 is exemplified by lens element LGmF2 or lens element LGmR3. Sixth lens element L6 is exemplified by lens element LGmR2. Seventh lens element L7 is exemplified by lens element LGmR1.

Third lens group G3 includes eighth lens element L8 having the positive power, ninth lens element L9 having the positive power, tenth lens element L10 having the negative power, eleventh lens element L11 having the positive power, and twelfth lens element L12 having the positive power, in order from the object side toward the image side. Tenth lens element L10 and eleventh lens element L11 constitute a cemented lens that is bonded using an adhesive such as an ultraviolet curing resin. Eighth lens element L8 is exemplified by lens element LGpF1. Ninth lens element L9 is exemplified by lens element LGpF2. Tenth lens element L10 is exemplified by lens element LGpR3. Eleventh lens element L11 is exemplified by lens element LGpR2. Twelfth lens element L12 is exemplified by lens element LGpR1.

Fourth lens group G4 includes thirteenth lens element L13 having the negative power.

Fifth lens group G5 includes fourteenth lens element L14 having the positive power.

Aperture diaphragm A is disposed between seventh lens element L7 of second lens group G2 and eighth lens element L8 of third lens group G3.

The lens element constituting each lens group of the imaging optical system of the first exemplary embodiment will be described below.

First, each lens element in first lens group G1 will be described.

First lens element L1 is a meniscus lens having a convex surface on the object side. Second lens element L2 is a meniscus lens having the convex surface on the object side. Third lens element L3 is a meniscus lens having the convex surface on the object side.

Then, each lens element in second lens group G2 will be described.

Fourth lens element L4 is a meniscus lens having the convex surface on the object side. Fifth lens element L5 is a meniscus lens having the convex surface on the object side. Both surfaces of fifth lens element L5 are aspherical surfaces. Sixth lens element L6 is a meniscus lens having a concave surface on the object side. Seventh lens element L7 is a biconvex lens.

Then, each lens element in third lens group G3 will be described.

Eighth lens element L8 is a meniscus lens having the convex surface on the object side. Both surfaces of eighth lens element L8 are aspherical surfaces. Ninth lens element L9 is a biconvex lens. Tenth lens element L10 is a meniscus lens having the convex surface on the object side. Eleventh lens element L11 is a biconvex lens. Twelfth lens element L12 is a biconvex lens. Both surfaces of twelfth lens element L12 are aspherical surfaces.

Then, each lens element in fourth lens group G4 will be described.

Thirteenth lens element L13 is a meniscus lens having the convex surface on the object side. Both surfaces of thirteenth lens element L13 are aspherical surfaces.

Then, each lens element in fifth lens group G5 will be described.

Fourteenth lens element L14 is a meniscus lens having the convex surface on the object side.

The imaging optical system of the first exemplary embodiment having the above configuration includes five lens groups.

Each lens group of the imaging optical system of the first exemplary embodiment moves as indicated by the arrow in part (c) of FIG. 1 during zooming from the wide-angle end (Wide) to the telephoto end (Tele) in imaging.

Specifically first lens group G1 moves onto the object side, and second lens group G2 moves onto the side of image plane S so as to draw a convex locus. Aperture diaphragm A and third lens group G3 move integrally onto the object side. Fourth lens group G4 moves onto the object side, and fifth lens group G5 moves onto the object side. During the zooming, this movement increases a distance between first lens group G1 and second lens group G2, and decreases a distance between second lens group G2 and third lens group G3. The distance between third lens group G3 and fourth lens group G4 increases from the wide-angle end to the intermediate position, and decreases from the intermediate position to the telephoto end. The distance between fourth lens group G4 and fifth lens group G5 decreases from the wide-angle end to the intermediate position, and increases from the intermediate position to the telephoto end. The distance between fifth lens group G5 and image plane S increases. During the zooming from the wide-angle end to the telephoto end, an open aperture diameter of aperture diaphragm A is identical from the wide-angle end to the intermediate position, and increases at the telephoto end as compared with the intermediate position.

As described above, each lens group moves along optical axis L as indicated by the arrow in part (c) of FIG. 1. As illustrated in parts (a), (d), (e) of FIG. 1, each lens group is disposed at the wide-angle end, the intermediate position, and the telephoto end.

That is, in the imaging optical system of the first exemplary embodiment, all the lens groups move relatively along optical axis L. In other words, a distance between lens groups changes. Consequently, the zooming operation from the wide-angle end to the telephoto end is performed.

During the focusing from the infinity focusing state to the proximity focusing state, fourth lens group G4 constituting the focusing lens group moves onto the image side along optical axis L as indicated by the arrow in part (b) of FIG. 1.

Twelfth lens element L12 of third lens group G3 moves perpendicularly to optical axis L. This enables optical correction of image blur. Specifically, the movement of twelfth lens element L12 in a direction perpendicular to optical axis L corrects image point movement caused by a vibration of the whole imaging optical system. Resultantly, the image blur due to camera shake or vibration can optically be corrected. Details of the image blur correction will be described later with reference to FIG. 21.

Second Exemplary Embodiment

An imaging optical system according to a second exemplary embodiment will be described below with reference to FIG. 4.

Figure 4:
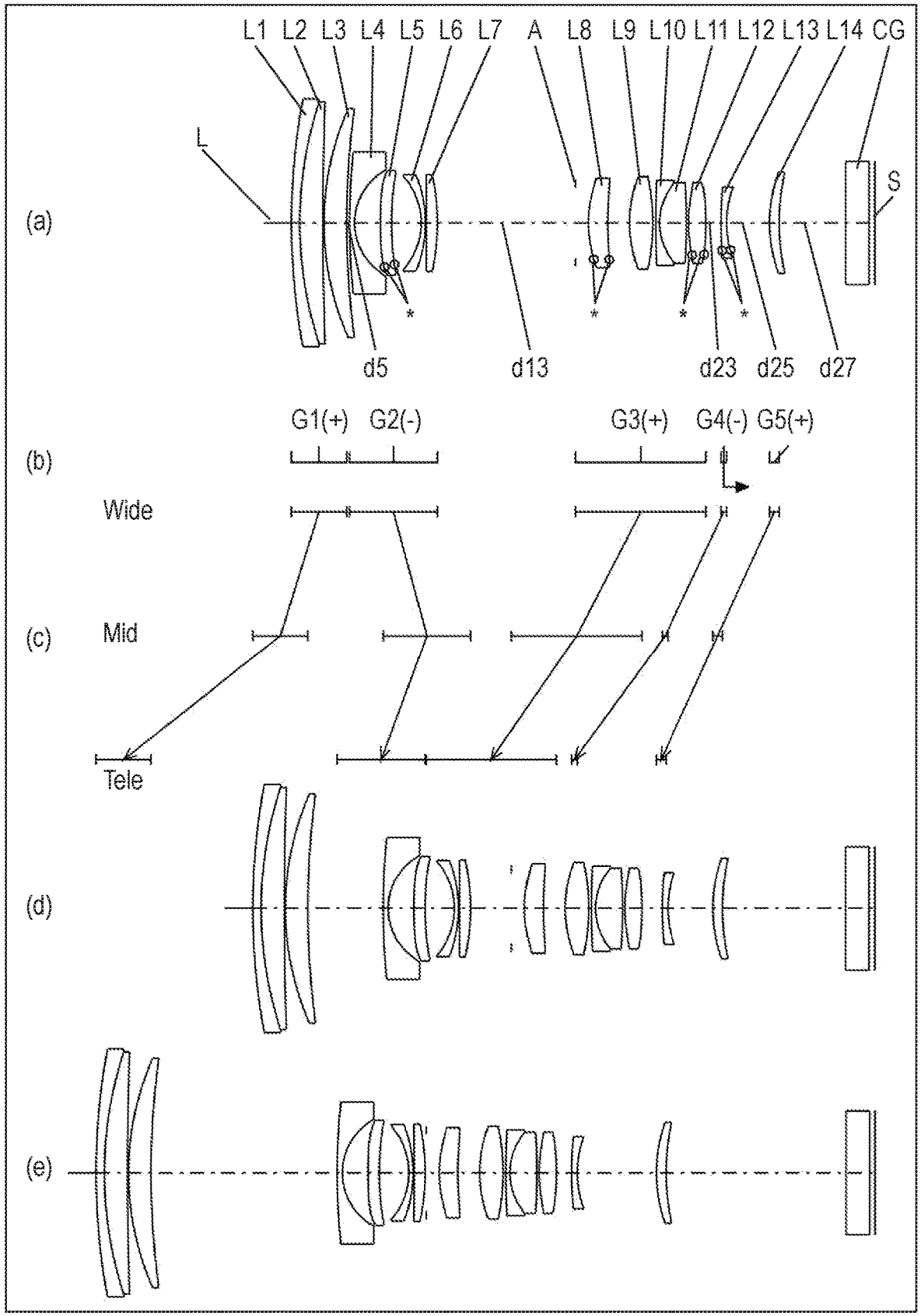
FIG. 4 is a view illustrating lens arrangement in an infinity focusing state of an imaging optical system according to a second exemplary embodiment.
Figure 5:
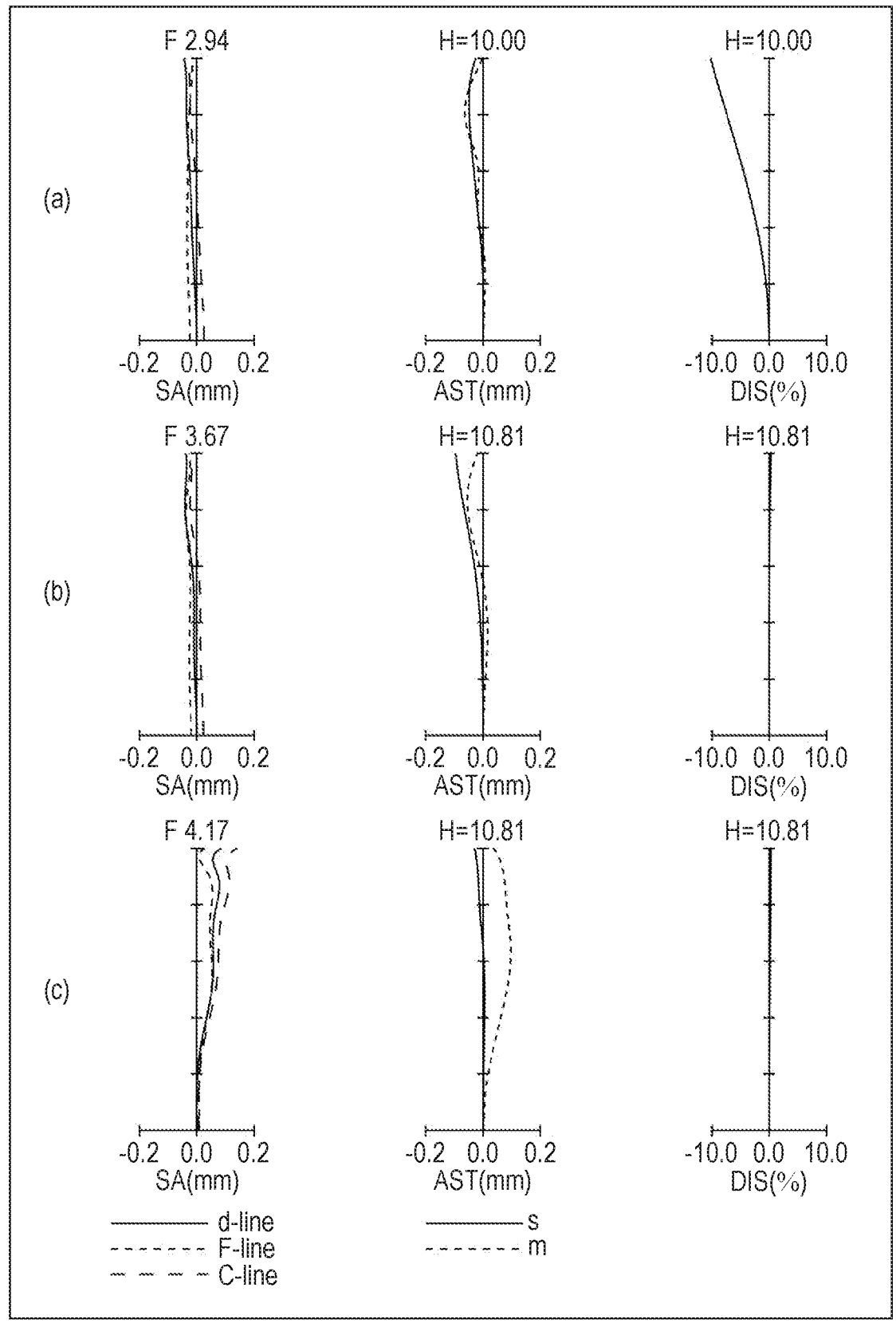
FIG. 5 is a view illustrating a longitudinal aberration in the infinity focusing state of an imaging optical system according to a second numerical example of the second exemplary embodiment.
Figure 6:
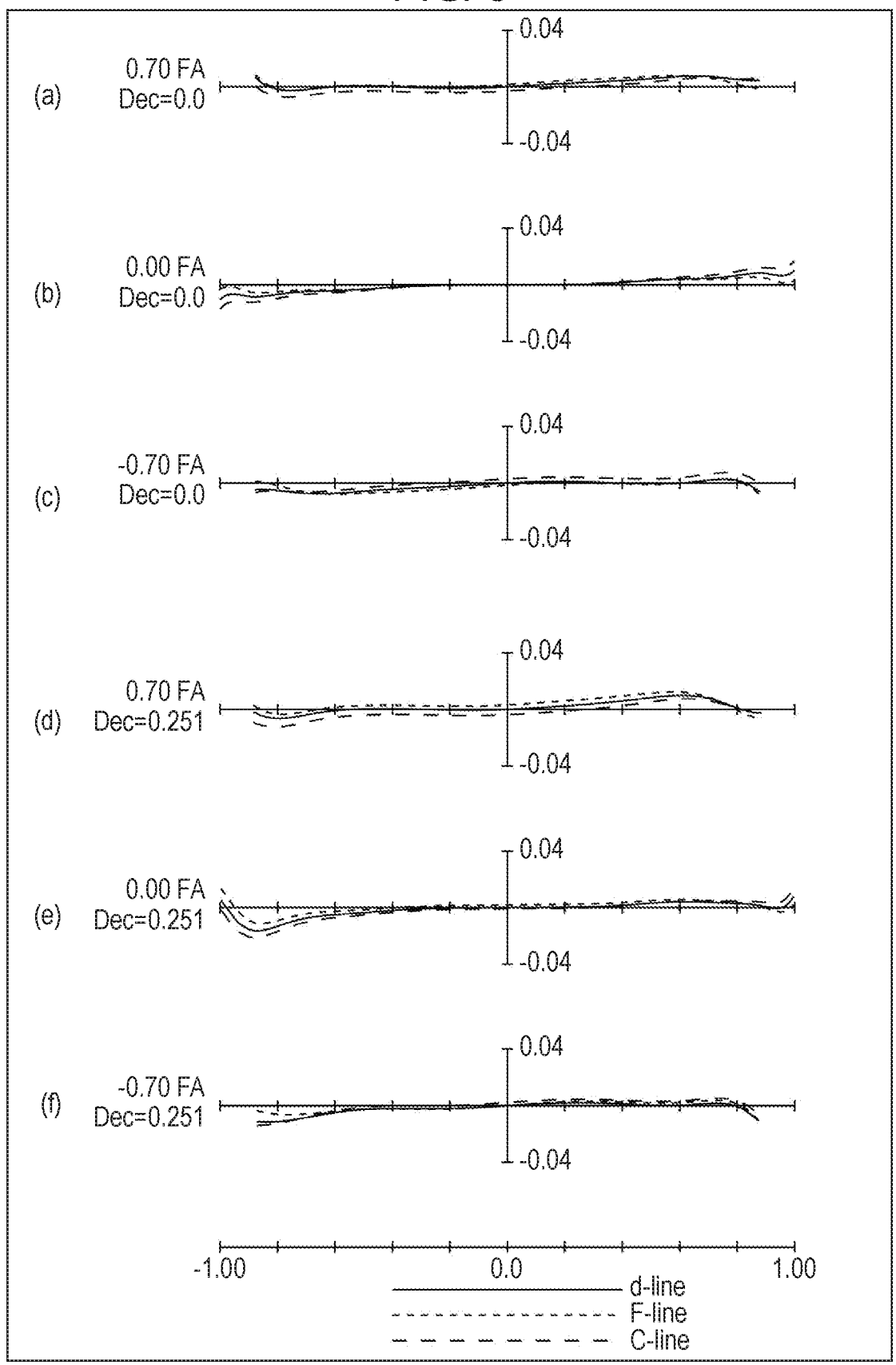
FIG. 6 is a view illustrating a lateral aberration in a basic state in which image blur is not corrected and an image blur correction state at a telephoto end of the imaging optical system of the second numerical example.

FIG. 4 illustrates the lens arrangement of the imaging optical system according to the second exemplary embodiment and operation of the imaging optical system.

As illustrated in FIG. 4, the imaging optical system of the second exemplary embodiment includes, in order from an object side toward an image side, first lens group G1 having positive power, second lens group G2 having negative power, aperture diaphragm A, third lens group G3 having the positive power, fourth lens group G4 having the negative power, fifth lens group G5 having the positive power, and parallel plate CG. Fourth lens group G4 and fifth lens group G5 constitute the succeeding lens group. Second lens group G2 is exemplified by lens group Gm. Third lens group G3 is exemplified by lens group Gp. Fourth lens group G4 is exemplified by lens group Gf.

First lens group G1 includes first lens element L1 having the negative power, second lens element L2 having the positive power, and third lens element L3 having the positive power, in order from the object side toward the image side. First lens element L1 and second lens element L2 constitute a cemented lens that is bonded using an adhesive such as an ultraviolet curing resin.

Second lens group G2 includes fourth lens element IA having the negative power, fifth lens element L5 having the negative power, sixth lens element L6 having the negative power, and seventh lens element L7 having the positive power, in order from the object side toward the image side. Fourth lens element L4 is exemplified by lens element LGmF1. Fifth lens element L5 is exemplified by lens element LGmF2 or lens element LGmR3. Sixth lens element L6 is exemplified by lens element LGmR2. Seventh lens element L7 is exemplified by lens element LGmR1.

Third lens group G3 includes eighth lens element L8 having the positive power, ninth lens element L9 having the positive power, tenth lens element L10 having the negative power, eleventh lens element L11 having the positive power, and twelfth lens element L12 having the positive power, in order from the object side toward the image side. Tenth lens element L10 and eleventh lens element L11 constitute a cemented lens that is bonded using an adhesive such as an ultraviolet curing resin. Eighth lens element L8 is exemplified by lens element LGpF1. Ninth lens element L9 is exemplified by lens element LGpF2. Tenth lens element L10 is exemplified by lens element LGpR3. Eleventh lens element L11 is exemplified by lens element LGpR2. Twelfth lens element L12 is exemplified by lens element LGpR1.

Fourth lens group G4 includes thirteenth lens element L13 having the negative power.

Fifth lens group G5 includes fourteenth lens element L14 having the positive power.

Aperture diaphragm A is disposed between seventh lens element L7 of second lens group G2 and eighth lens element L8 of third lens group G3.

The lens element constituting each lens group of the imaging optical system of the second exemplary embodiment will be described below.

First, each lens element in first lens group G1 will be described.

First lens element L1 is a meniscus lens having a convex surface on the object side. Second lens element L2 is a meniscus lens having the convex surface on the object side. Third lens element L3 is a meniscus lens having the convex surface on the object side.

Each lens element in second lens group G2 will be described below.

Fourth lens element IA is a meniscus lens having the convex surface on the object side. Fifth lens element L5 is a meniscus lens having the convex surface on the object side. Both surfaces of fifth lens element L5 are aspherical surfaces. Sixth lens element L6 is a meniscus lens having a concave surface on the object side. Seventh lens element L7 is a meniscus lens having a concave surface on the object side.

Then, each lens element in third lens group G3 will be described.

Eighth lens element L8 is a meniscus lens having the convex surface on the object side. Both surfaces of eighth lens element L8 are aspherical surfaces. Ninth lens element L9 is a biconvex lens. Tenth lens element L10 is a meniscus lens having the convex surface on the object side. Eleventh lens element L11 is a biconvex lens. Twelfth lens element L12 is a biconvex lens. Both surfaces of twelfth lens element L12 are aspherical surfaces.

Then, each lens element in fourth lens group G4 will be described.

Thirteenth lens element L13 is a meniscus lens having the convex surface on the object side. Both surfaces of thirteenth lens element L13 are aspherical surfaces.

Then, each lens element in fifth lens group G5 will be described.

Fourteenth lens element L14 is a meniscus lens having the convex surface on the object side.

As described above, the imaging optical system of the second exemplary embodiment having the above configuration includes five lens groups.

Each lens group of the imaging optical system of the second exemplary embodiment moves as indicated by the arrow in part (c) of FIG. 4 during the zooming from the wide-angle end to the telephoto end in imaging.

Specifically, first lens group G1 moves onto the object side, and second lens group G2 moves onto the side of the image surface so as to draw a convex locus. Aperture diaphragm A and third lens group G3 move integrally onto the object side. Fourth lens group G4 moves onto the object side, and fifth lens group G5 moves onto the object side. During the zooming, this movement increases a distance between first lens group G1 and second lens group G2, and decreases a distance between second lens group G2 and third lens group G3. The distance between third lens group G3 and fourth lens group G4 increases from the wide-angle end to the intermediate position, and decreases from the intermediate position to the telephoto end. The distance between fourth lens group G4 and fifth lens group G5 increases. The distance between fifth lens group G5 and image plane S increases. During the zooming from the wide-angle end to the telephoto end, the open aperture diameter of aperture diaphragm A is identical from the wide-angle end to the intermediate position, and increases at the telephoto end compared with the intermediate position.

As described above, each lens group moves along optical axis L as indicated by the arrow in part (c) of FIG. 4. As illustrated in parts (a), (d), (e) of FIG. 4, each lens group is disposed at the wide-angle end, the intermediate position, and the telephoto end.

That is, in the imaging optical system of the second exemplary embodiment, all the lens groups move relatively along optical axis L. In other words, the distance between lens groups changes. Consequently the zooming operation from the wide-angle end to the telephoto end is performed.

During the focusing from the infinity focusing state to the proximity focusing state, fourth lens group G4 constituting the focusing lens group moves onto the image side along optical axis L as indicated by the arrow in part (b) of FIG. 4.

Twelfth lens element L12 of third lens group G3 moves in the direction perpendicular to optical axis L. This enables optical correction of image blur. Specifically, the movement of twelfth lens element L12 corrects the image point movement caused by the vibration of the whole imaging optical system, and resultantly the image blue due to camera shake or vibration can optically be corrected.

Third Exemplary Embodiment

An imaging optical system according to a third exemplary embodiment will be described below with reference to FIG. 7.

Figure 7:
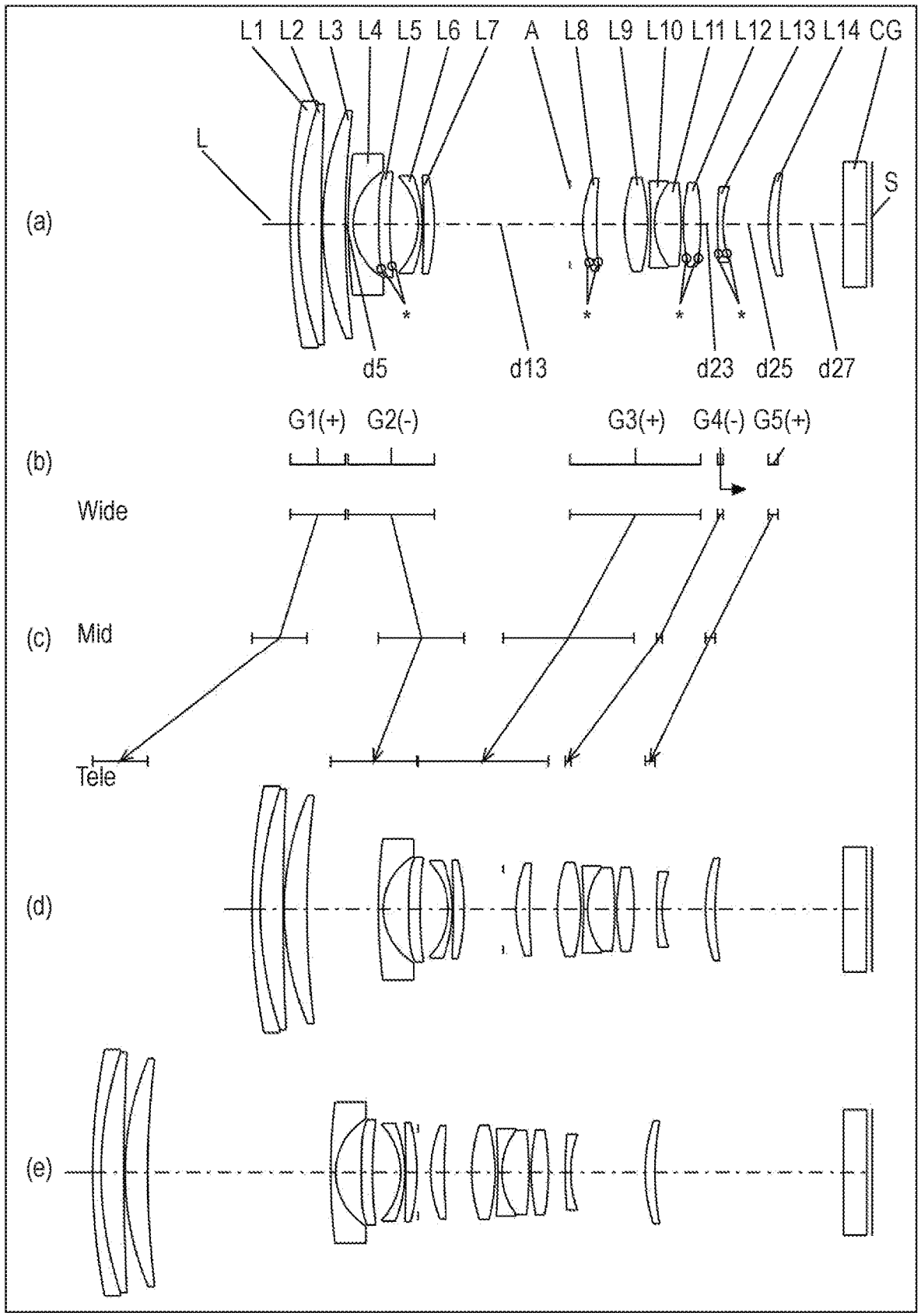
FIG. 7 is a view illustrating lens arrangement in an infinity focusing state of an imaging optical system according to a third exemplary embodiment.
Figure 8:
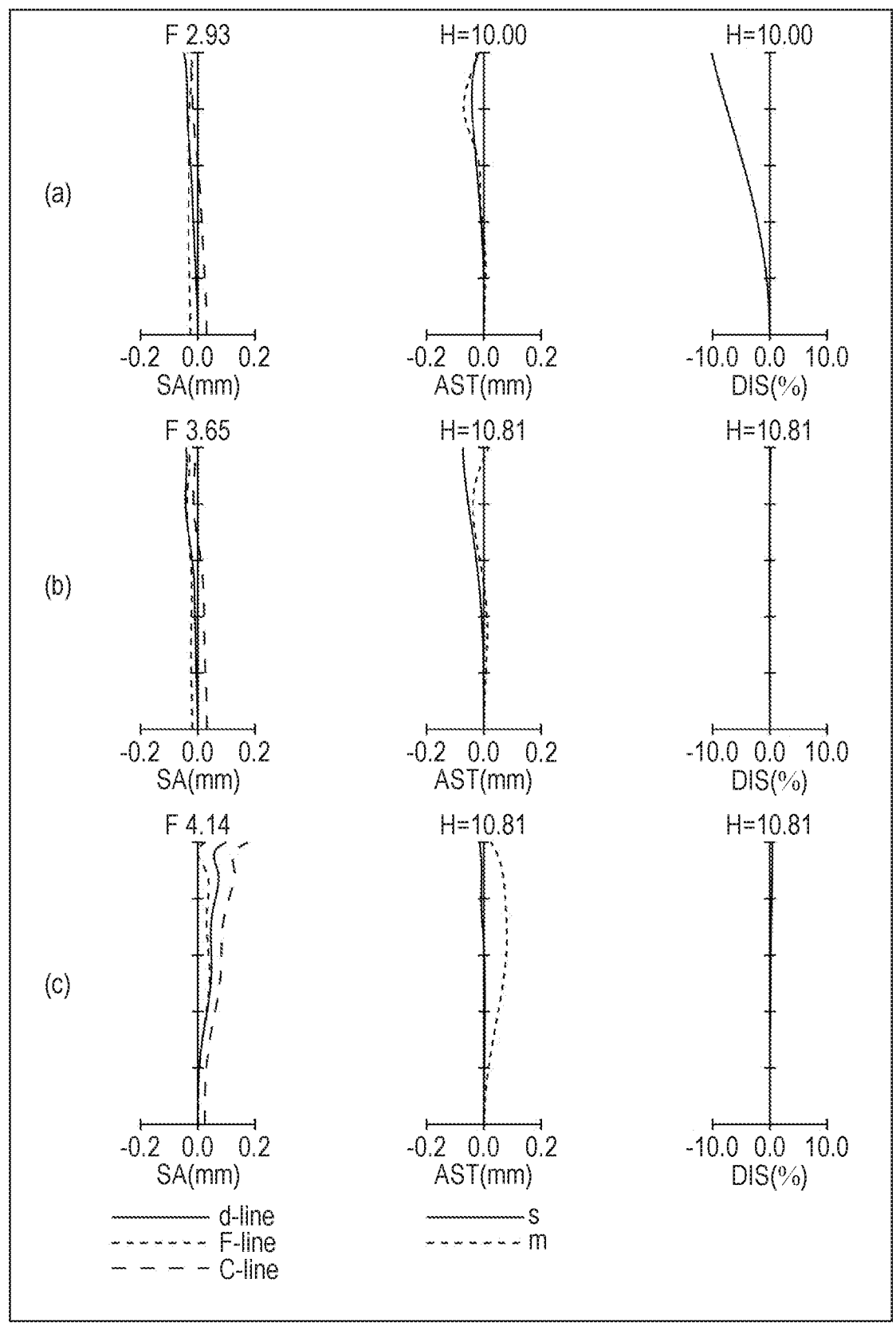
FIG. 8 is a view illustrating a longitudinal aberration in the infinity focusing state of an imaging optical system according to a third numerical example of the third exemplary embodiment.
Figure 9:
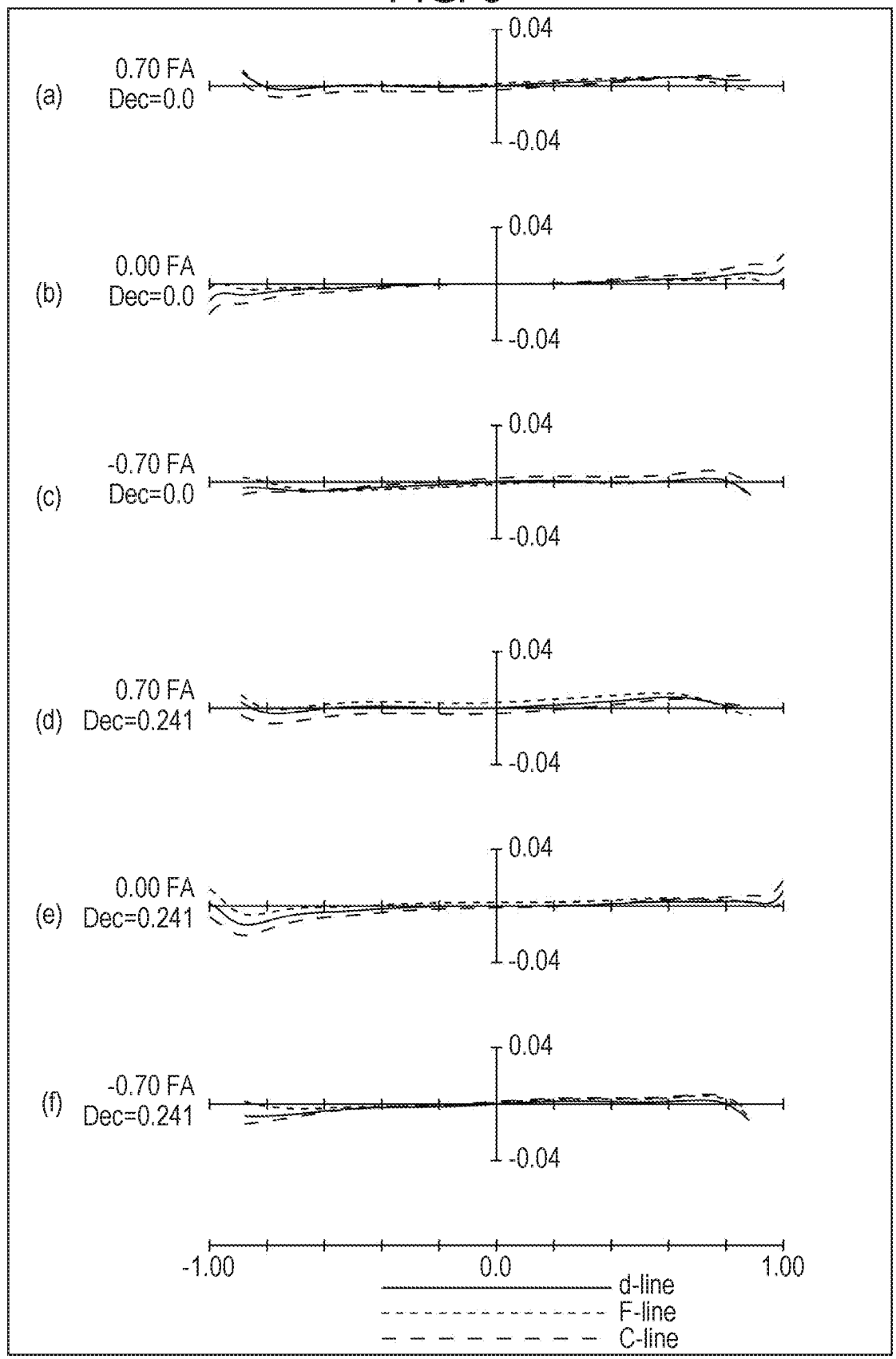
FIG. 9 is a view illustrating a lateral aberration in a basic state in which image blur is not corrected and an image blur correction state at a telephoto end of the imaging optical system of the third numerical example.

FIG. 7 illustrates the lens arrangement of the imaging optical system of the third exemplary embodiment and operation of the imaging optical system.

As illustrated in FIG. 7, the imaging optical system of the third exemplary embodiment includes, in order from the object side toward the image side, first lens group G1 having positive power, second lens group G2 having negative power, aperture diaphragm A, third lens group G3 having the positive power, fourth lens group G4 having the negative power, fifth lens group G5 having the positive power, and parallel plate CG. Fourth lens group G4 and fifth lens group G5 constitute the succeeding lens group. Second lens group G2 is exemplified by lens group Gm. Third lens group G3 is exemplified by lens group Gp. Fourth lens group G4 is exemplified by lens group Gf.

First lens group G1 includes first lens element L1 having the negative power, second lens element L2 having the positive power, and third lens element L3 having the positive power, in order from the object side toward the image side.

First lens element L1 and second lens element L2 constitute a cemented lens that is bonded using an adhesive such as an ultraviolet curing resin.

Second lens group G2 includes fourth lens element L4 having the negative power, fifth lens element L5 having the negative power, sixth lens element L6 having the negative power, and seventh lens element L7 having the positive power, in order from the object side toward the image side. Fourth lens element L4 is exemplified by lens element LGmF1. Fifth lens element L5 is exemplified by lens element LGmF2 or lens element LGmR3. Sixth lens element L6 is exemplified by lens element LGmR2. Seventh lens element L7 is exemplified by lens element LGmR1.

Third lens group G3 includes eighth lens element L8 having the positive power, ninth lens element L9 having the positive power, tenth lens element L10 having the negative power, eleventh lens element L11 having the positive power, and twelfth lens element L12 having the positive power, in order from the object side toward the image side. Tenth lens element L10 and eleventh lens element L11 constitute a cemented lens that is bonded using an adhesive such as an ultraviolet curing resin. Eighth lens element L8 is exemplified by lens element LGpF1. Ninth lens element L9 is exemplified by lens element LGpF2. Tenth lens element L10 is exemplified by lens element LGpR3. Eleventh lens element L11 is exemplified by lens element LGpR2. Twelfth lens element L12 is exemplified by lens element LGpR1.

Fourth lens group G4 includes thirteenth lens element L13 having the negative power.

Fifth lens group G5 includes fourteenth lens element L14 having the positive power.

Aperture diaphragm A is disposed between seventh lens element L7 of second lens group G2 and eighth lens element L8 of third lens group G3.

The lens element constituting each lens group of the imaging optical system of the third exemplary embodiment will be described below.

First, each lens element in first lens group G1 will be described.

First lens element L1 is a meniscus lens having a convex surface on the object side. Second lens element L2 is a meniscus lens having the convex surface on the object side. Third lens element L3 is a meniscus lens having the convex surface on the object side.

Then, each lens element in second lens group G2 will be described.

Fourth lens element IA is a meniscus lens having the convex surface on the object side. Fifth lens element L5 is a meniscus lens having the convex surface on the object side. Both surfaces of fifth lens element L5 are aspherical surfaces. Sixth lens element L6 is a meniscus lens having a concave surface on the object side. Seventh lens element L7 is a meniscus lens having a concave surface on the object side.

Then, each lens element in third lens group G3 will be described.

Eighth lens element L8 is a meniscus lens having the convex surface on the object side. Both surfaces of eighth lens element L8 are aspherical surfaces. Ninth lens element L9 is a biconvex lens. Tenth lens element L10 is a biconcave lens. Eleventh lens element L11 is a biconvex lens. Twelfth lens element L12 is a biconvex lens. Both surfaces of twelfth lens element L12 are aspherical surfaces.

Then, each lens element in fourth lens group G4 will be described.

Thirteenth lens element L13 is a meniscus lens having the convex surface on the object side. Both surfaces of thirteenth lens element L13 are aspherical surfaces.

Then, each lens element in fifth lens group G5 will be described.

Fourteenth lens element L14 is a meniscus lens having the convex surface on the object side.

As described above, the imaging optical system of the third exemplary embodiment having the above configuration includes five lens groups.

Each lens group of the imaging optical system of the third exemplary embodiment moves as indicated by the arrow in part (c) of FIG. 7 during the zooming from the wide-angle end to the telephoto end in imaging.

Specifically, first lens group G1 moves onto the object side, and second lens group G2 moves onto the side of the image surface so as to draw a convex locus. Aperture diaphragm A and third lens group G3 move integrally onto the object side. Fourth lens group G4 moves onto the object side, and fifth lens group G5 moves onto the object side. During the zooming, this movement increases a distance between first lens group G1 and second lens group G2, and decreases a distance between second lens group G2 and third lens group G3. The distance between third lens group G3 and fourth lens group G4 increases from the wide-angle end to the intermediate position, and decreases from the intermediate position to the telephoto end. The distance between fourth lens group G4 and fifth lens group G5 decreases from the wide-angle end to the intermediate position, and increases from the intermediate position to the telephoto end. The distance between fifth lens group G5 and image plane S increases. During the zooming from the wide-angle end to the telephoto end, the open aperture diameter of aperture diaphragm A is identical from the wide-angle end to the intermediate position, and increases at the telephoto end compared with the intermediate position.

As described above, each lens group moves along optical axis L as indicated by the arrow in part (c) of FIG. 7. As illustrated in parts (a), (d), (e) of FIG. 7, each lens group is disposed at the wide-angle end, the intermediate position, and the telephoto end.

That is, in the imaging optical system of the third exemplary embodiment, all the lens groups move relatively along optical axis L. In other words, the distance between lens groups changes. Consequently the zooming operation from the wide-angle end to the telephoto end is performed.

During the focusing from the infinity focusing state to the proximity focusing state, fourth lens group G4 constituting the focusing lens group moves onto the image side along optical axis L as indicated by the arrow in part (b) of FIG. 7.

Twelfth lens element L12 of third lens group G3 moves in the direction perpendicular to optical axis L. This enables optical correction of image blur.

Fourth Exemplary Embodiment

An imaging optical system according to a fourth exemplary embodiment will be described below with reference to FIG. 10.

Figure 10:
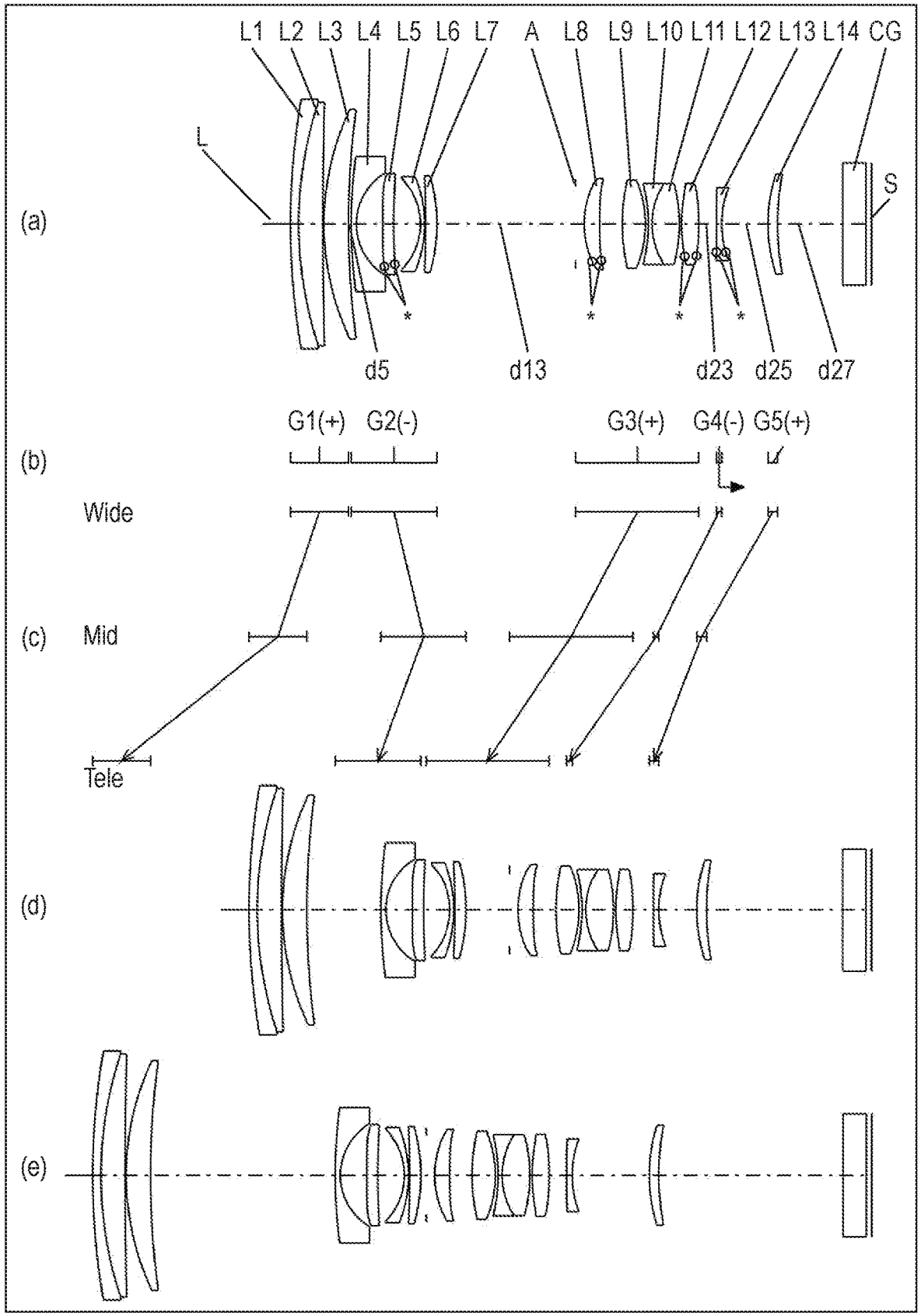
FIG. 10 is a view illustrating lens arrangement in an infinity focusing state of an imaging optical system according to a fourth exemplary embodiment.
Figure 11:
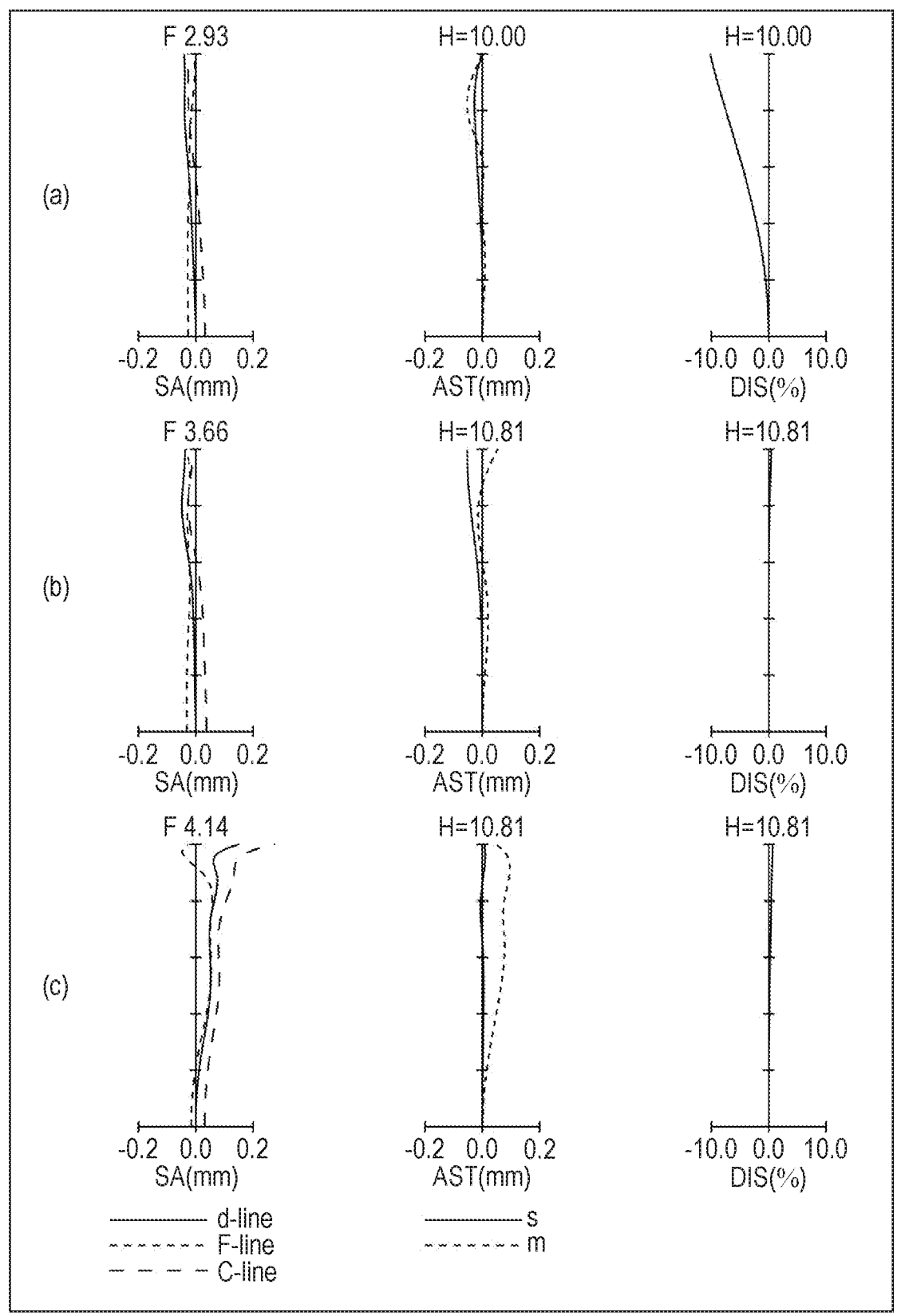
FIG. 11 is a view illustrating a longitudinal aberration in the infinity focusing state of an imaging optical system according to a fourth numerical example of the fourth exemplary embodiment.
Figure 12:
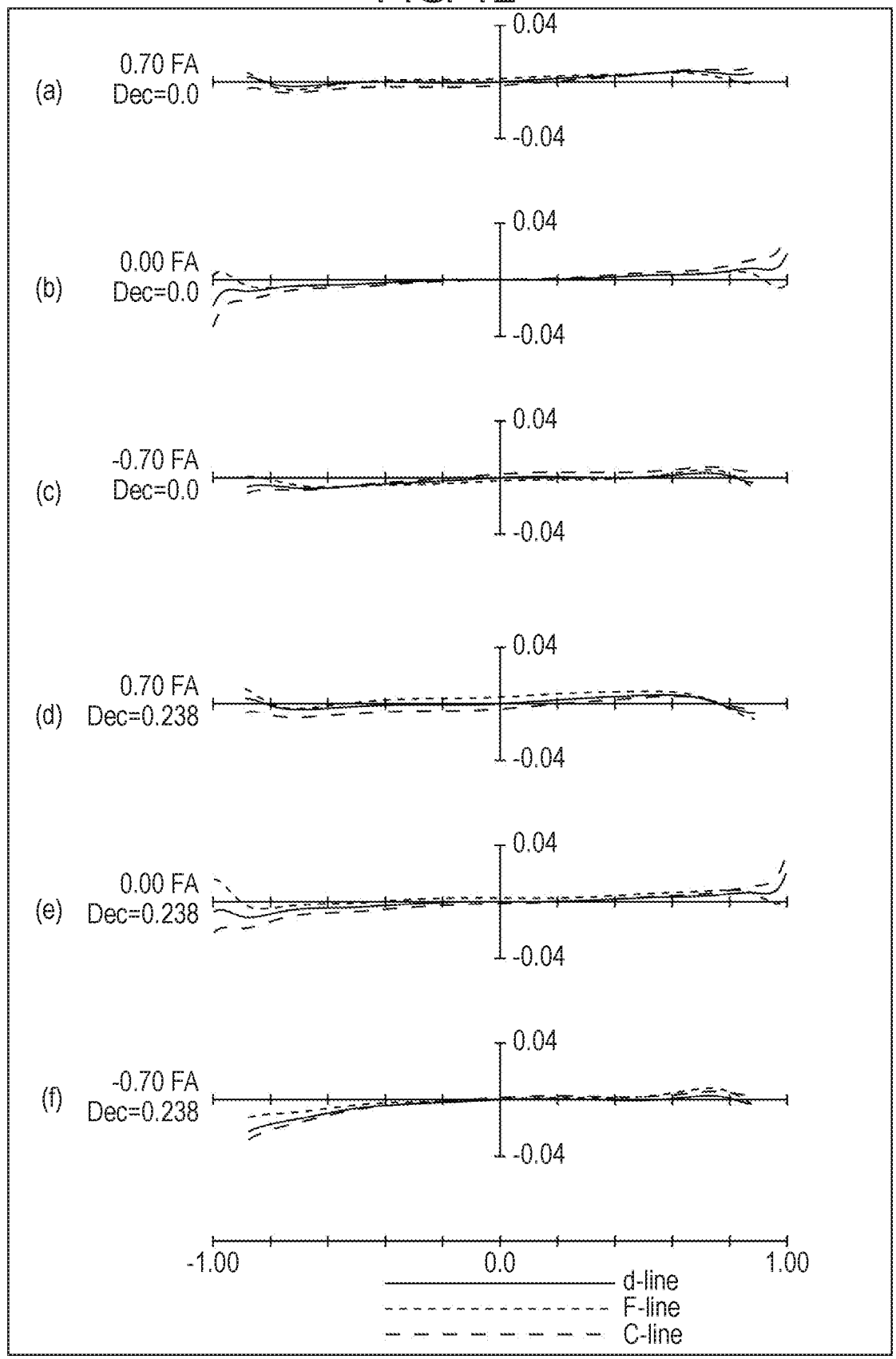
FIG. 12 is a view illustrating a lateral aberration in a basic state in which image blur is not corrected and an image blur correction state at a telephoto end of the imaging optical system of the fourth numerical example.

FIG. 10 illustrates the lens arrangement of the imaging optical system of the fourth exemplary embodiment and operation of the imaging optical system.

As illustrated in FIG. 10, the imaging optical system of the fourth exemplary embodiment includes, in order from the object side toward the image side, first lens group G1 having positive power, second lens group G2 having negative power, aperture diaphragm A, third lens group G3 having the positive power, fourth lens group G4 having the negative power, fifth lens group G5 having the positive power, and parallel plate CG. Fourth lens group G4 and fifth lens group G5 constitute the succeeding lens group. Second lens group G2 is exemplified by lens group Gm. Third lens group G3 is exemplified by lens group Gp. Fourth lens group G4 is exemplified by lens group Gf.

First lens group G1 includes first lens element L1 having the negative power, second lens element L2 having the positive power, and third lens element L3 having the positive power, in order from the object side toward the image side. First lens element L1 and second lens element L2 constitute a cemented lens that is bonded using an adhesive such as an ultraviolet curing resin.

Second lens group G2 includes fourth lens element L4 having the negative power, fifth lens element L5 having the negative power, sixth lens element L6 having the negative power, and seventh lens element L7 having the positive power, in order from the object side toward the image side. Fourth lens element IA is exemplified by lens element LGmF1. Fifth lens element L5 is exemplified by lens element LGmF2 or lens element LGmR3. Sixth lens element L6 is exemplified by lens element LGmR2. Seventh lens element L7 is exemplified by lens element LGmR1.

Third lens group G3 includes eighth lens element L8 having the positive power, ninth lens element L9 having the positive power, tenth lens element L10 having the negative power, eleventh lens element L11 having the positive power, and twelfth lens element L12 having the positive power, in order from the object side toward the image side. Tenth lens element L10 and eleventh lens element L11 constitute a cemented lens that is bonded using an adhesive such as an ultraviolet curing resin. Eighth lens element L8 is exemplified by lens element LGpF1. Ninth lens element L9 is exemplified by lens element LGpF2. Tenth lens element L10 is exemplified by lens element LGpR3. Eleventh lens element L11 is exemplified by lens element LGpR2. Twelfth lens element L12 is exemplified by lens element LGpR1.

Fourth lens group G4 includes thirteenth lens element L13 having the negative power.

Fifth lens group G5 includes fourteenth lens element L14 having the positive power.

Aperture diaphragm A is disposed between seventh lens element L7 of second lens group G2 and eighth lens element L8 of third lens group G3.

The lens element constituting each lens group of the imaging optical system of the fourth exemplary embodiment will be described below.

First, each lens element in first lens group G1 will be described.

First lens element L1 is a meniscus lens having a convex surface on the object side. Second lens element L2 is a meniscus lens having the convex surface on the object side. Third lens element L3 is a meniscus lens having the convex surface on the object side.

Then, each lens element in second lens group G2 will be described.

Fourth lens element L4 is a meniscus lens having the convex surface on the object side. Fifth lens element L5 is a biconcave lens. Both surfaces of fifth lens element L5 are aspherical surfaces. Sixth lens element L6 is a meniscus lens having a concave surface on the object side. Seventh lens element L7 is a meniscus lens having a concave surface on the object side.

Then, each lens element in third lens group G3 will be described.

Eighth lens element L8 is a meniscus lens having the convex surface on the object side. Both surfaces of eighth lens element L8 are aspherical surfaces. Ninth lens element L9 is a biconvex lens. Tenth lens element L10 is a biconcave lens. Eleventh lens element L11 is a biconvex lens. Twelfth lens element L12 is a biconvex lens. Both surfaces of twelfth lens element L12 are aspherical surfaces.

Then, each lens element in fourth lens group G4 will be described.

Thirteenth lens element L13 is a biconcave lens, and both surfaces of thirteenth lens element L13 are aspherical surfaces.

Then, each lens element in fifth lens group G5 will be described.

Fourteenth lens element L14 is a meniscus lens having the convex surface on the object side.

As described above, the imaging optical system of the fourth exemplary embodiment having the above configuration includes five lens groups.

Each lens group of the imaging optical system of the fourth exemplary embodiment moves as indicated by the arrow in part (c) of FIG. 10 during the zooming from the wide-angle end to the telephoto end in imaging.

Specifically, first lens group G1 moves onto the object side, and second lens group G2 moves onto the side of the image surface so as to draw a convex locus. Aperture diaphragm A and third lens group G3 move integrally onto the object side. Fourth lens group G4 moves onto the object side, and fifth lens group G5 moves onto the object side. During the zooming, this movement increases a distance between first lens group G1 and second lens group G2, and decreases a distance between second lens group G2 and third lens group G3. The distance between third lens group G3 and fourth lens group G4 increases from the wide-angle end to the intermediate position, and decreases from the intermediate position to the telephoto end. The distance between fourth lens group G4 and fifth lens group G5 increases. The distance between fifth lens group G5 and image plane S increases. During the zooming from the wide-angle end to the telephoto end, the open aperture diameter of aperture diaphragm A is identical from the wide-angle end to the intermediate position, and increases at the telephoto end compared with the intermediate position.

As described above, each lens group moves along optical axis L as indicated by the arrow in part (c) of FIG. 10. As illustrated in parts (a), (d), (e) of FIG. 10, each lens group is disposed at the wide-angle end, the intermediate position, and the telephoto end.

That is, in the imaging optical system of the fourth exemplary embodiment, all the lens groups move relatively along optical axis L. In other words, the distance between lens groups changes. Consequently the zooming operation from the wide-angle end to the telephoto end is performed.

During the focusing from the infinity focusing state to the proximity focusing state, fourth lens group G4 constituting the focusing lens group moves onto the image side along optical axis L as indicated by the arrow in part (b) of FIG. 10.

Twelfth lens element L12 of third lens group G3 moves in the direction perpendicular to optical axis L. This enables optical correction of image blur. Specifically, the movement of twelfth lens element L12 in the perpendicular direction corrects the image point movement caused by the vibration of the whole imaging optical system. Resultantly, the image blue due to camera shake or vibration can optically be corrected.

Fifth Exemplary Embodiment

An imaging optical system according to a fifth exemplary embodiment will be described below with reference to FIG. 13.

Figure 13:
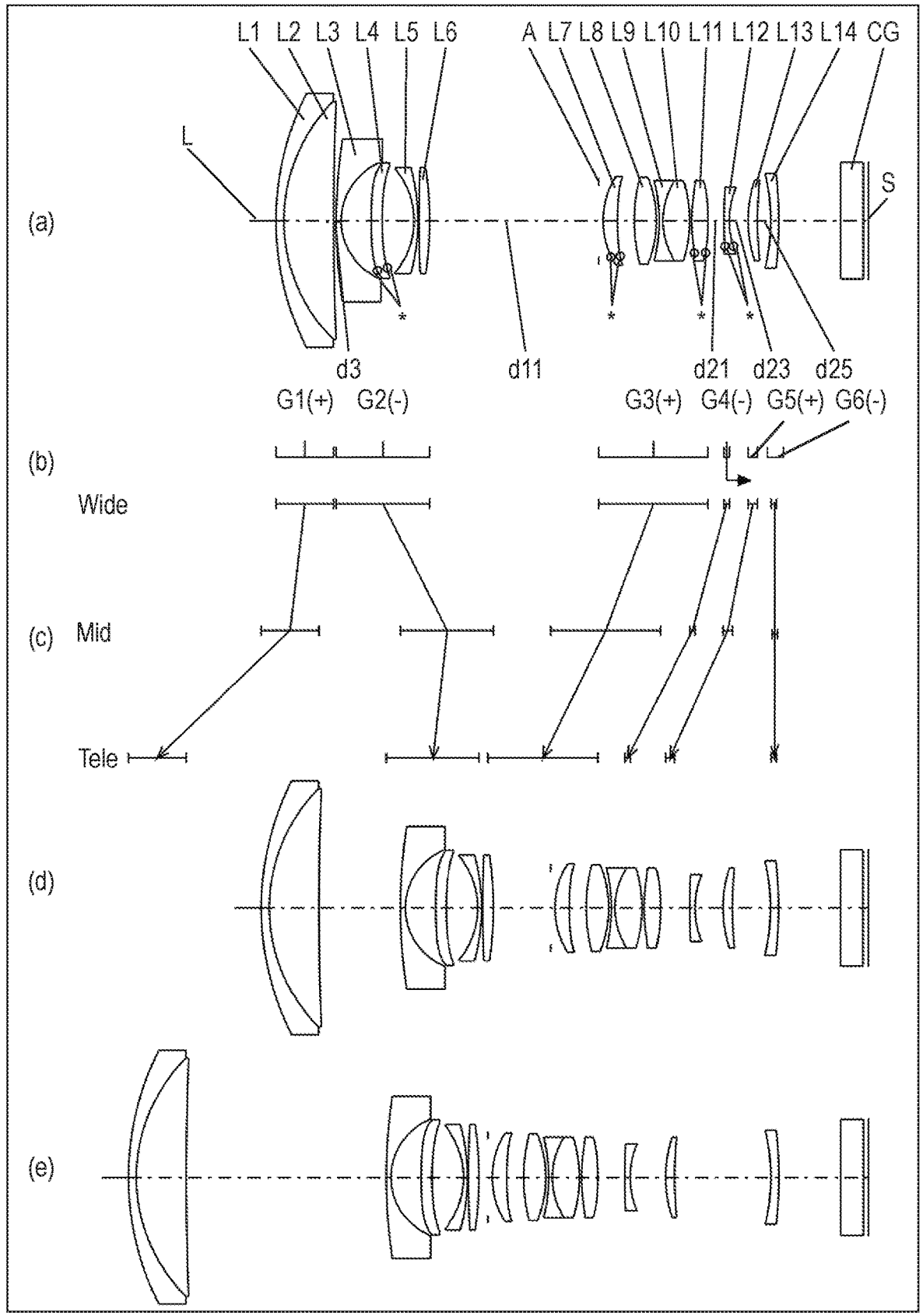
FIG. 13 is a view illustrating lens arrangement in an infinity focusing state of an imaging optical system according to a fifth exemplary embodiment.
Figure 14:
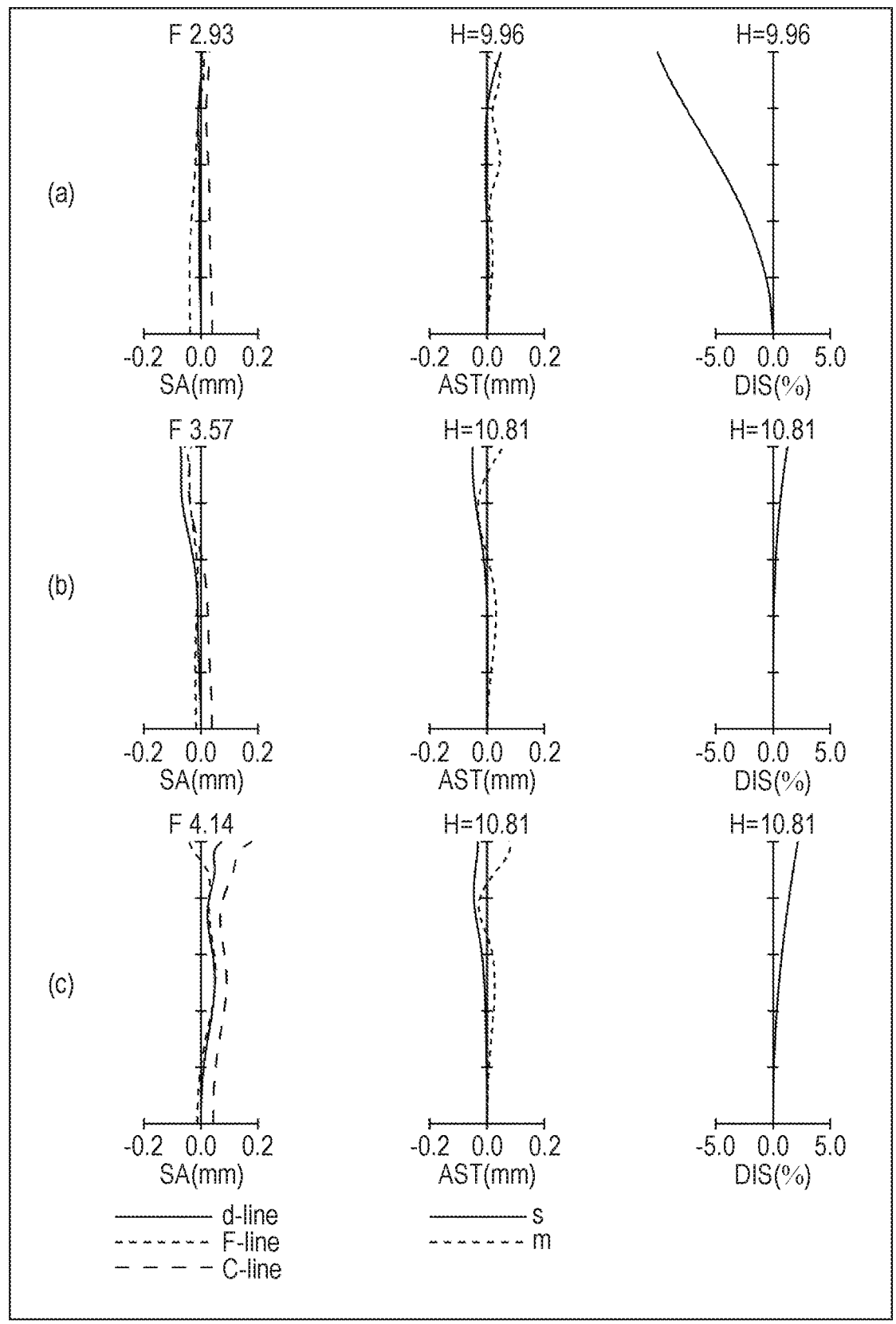
FIG. 14 is a view illustrating a longitudinal aberration in the infinity focusing state of an imaging optical system according to a fifth numerical example of the fifth exemplary embodiment.
Figure 15:
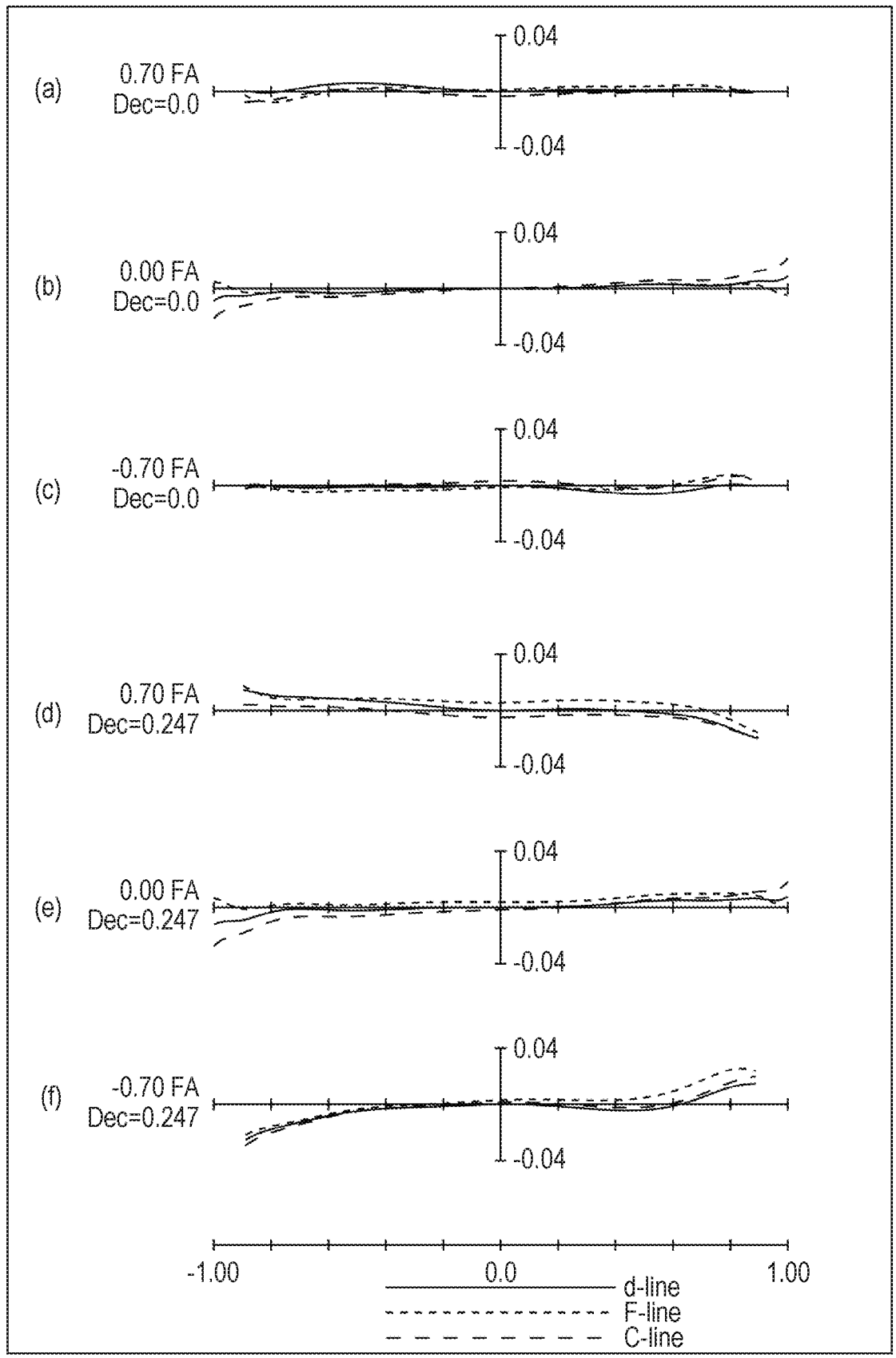
FIG. 15 is a view illustrating a lateral aberration in a basic state in which image blur is not corrected and an image blur correction state at a telephoto end of the imaging optical system of the fifth numerical example.

FIG. 13 illustrates the lens arrangement of the imaging optical system of the fifth exemplary embodiment and operation of the imaging optical system.

As illustrated in FIG. 13, the imaging optical system of the fifth exemplary embodiment includes, in order from the object side toward the image side, first lens group G1 having positive power, second lens group G2 having negative power, aperture diaphragm A, third lens group G3 having the positive power, fourth lens group G4 having the negative power, fifth lens group G5 having the positive power, sixth lens group G6 having the negative power, and parallel plate CG. Second lens group G2 is exemplified by lens group Gm. Third lens group G3 is exemplified by lens group Gp. Fourth lens group G4 is exemplified by lens group Gf.

First lens group G1 includes first lens element L1 having the negative power and second lens element L2 having the positive power, in order from the object side toward the image side. First lens element L1 and second lens element L2 constitute a cemented lens that is bonded using an adhesive such as an ultraviolet curing resin.

Second lens group G2 includes third lens element L3 having the negative power, fourth lens element IA having the negative power, fifth lens element L5 having the negative power, and sixth lens element L6 having the positive power, in order from the object side toward the image side. Third lens element L3 is exemplified by lens element LGmF1. Fourth lens element L4 is exemplified by lens element LGmF2 or lens element LGmR3. Fifth lens element L5 is exemplified by lens element LGmR2. Sixth lens element L6 is exemplified by lens element LGmR1.

Third lens group G3 includes seventh lens element L7 having the positive power, eighth lens element L8 having the positive power, ninth lens element L9 having the negative power, tenth lens element L10 having the positive power, and eleventh lens element L11 having the positive power, in order from the object side toward the image side. Ninth lens element L9 and tenth lens element L10 constitute a cemented lens that is bonded using an adhesive such as an ultraviolet curing resin. Seventh lens element L7 is exemplified by lens element LGpF1. Eighth lens element L8 is exemplified by lens element LGpF2. Ninth lens element L9 is exemplified by lens element LGpR3. Tenth lens element L10 is exemplified by lens element LGpR2. Eleventh lens element L11 is exemplified by lens element LGpR1.

Fourth lens group G4 includes twelfth lens element L12 having the negative power.

Fifth lens group G5 includes thirteenth lens element L13 having the positive power.

Sixth lens group G6 includes fourteenth lens element L14 having the negative power.

Aperture diaphragm A is disposed between sixth lens element L6 of second lens group G2 and seventh lens element L7 of third lens group G3.

The lens element constituting each lens group of the imaging optical system of the fifth exemplary embodiment will be described below.

First, each lens element in first lens group G1 will be described.

First lens element L1 is a meniscus lens having a convex surface on the object side. Second lens element L2 is a meniscus lens having the convex surface on the object side.

Then, each lens element in second lens group G2 will be described.

Third lens element L3 is a meniscus lens having the convex surface on the object side. Fourth lens element L4 is a meniscus lens having the convex surface on the object side. Both surfaces of fourth lens element L4 are aspherical surfaces. Fifth lens element L5 is a meniscus lens having the concave surface on the object side. Sixth lens element L6 is a biconvex lens.

Then, each lens element in third lens group G3 will be described.

Seventh lens element L7 is a meniscus lens having the convex surface on the object side. Both surfaces of seventh lens element L7 are aspherical surfaces. Eighth lens element L8 is a biconvex lens. Ninth lens element L9 is a biconcave lens. Tenth lens element L10 is a biconvex lens. Eleventh lens element L11 is a biconvex lens. Both surfaces of eleventh lens element L11 are aspherical surfaces.

Then, each lens element in fourth lens group G4 will be described.

Twelfth lens element L12 is a meniscus lens having the convex surface on the object side. Both surfaces of twelfth lens element L12 are aspherical surfaces.

Then, the lens element in fifth lens group G5 will be described.

Thirteenth lens element L13 is a meniscus lens having the convex surface on the object side.

Further, the lens element in sixth lens group G6 will be described.

Fourteenth lens element L14 is a meniscus lens having the concave surface on the object side.

As described above, the imaging optical system of the fifth exemplary embodiment includes six lens groups.

Each lens group of the imaging optical system of the fifth exemplary embodiment moves as indicated by the arrow in part (c) of FIG. 13 during the zooming from the wide-angle end to the telephoto end in imaging.

Specifically, first lens group G1 moves onto the object side, and second lens group G2 moves onto the side of the image surface so as to draw a convex locus. Aperture diaphragm A and third lens group G3 move integrally onto the object side. Fourth lens group G4 moves onto the object side, and fifth lens group G5 moves onto the object side. Sixth lens group G6 does not move. During the zooming, this movement increases a distance between first lens group G1 and second lens group G2, and decreases a distance between second lens group G2 and third lens group G3. The distance between third lens group G3 and fourth lens group G4 increases from the wide-angle end to the intermediate position, and decreases at the telephoto end compared with the wide-angle end. The distance between fourth lens group G4 and fifth lens group G5 increases. The distance between fifth lens group G5 and sixth lens group G6 increases. During the zooming from the wide-angle end to the telephoto end, the open aperture diameter of aperture diaphragm A is identical from the wide-angle end to the intermediate position, and increases at the telephoto end compared with the wide-angle end.

That is, in the imaging optical system of the fifth exemplary embodiment, first lens group G1 to fifth lens group G5 move along optical axis L such that the distance between sixth lens group G6 and image plane S does not change. In other words, the distance between lens groups changes. Consequently, the zooming operation from the wide-angle end to the telephoto end is performed.

During the focusing from the infinity focusing state to the proximity focusing state, the imaging optical system moves onto the image side along optical axis L as indicated by the arrow in part (b) of FIG. 13.

Eleventh lens element L11 of third lens group G3 moves in the direction perpendicularly to optical axis L. This enables optical correction of image blur. Specifically the movement of eleventh lens element L11 corrects the image point movement caused by the vibration of the whole imaging optical system. Resultantly, the image blur due to camera shake or vibration can optically be corrected.

Sixth Exemplary Embodiment

An imaging optical system according to a sixth exemplary embodiment will be described below with reference to FIG. 16.

Figure 16:
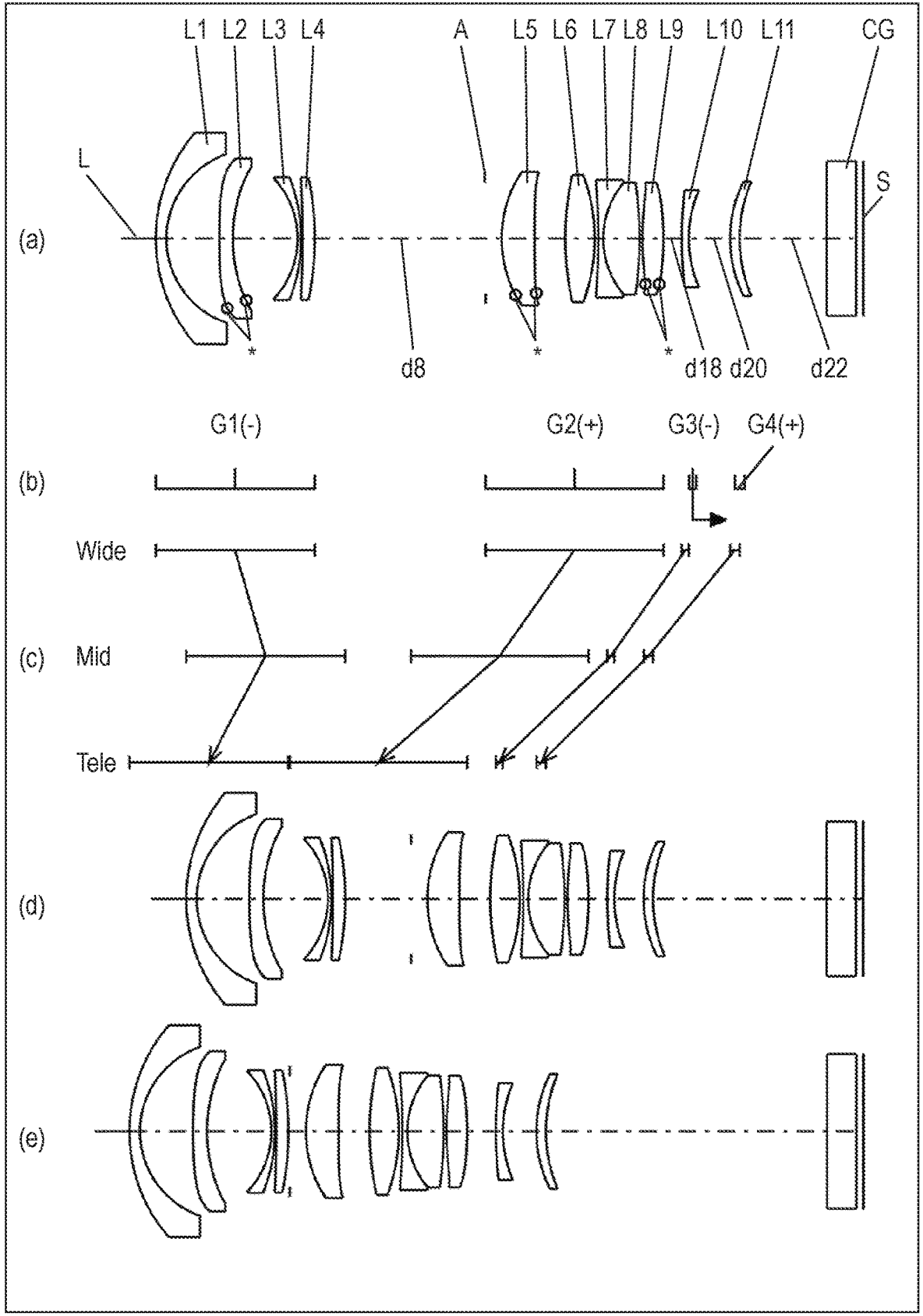
FIG. 16 is a view illustrating lens arrangement in an infinity focusing state of an imaging optical system according to a sixth exemplary embodiment.
Figure 17:
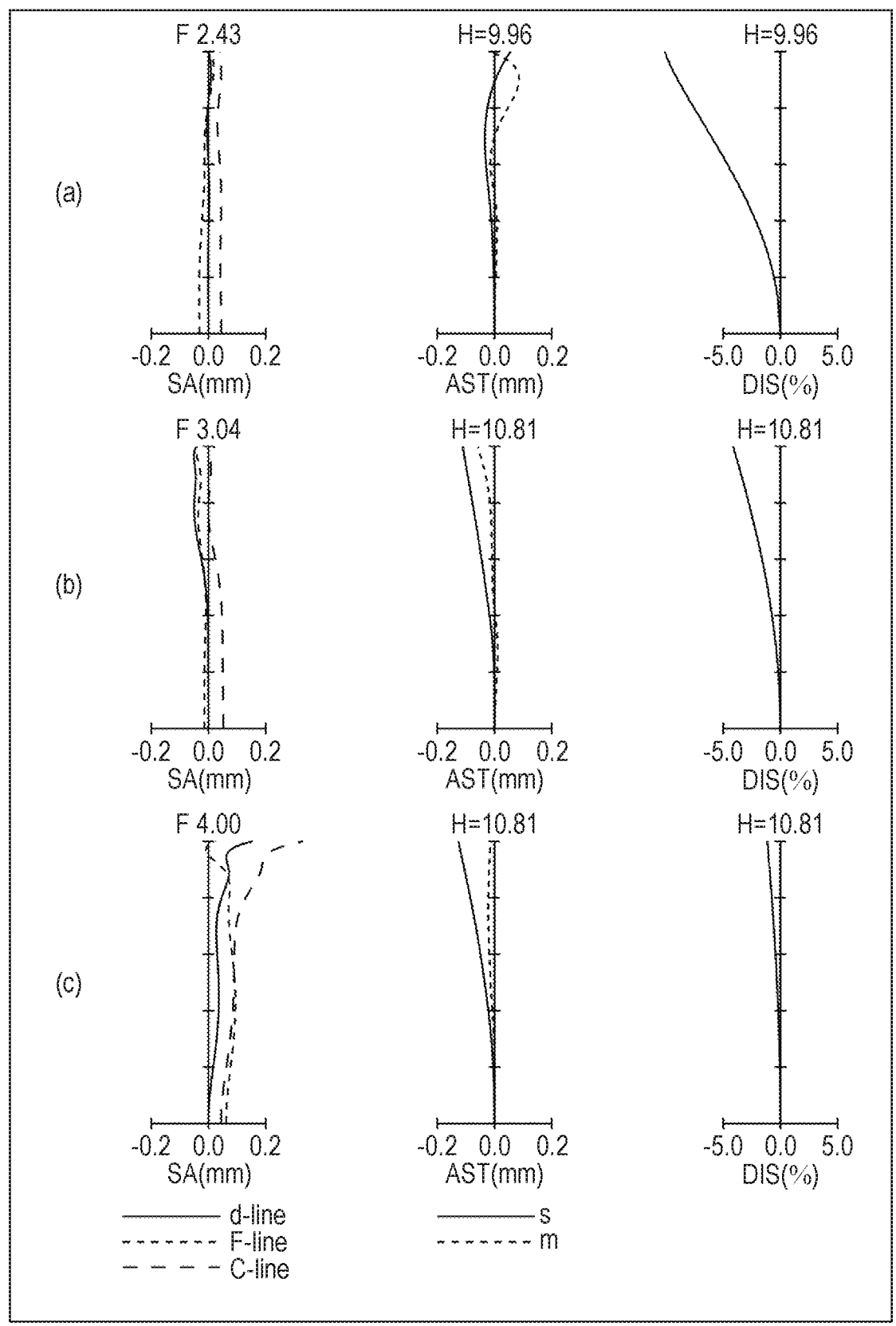
FIG. 17 is a view illustrating a longitudinal aberration in the infinity focusing state of an imaging optical system according to a sixth numerical example of the sixth exemplary embodiment.
Figure 18:
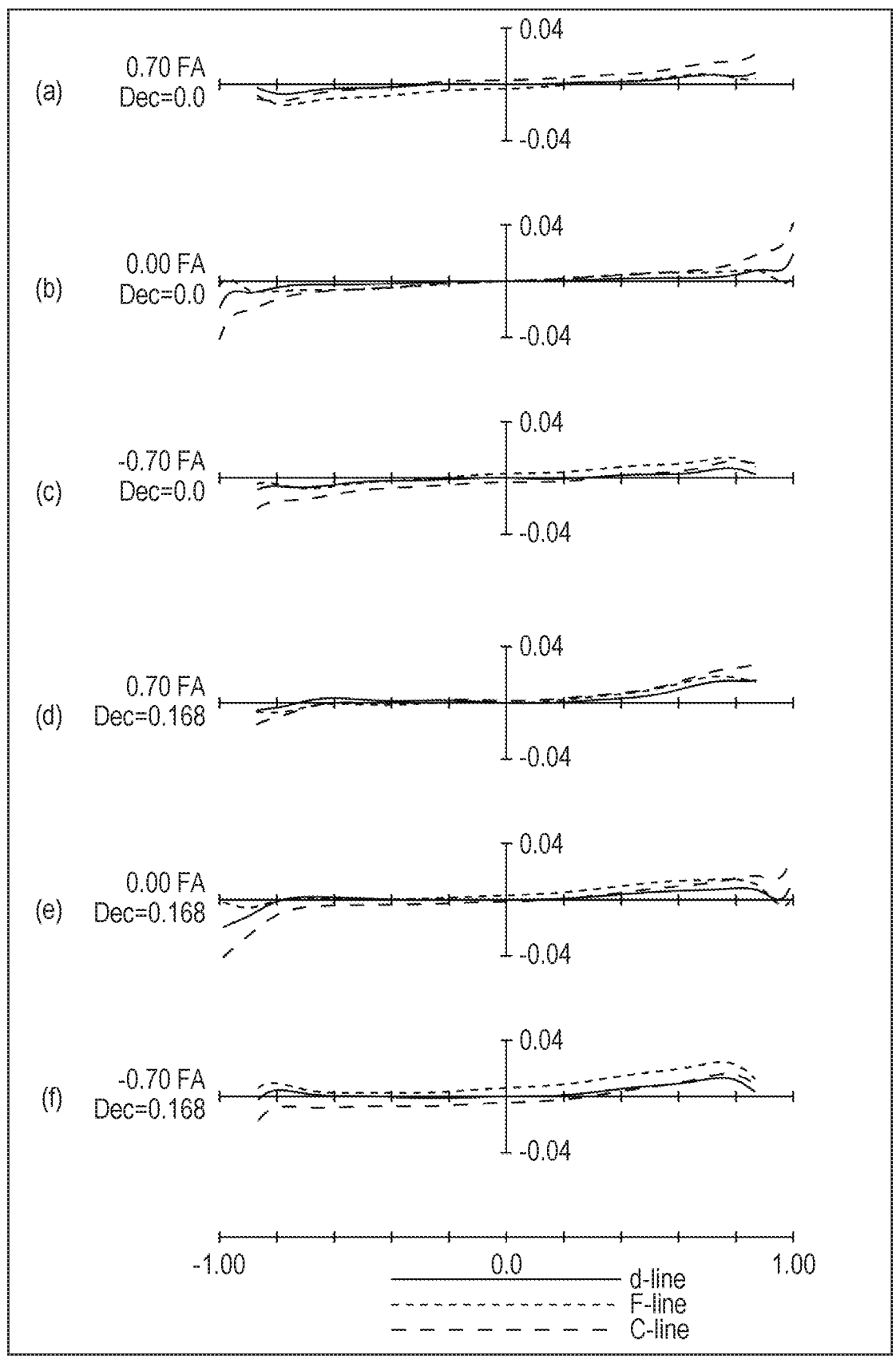
FIG. 18 is a view illustrating a lateral aberration in a basic state in which image blur is not corrected and an image blur correction state at a telephoto end of the imaging optical system of the sixth numerical example.

FIG. 16 illustrates the lens arrangement of the imaging optical system of the sixth exemplary embodiment and operation of the imaging optical system.

As illustrated in FIG. 16, the imaging optical system of the sixth exemplary embodiment includes, in order from the object side toward the image side, first lens group G1 having the negative power, aperture diaphragm A, second lens group G2 having the positive power, third lens group G3 having the negative power, fourth lens group G4 having the positive power, and parallel plate CG. First lens group G1 is exemplified by lens group Gm. Second lens group G2 is exemplified by lens group Gp. Third lens group G3 is exemplified by lens group Gf.

First lens group G1 includes first lens element L1 having the negative power, second lens element L2 having the negative power, third lens element L3 having the negative power, and fourth lens element L4 having the positive power, in order from the object side toward the image side. First lens element L1 is exemplified by lens element LGmF1. Second lens element L2 is exemplified by lens element LGmF2 or lens element LGmR3. Third lens element L3 is exemplified by lens element LGmR2. Fourth lens element L4 is exemplified by lens element LGmR1.

Second lens group G2 includes fifth lens element L5 having the positive power, sixth lens element L6 having the positive power, seventh lens element L7 having the negative power, eighth lens element L8 having the positive power, and ninth lens element L9 having the positive power, in order from the object side toward the image side. Seventh lens element L7 and eighth lens element L8 constitute a cemented lens that is bonded using an adhesive such as an ultraviolet curing resin. Fifth lens element L5 is exemplified by lens element LGpF1.

Third lens group G3 includes tenth lens element L10 having the negative power.

Fourth lens group G4 includes eleventh lens element L11 having the positive power.

Aperture diaphragm A is disposed between fourth lens element IA of first lens group G1 and fifth lens element L5 of second lens group G2.

The lens element constituting each lens group of the imaging optical system of the sixth exemplary embodiment will be described below.

First, each lens element in first lens group G1 will be described.

First lens element L1 is a meniscus lens having a convex surface on the object side. Second lens element L2 is a meniscus lens having the convex surface on the object side. Both surfaces of second lens element L2 are aspherical surfaces. Third lens element L3 is a meniscus lens having the concave surface on the object side. Fourth lens element L4 is a meniscus lens having the concave surface on the object side.

Then, each lens element in second lens group G2 will be described.

Fifth lens element L5 is a meniscus lens having the convex surface on the object side. Both surfaces of fifth lens element L5 are aspherical surfaces. Sixth lens element L6 is a biconvex lens. Seventh lens element L7 is a biconcave lens. Eighth lens element L8 is a biconvex lens. Ninth lens element L9 is a biconvex lens. Both surfaces of ninth lens element L9 are aspherical surfaces.

The lens element in third lens group G3 will be described below.

Tenth lens element L10 is a meniscus lens having the convex surface on the object side.

Then, the lens element in fourth lens group G4 will be described.

Eleven lens element L11 is a meniscus lens having the convex surface on the object side.

As described above, the imaging optical system of the sixth exemplary embodiment includes four lens groups.

During the zooming from the wide-angle end to the telephoto end in imaging, the imaging optical system of the sixth exemplary embodiment moves as indicated by the arrow in part (c) of FIG. 16.

Specifically, first lens group G1 first moves so as to draw a convex locus on the side of image plane S. Aperture diaphragm A and second lens group G2 move integrally onto the object side. Third lens group G3 moves onto the object side, and fourth lens group G4 moves onto the object side. During the zooming, this movement decreases the distance between first lens group G1 and second lens group G2. The distance between second lens group G2 and third lens group G3 does not change from the wide-angle end to the intermediate position, but increases at the telephoto end as compared with the wide-angle end. The distance between third lens group G3 and fourth lens group G4 decreases from the wide-angle end to the intermediate position, and increases at the telephoto end as compared with the wide-angle end. During the zooming from the wide-angle end to the telephoto end, the open aperture diameter of aperture diaphragm A is identical from the wide-angle end to the intermediate position, and increases at the telephoto end as compared with the wide-angle end.

That is, in the imaging optical system of the sixth exemplary embodiment, each lens group moves along optical axis L such that the distance between fourth lens group G4 and image plane S increases. Consequently, the zooming operation from the wide-angle end to the telephoto end is performed.

During the focusing from the infinity focusing state to the proximity focusing state, third lens group G3 constituting the focusing lens group moves onto the image side along optical axis L as indicated by the arrow in part (b) of FIG. 16.

Ninth lens element L9 of second lens group G2 moves in the direction perpendicular to optical axis L. This enables optical correction of image blur. Specifically, the movement of ninth lens element L9 in the perpendicular direction corrects the image point movement caused by the vibration of the whole imaging optical system. Resultantly, the image blur due to hand shake or vibration can optically be corrected.

(Condition and Effect)

A condition that can satisfy the configurations of the imaging optical systems of the first to sixth exemplary embodiments will be described below.

A plurality of possible conditions are defined with respect to the imaging optical system of each exemplary embodiment. In this case, the configuration of the imaging optical system satisfying all the conditions is most effective.

Alternatively, by satisfying an individual condition as follows, an imaging optical system exhibiting an effect corresponding to each condition can be obtained.

For example, in the imaging optical systems of the first to sixth exemplary embodiments, the distance between lens groups changes during the zooming, lens group Gm (corresponding to second lens group G2 in the first to fifth exemplary embodiments, and corresponding to first lens group G1 in the sixth exemplary embodiment) located on that is closest to the object among the lens groups having the negative power is constructed with at least two lens elements having the negative power, namely, lens element LGmF1 having the negative power and lens element LGmF2 having the negative power in which both the surfaces are formed into an aspherical shape, in order from object side toward the image side.

With this configuration, a thickness deviation ratio of the aspherical lens of lens element LGmF2 disposed in above-described lens group Gm can be decreased even in a wide angle lens. Consequently, the spherical lens, which is easily produced even if the thickness deviation ratio is increased, can be disposed as lens element LGmF1. This enables lens group Gm to be thinned. Resultantly, a total length of the imaging optical system can be shortened.

At this point, in the case that the imaging optical system includes the lens group (corresponding to first lens group G1) having the positive power on the object side with respect to lens group Gm as in the first to fifth exemplary embodiments (in the case of what is called a positive lead), a diameter of the lens group (first lens group G1 of the first to fifth exemplary embodiments) having the positive power on the object side with respect to lens group Gm can be reduced.

The above configuration may be applied to not only the positive lead of the first to fifth exemplary embodiments (first to fifth numerical examples), but also the negative lead of the sixth exemplary embodiment (sixth numerical example). In this case, lens group Gm having the negative power located on that is closest to the object is disposed on the most object side of each lens group in the imaging optical system.

The imaging optical system of the present disclosure includes lens group Gp (corresponding to third lens group G3 in the first to fifth exemplary embodiments, and corresponding to second lens group G2 in the sixth exemplary embodiment) having the positive power on the image side of lens group Gm. During the zooming from the wide-angle end to the telephoto end in the imaging, at least lens group Gp moves in the optical axis direction such that the distance between lens group Gm and lens group Gp changes. Consequently, the imaging optical system of the present disclosure can also be applied to the zoom lens system.

Preferably the imaging optical system having the above basic configuration satisfies the following condition (1), for example.

$$0.5 < f\_LGpF1/fw < 15 \quad (1)$$

where f_LGpF1 is a focal distance of lens element LGpF1 and fw is a focal distance at the wide-angle end.

That is, the condition (1) defines a relationship between the focal distance of lens element LGpF1 disposed closest to the object side in lens group Gp and the focal distance of the whole system at the wide-angle end.

When f_LGpF1/fw is less than or equal to a lower limit (0.5) of the condition (1), the power of lens element LGpF1 becomes excessively strong. Thus, the correction of a spherical aberration is short. On the other hand, when f_LGpF1/fw is greater than or equal to an upper limit (15) of the condition (1), the focal distance of lens element LGpF1 becomes excessively long. Thus, the correction of the spherical aberration becomes excessive.

At this point, more preferably any one of the following conditions (1a) and (1b) is satisfied.

$$1.0 < f\_LGpF1/fw \quad (1a)$$

$$f\_LGpF1/fw < 10 \quad (1b)$$

These conditions allow the above-mentioned effects to be more improved.

More preferably any one of the following conditions (1c) and (1d) is satisfied.

$$1.5 < f\_LGpF1/fw \quad (1c)$$

$$f\_LGpF1/fw < 7 \quad (1d)$$

Consequently, the above-described effect is further improved.

For example, preferably lens element LGmR2, which is a second lens element, from the image side of lens group Gm has a meniscus shape having a convex surface on the image side. Thus, the excessive spherical aberration can be corrected. When the above shape is adopted with respect to the positive spherical aberration, the negative spherical aberration can be generated at the position where a light beam diverges toward the side of image plane S. For this reason, the spherical aberration can be corrected by the addition.

For example, desirably lens group Gm includes lens element LGmF1 having the negative power and lens element LGmF2 having the negative power, in order from the object side toward the image side, and includes lens element LGmR1 having the positive power and lens element LGmR2 having the negative power, in order from the image side toward the object side. In other words, preferably lens element LGmR3, which is a third lens element, from the image side toward the object side of lens group Gm has the negative power. In the case that lens group Gm has five lens elements, a freedom degree of design increases significantly. For this reason, the disposition of any one of lens elements LGmR1, LGmR2, LGmR3 is not decided even in the wide angle system lens. Consequently, an excessive field curvature at the wide-angle end, which is easily caused during the wide angle, is easy to correct. That is, the field curvature that is the aberration in a screen peripheral portion is generated in the lens element having the strongest negative power in lens group Gm having the negative power. Consequently, preferably lens element LGmR3 or lens element LGmF2 is configured with the lens element having the negative power in order to prevent the generation of the field curvature. When lens element LGmR1 has the positive power, the prevention effect is further enhanced.

Preferably the imaging optical system of the present disclosure satisfies the following condition (2).

$$0.5 < THGm\_A / THGm\_B < 1.5 \quad (2)$$

where THGm_A is an air distance between lens element LGmF1, which is a first lens element, from the object side of lens group Gm and lens element LGmF2, which is the second lens element, from the object side of lens group Gm, and THGm_B is an air distance between lens element LGmR2, which is a second lens element, from the image side of lens group Gm and lens element LGmR3, which is the third lens element, from the image side of lens group Gm.

That is, the condition (2) defines a relationship between the air distance between lens element LGmF1, which is the first lens element, from the object side of lens group Gm and lens element LGmF2, which is the second lens element, from the object side of lens group Gm and the air distance between lens element LGmR2, which is the second lens element, from the image side of lens group Gm and lens element LGmR3, which is the third lens element, from the image side of lens group Gm.

When THGm_A/THGm_B is less than or equal to the lower limit (0.5) of the condition (2), a light flux diameter output from lens group Gm increases, so that a diaphragm diameter becomes too large. On the other hand, when THGm_A/THGm_B is greater than or equal to the upper limit (1.5) of the condition (2), because an angle of a light beam output from lens element LGmF1 of lens group Gm increases, the diameter (a size in a radial direction) of the optical system located closer to the object side increases.

At this point, more preferably any one of the following conditions (2a) and (2b) is satisfied.

$$0.7 < THGm\_A/THGm\_B \quad (2a)$$

$$THGm\_A/THGm\_B < 1.3 \quad (2b)$$

These conditions allow the above-mentioned effects to be more improved.

More preferably any one of the following conditions (2c) and (2d) is satisfied.

$$0.8 < THGm\_A/THGm\_B \quad (2c)$$

$$THGm\_A/THGm\_B < 1.2 \quad (2d)$$

Consequently, the above-described effect is further improved.

Preferably the imaging optical system of the present disclosure satisfies the following conditions (3), (4).

$$1.45 < nd\_LGmF2 \quad (3)$$

$$35 < vd\_LGmF2 \quad (4)$$

where nd_LGmF2 is a refractive index of lens element LGmF2, which is the second lens element, from the most object side of lens group Gm, and vd_LGmF2 is an Abbe number of lens element LGmF2, which is the second lens element, from the most object side of lens group Gm.

That is, the conditions (3). (4) define the refractive index and the Abbe number of lens element LGmF2, which is the second lens element, from the most object side of lens group Gm, respectively.

When nd_LGmF2 is less than or equal to the lower limit (1.45) of the condition (3), a radius of curvature of the lens element becomes excessively small. For this reason, the lens element is difficult to produce. When vd_LGmF2 is less than or equal to the lower limit (35) of the condition (4), a chromatic aberration of magnification at the wide-angle end is difficult to correct. That is, the chromatic aberration of magnification at the wide-angle end is generated in the lens located on that is closest to the object with respect to lens element LGmF2 having a large light beam height. The chromatic aberration of magnification becomes difficult to correct because chromatic dispersion increases with decreasing value of the condition (4).

At this point, more preferably any one of the following conditions (3a) and (4a) is satisfied.

$$1.48 < nd\_LGmF2 \quad (3a)$$

$$38 < vd\_LGmF2 \quad (4a)$$

These conditions allow the above-mentioned effects to be more improved.

Preferably the imaging optical system of the present disclosure satisfies the following condition (5).

$$0.05 < THGp\_A/THGp\_B < 0.5 \quad (5)$$

where THGp_A is an air distance between lens element LGpF1, which is a first lens element, from the object side of lens group Gp and lens element LGpF2, which is a second lens element, from the object side of lens group Gp, and THGp_B is a center distance between the lens located on that is closest to the object of lens group Gp and the lens located on that is closest to the image of lens group Gp.

That is, the condition (5) defines a relationship between the air distance between lens element LGpF1, which is the first lens element, from the object side of lens group Gp and lens element LGpF2, which is the second lens element, from the object side of lens group Gp, and the center distance between the lens located on that is closest to the object of lens group Gp and the lens located on that is closest to the image of lens group Gp.

When THGp_A/THGp_B is less than or equal to the lower limit (0.05) of the condition (5), in particular the image surface in a meridional direction falls down too under. On the other hand, when THGp_A/THGp_B is greater than or equal to the upper limit (0.5) of the condition (5), the image surface in the meridional direction falls down too over.

At this point, more preferably any one of the following conditions (5a) and (5b) is satisfied.

$$0.07 < THGp\_A/THGp\_B \quad (5a)$$

$$THGp\_A/THGp\_B < 0.3 \quad (5b)$$

These conditions allow the above-mentioned effects to be more improved.

Preferably the imaging optical system of the present disclosure satisfies the following condition (6).

$$1.0 < f\_Gp/fw < 7 \quad (6)$$

where f_Gp is a focal distance of lens group Gp and fw is a focal distance of the whole system at the wide-angle end.

That is, the condition (6) defines a relationship between the focal distance of lens group Gp and the focal distance of the whole system at the wide-angle end.

When f_Gp/fw is less than or equal to the lower limit (1.0) of the condition (6), the focal distance of lens group Gp becomes small. For this reason, the aberration becomes difficult to be correct in the whole range. On the other hand, when f_Gp/fw is greater than or equal to the upper limit (7) of the condition (6), the focal distance of lens group Gp becomes large. For this reason, a movement amount of lens group Gp becomes excessively large in order to secure a zoom ratio.

At this point, more preferably any one of the following conditions (6a) and (6b) is satisfied.

$$1.3 < f\_Gp/fw \quad (6a)$$

$$f\_Gp/fw < 5 \quad (6b)$$

These conditions allow the above-mentioned effects to be more improved.

Preferably the imaging optical system of the present disclosure satisfies the following conditions (7), (8).

$$1.50 < nd\_LGf \tag{7}$$

$$35 < vd\_LGf \tag{8}$$

where nd_LGf is a refractive index of the lens element constituting lens group Gf, and vd_LGf is an Abbe number of the lens element constituting lens group Gf.

That is, the conditions (7), (8) define the refractive index and the Abbe number of the lens element constituting lens group Gf, respectively.

When nd_LGf is less than or equal to the lower limit (1.50) of the condition (7), a variation in field curvature becomes large during proximity. When vd_LGf is less than or equal to the lower limit (35) of the condition (8), the chromatic aberration of magnification during the proximity is difficult to correct.

At this point, more preferably any one of the following conditions (7a) and (8a) is satisfied.

$$1.53 < nd\_LGf \tag{7a}$$

$$38 < vd\_LGf \tag{8a}$$

These conditions allow the above-mentioned effects to be more improved.

Preferably the imaging optical system of the present disclosure satisfies the following condition (9).

$$1.5 < |f\_Gf|/fw < 5 \tag{9}$$

where f_Gf is a focal distance of lens group Gf and fw is a focal distance of the whole system at the wide-angle end.

That is, the condition (9) defines the relationship between the focal distance of lens group Gf and the focal distance of the whole system at the wide-angle end.

When |f_Gf|/fw is less than or equal to the lower limit (1.5) of the condition (9), the focal distance of lens group Gf becomes small. For this reason, the variation in aberration becomes difficult to correct during the proximity. On the other hand, when |f_Gf|/fw is greater than or equal to the upper limit (5) of the condition (9), the focal distance of lens group Gf becomes large. For this reason, the movement amount of lens group Gf becomes excessively large.

More preferably any one of the following conditions (9a) and (9b) is satisfied.

Consequently, the above-described effect is further improved.

Preferably the imaging optical system of the present disclosure satisfies the following conditions (10), (11).

$$1.75 < nd\_LGmF1 \tag{10}$$

$$25 < vd\_LGmF1 \tag{11}$$

where nd_LGmF1 is a refractive index of lens element LGmF1 located on that is closest to the object of lens group Gm, and vd_LGmF1 is an Abbe number of lens element LGmF1 located on that is closest to the object of lens group Gm.

That is, the conditions (10), (11) define the refractive index and the Abbe number of lens element LGmF1 located on that is closest to the object of lens group Gm, respectively.

When nd_LGmF1 is less than or equal to the lower limit (1.75) of the condition (10), the radius of curvature of the image-side surface becomes small. Consequently, an inclination angle of the peripheral portion becomes excessively large, and the lens element is difficult to produce. When vd_LGmF1 is less than or equal to the lower limit (25) of the condition (11), the chromatic aberration of magnification at the wide-angle end is difficult to correct.

At this point, more preferably any one of the following conditions (10a) and (11a) is satisfied.

$$1.78 < nd\_LGmF1 \tag{10a}$$

$$31 < vd\_LGmF1 \tag{11a}$$

These conditions allow the above-mentioned effects to be more improved.

Preferably the imaging optical system of the present disclosure satisfies the following condition (12).

$$0.8 < t\_LGmF2(70\%)/ct\_LGmF2 < 1.5 \tag{12}$$

where t_LGmF2 (70%) is a thickness of the lens element having 70% of the height from an effective diameter of the object-side surface of lens element LGmF2, which is the second lens element, from the object side of lens group Gm, and ct_LGmF2 is a center thickness of lens element LGmF2, which is the second lens element, from the object side of lens group Gm.

That is, the condition (12) defines a relationship between the thickness of the lens element having 70% of the height from the effective diameter of the object-side surface of lens element LGmF2, which is the second lens element, from the object side of lens group Gm and the center thickness of lens element LGmF2, which is the second lens element, from the object side of lens group Gm.

When t_LGmF2 (70%)/ct_LGmF2 is less than or equal to the lower limit (0.8) of the condition (12), the thickness of the lens element becomes excessively thin. For this reason, an edge thickness is difficult to ensure at a height defining an outer diameter. On the other hand, when t_LGmF2 (70%)/ct_LGmF2 is greater than or equal to the upper limit (1.5) of the condition (12), the edge thickness becomes excessively large. For this reason, the lens element (for example, lens element LGmF1) on the object side is enlarged.

At this point, more preferably any one of the following conditions (12a) and (12b) is satisfied.

$$0.9 < t\_LGmF2(70\%)/ct\_LGmF2 \tag{12a}$$

$$t\_LGmF2(70\%)/ct\_LGmF2 < 1.2 \tag{12b}$$

These conditions allow the above-mentioned effects to be more improved.

More preferably one of the following conditions (12c) and (12d) is satisfied.

$$0.98 < t\_LGmF2(70\%)/ct\_LGmF2 \tag{12c}$$

$$t\_LGmF2(70\%)/ct\_LGmF2 < 1.06 \tag{12d}$$

Consequently the above-described effect is further improved.

Preferably the imaging optical system of the present disclosure satisfies the following condition (13).

$$0.1 < ct\_LGmF2/THGm\_B < 1.2 \tag{13}$$

where ct_LGmF2 is a center thickness of lens element LGmF2, which is the second lens element, from the object side of lens group Gm, and THGm_B is an air distance between lens element LGmR2, which is the second lens element, from the image side of lens group Gm and lens element LGmR3, which is the third lens element, from the image side of lens group Gm.

That is, the condition (13) defines a relationship between the center distance of lens element LGmF2, which is the second lens element, from the object side of lens group Gm and the air distance between lens element LGmR2, which is the second lens element, from the image side of lens group Gm and lens element LGmR3, which is the third lens element, from the image side of lens group Gm.

When ct_LGmF2/THGm_B is less than or equal to the lower limit (0.1) of the condition (13), THGm_B increases, and LGmF2 is disposed at a lower position of an on-axis light flux. For this reason, the spherical aberration is hardly corrected in the whole system of the imaging optical system or the whole zoom region. On the other hand, when ct_LGmF2/THGm_B is greater than or equal to the upper limit (1.2) of the condition (13), THGm_B decreases, and LGmF2 is disposed at a lower position of a peripheral light flux. For this reason, flatness of the image surface is hardly secured at the wide-angle end.

At this point, more preferably any one of the following conditions (13a) and (13b) is satisfied.

$$0.15 < ct\_LGmF2/THGm\_B \quad (13a)$$

$$ct\_LGmF2/THGm\_B < 1.0 \quad (13b)$$

These conditions allow the above effects to be more improved.

More preferably any one of the following conditions (13c) and (13d) is satisfied.

$$0.20 < ct\_LGmF2/THGm\_B \quad (13c)$$

$$ct\_LGmF2/THGm\_B < 0.5 \quad (13d)$$

Consequently, the above-described effect is further improved.

Preferably the imaging optical system of the present disclosure satisfies the following condition (14).

$$0.1 < (R1\_LGmF2 + R2\_LGmF1)/(R1\_LGmF2 - R2\_LGmF1) < 4.0 \quad (14)$$

where R2_LGmF1 is a radius of curvature on the image side of LGmF1, and R1_LGmF2 is a radius of curvature on the object side of LGmF2.

That is, the condition (14) defines the relationship between the radius of curvature on the image side of lens element LGmF1, which is the first lens element, from the object side of lens group Gm and the radius of curvature on the object side of lens element LGmF2, which is the second lens element, from the object side of lens group Gm.

When (R1_LGmF2+R2_LGmF1)/(R1_LGmF2−R2_LGmF1) is less than or equal to the lower limit (0.1) of the condition (14), the flatness of the image surface is hardly secured in the whole system of the imaging optical system or the whole zoom region. On the other hand, when (R1_LGmF2+R2_LGmF1)/(R1_LGmF2−R2_LGmF1) is greater than or equal to the upper limit (4.0) of the condition (14), the flatness of the image surface is hardly secured in the whole zoom region.

At this point, more preferably any one of the following conditions (14a) and (14b) is satisfied.

$$4 < (R1\_LGmF2 + R2\_LGmF1)/(R1\_LGmF2 - R2\_LGmF1) \quad (14a)$$

$$(R1\_LGmF2 + R2\_LGmF1)/(R1\_LGmF2 - R2\_LGmF1) < 2.0 \quad (14b)$$

These conditions allow the above-mentioned effects to be more improved.

More preferably any one of the following conditions (14c) and (14d) is satisfied.

$$8 < (R1\_LGmF2 + R2\_LGmF1)/(R1\_LGmF2 - R2\_LGmF1) \quad (14c)$$

$$(R1\_LGmF2 + R2\_LGmF1)/(R1\_LGmF2 - R2\_LGmF1) < 1.6 \quad (14d)$$

Consequently, the above-described effect is further improved.

Preferably the imaging optical system of the present disclosure satisfies the following condition (15).

$$-0.50 < (R1\_LGmR2 + R2\_LGmF1)/(R1\_LGmR2 - R2\_LGmF1) < 1.00 \quad (15)$$

where R2_LGmF1 is a radius of curvature on the image side of LGmF1, and R1_LGmR2 is a radius of curvature on the object side of LGmR2.

That is, the condition (15) defines a relationship between the radius of curvature on the image side of lens element LGmF1, which is the first lens element, from the object side of lens group Gm and the radius of curvature on the object side of lens element LGmR2, which is the second lens element, from the image side of lens group Gm.

When (R1_LGmR2+R2_LGmF1)/(R1_LGmR2−R2_LGmF1) is less than or equal to the lower limit (−0.50) of the condition (15), the flatness of the image surface is hardly secured in the whole system of the imaging optical system or the whole zoom region. On the other hand, when (R1_LGmR2+R2_LGmF1)/(R1_LGmR2−R2_LGmF1) is greater than or equal to the upper limit (1.00) of the condition (15), the flatness of the image surface is hardly secured in the whole zoom region.

At this point, more preferably any one of the following conditions (15a) and (15b) is satisfied.

$$-0.30 < (R1\_LGmR2 + R2\_LGmF1)/(R1\_LGmR2 - R2\_LGmF1) \quad (15a)$$

$$(R1\_LGmR2 + R2\_LGmF1)/(R1\_LGmR2 - R2\_LGmF1) < 0.60 \quad (15b)$$

These conditions allow the above-mentioned effects to be more improved.

More preferably any one of the following conditions (15c) and (15d) is satisfied.

$$-0.05 < (R1\_LGmR2 + R2\_LGmF1)/(R1\_LGmR2 - R2\_LGmF1) \quad (15c)$$

$$(R1\_LGmR2 + R2\_LGmF1)/(R1\_LGmR2 - R2\_LGmF1) < 1.60 \quad (15d)$$

Consequently, the above-described effect is further improved.

In the imaging optical system of the present disclosure, for example, preferably lens group Gf is constructed with one lens element. Consequently, the weight of lens group Gf can be reduced. Thus, high-speed focusing is facilitated during the focusing from the infinity focusing state to the proximity focusing state. The thickness on the optical axis of lens group Gf can be shortened (thinned). Consequently, the imaging optical system can be downsized.

In the imaging optical system of the present disclosure, preferably aperture diaphragm A and lens group Gp move integrally during, for example, the zooming from the wide-angle end to the telephoto end. Consequently, a cam configuration that drives each lens group during the zooming can be reduced. Thus, the configuration of, for example, the lens barrel can be simplified.

At this point, preferably the open aperture diameter of aperture diaphragm A increases at the telephoto end as compared with the wide-angle end or increases at the telephoto end as compared with the intermediate position. Consequently, a movement amount of a diaphragm unit from the wide-angle end to the telephoto end can be decreased. As used herein, the diaphragm unit means a mechanism that moves aperture diaphragm A along the optical axis. In the present exemplary embodiment, the diaphragm unit is a mechanism that moves the lens group moving together with aperture diaphragm A.

Preferably the imaging optical system of the present disclosure has a configuration in which lens group Gf is driven while held on shaft 329 attached to third group frame 313 (corresponding to the frame holding second lens group G2 in the case of the imaging optical system of the sixth exemplary embodiment) holding lens group Gp to be described later. Consequently the cam configuration that drives each lens group during the zooming can be reduced. Thus, the configuration of, for example, the lens barrel can be simplified.

In the imaging optical system of the present disclosure, for example, an actuator that drives aperture diaphragm A, image blur correction lens element LGpR1 disposed in lens group Gp, and lens group Gf that is the focusing lens group may be disposed in a movement frame that moves integrally with lens group Gp. Consequently, a flexible wiring and a board, which supply electricity to the actuator, can be formed integrally. Resultantly the configuration of the lens barrel in which the imaging optical system is accommodated can be simplified.

In a typical imaging optical system, for example, a predetermined clearance is required to drive lens group Gf that is the focusing lens group. Consequently, uneven blur is easily generated by a position error of lens group Gf relative to lens group Gp. In the imaging optical system of the present disclosure, as described later, a relative position adjustment mechanism is provided in lens group Gp (in third group frame 313 (see FIG. 21)). Consequently, the uneven blur caused by the relative position error can be prevented. Alternatively, for example, the relative position adjustment mechanism may be provided in image blur correction lens element LGpR1 having uneven blur sensitivity relative to the focusing lens group. Consequently the generation of the uneven blur can similarly be prevented.

The imaging optical system of each of the first to fifth exemplary embodiments of the present disclosure includes, in order from the object side toward the image side, the first lens group having the positive power, the second lens group having the negative power, the third lens group having the positive power, and the succeeding lens group having at least one type of the power. The third lens group includes at least lens element LGpF1 having the positive power and lens element LGpF2 having the positive power, in order from the object side toward the image side, and includes lens element LGpR1 having the positive power, lens element LGpR2 having the positive power, and lens element LGpR3 having the negative power, in order from the image side toward the object side. One optical surface of lens element LGpR3 and one optical surface of lens element LGpR2 are bonded together. Lens element LGpR1 moves so as to have a component in the direction perpendicular to the optical axis, thereby optically correcting the image blur. During the zooming from the wide-angle end to the telephoto end in the imaging, at least the second lens group and the third lens group move in the optical axis direction such that the distance between the second lens group and the third lens group changes.

With this configuration, generation of an eccentric comatic aberration can be decreased in a bright lens even if lens element LGpR1 located away from the diaphragm is moved so as to have the component in the direction perpendicular to the optical axis during the image blur correction. Consequently, degradation of image performance can be prevented during the image blur correction.

(Schematic Configuration of Imaging Device to which First Exemplary Embodiment is Applied)

A schematic configuration of an imaging device to which the imaging optical system of the first exemplary embodiment is applied will be described below with reference to FIG. 19.

Figure 19:
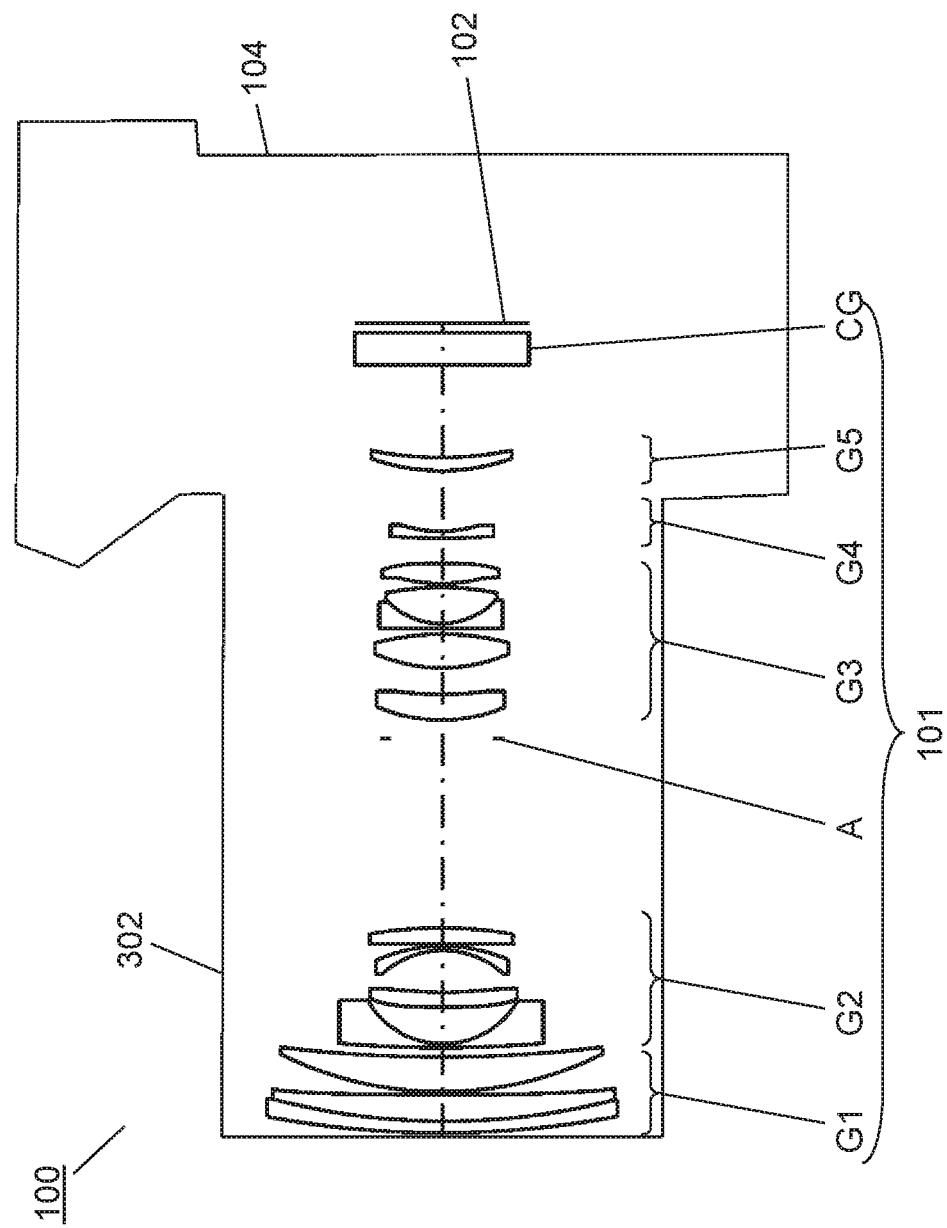
FIG. 19 is a schematic configuration diagram illustrating an imaging device provided with the imaging optical system of the first exemplary embodiment.

FIG. 19 is a schematic configuration diagram illustrating the imaging device provided with the imaging optical system of the first exemplary embodiment. Although an example in which the imaging optical system of the first exemplary embodiment is applied to the imaging device is illustrated in FIG. 19, the similar effect can be obtained in the imaging device to which the imaging optical system of any one of the second to sixth exemplary embodiments is applied.

As illustrated in FIG. 19, imaging device 100 includes casing 104 and lens barrel 302 connected to casing 104. Casing 104 includes imaging element 102. Lens barrel 302 includes imaging optical system 101. Imaging device 100 is exemplified by a digital camera.

Imaging optical system 101 includes, for example, first lens group G1, second lens group G2, third lens group G3, aperture diaphragm A, fourth lens group G4, and fifth lens group G5, and is accommodated in lens barrel 302.

Lens barrel 302 holds each lens group constituting imaging optical system 101 and aperture diaphragm A.

Imaging element 102 is disposed at the position of image plane S in the imaging optical system of the first exemplary embodiment.

Casing 104 includes an actuator and a lens frame. Each lens group constituting imaging optical system 101, aperture diaphragm A, and other components are disposed in the actuator and the lens frame so as to be movable during the zooming.

Imaging device 100 is configured as described above. Consequently, imaging device 100 having good various aberrations can be constructed.

In the above description, the imaging optical system is applied to the digital camera by way of example. However, the imaging optical system is not limited to the digital camera. For example, the imaging optical system may be applied to imaging devices such as a surveillance camera and a smartphone.

(Schematic Configuration of Camera System to which First Exemplary Embodiment is Applied)

A schematic configuration of a camera system to which the imaging optical system of the first exemplary embodiment is applied will be described below with reference to FIG. 20.

Figure 20:
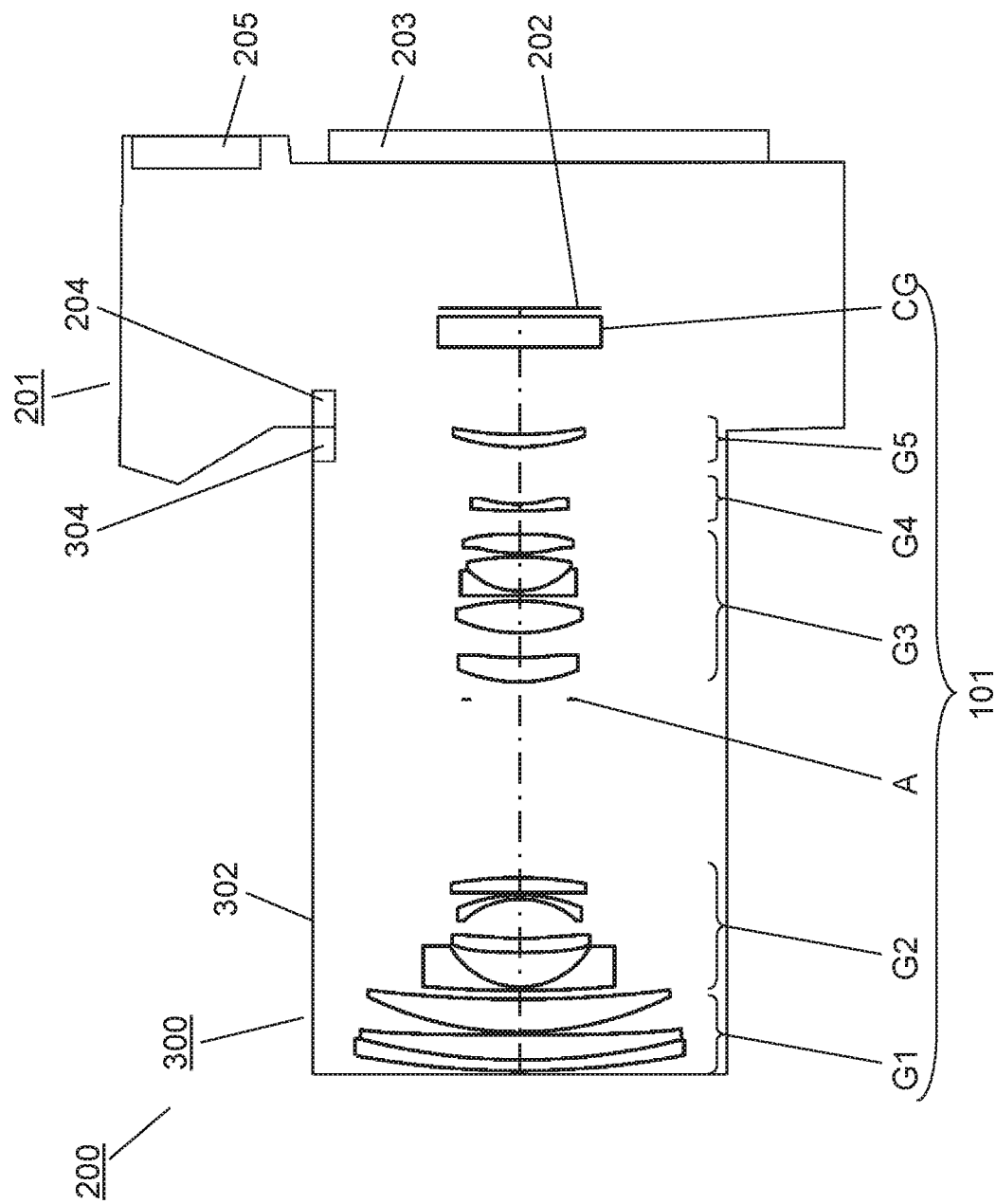
FIG. 20 is a schematic configuration diagram illustrating a camera system provided with the imaging optical system of the first exemplary embodiment.

FIG. 20 is a schematic configuration diagram illustrating the camera system provided with the imaging optical system of the first exemplary embodiment. Although an example in which the imaging optical system of the first exemplary embodiment is applied to the camera system is illustrated in FIG. 20, the similar effect can be obtained in the camera system to which the imaging optical system of any one of the second to sixth exemplary embodiments is applied. Camera system 200 is exemplified by a lens interchangeable digital camera system.

As illustrated in FIG. 20, camera system 200 includes, for example, camera body 201 and interchangeable lens device 300 detachably attached to camera body 201.

Camera body 201 includes imaging element 202, monitor 203, a memory (not illustrated) in which an image signal is stored, camera mount 204, finder 205, and the like. For example, imaging element 202 is constructed with a complementary metal oxide semiconductor (CMOS) image sensor. Imaging element 202 receives an optical image formed by the imaging optical system of interchangeable lens device 300, and converts the optical image into an electric image signal. For example, monitor 203 is constructed with a liquid crystal display (LCD). Monitor 203 displays the image signal converted by imaging element 202.

Interchangeable lens device 300 is provided with imaging optical system 101 including first lens group G1, second lens group G2, aperture diaphragm A, third lens group G3, fourth lens group G4, fifth lens group G5, and the like.

Lens barrel 302 holds each lens group of imaging optical system 101 and aperture diaphragm A. Lens barrel 302 includes lens mount 304 to be connected to camera mount 204 of camera body 201.

Camera mount 204 of camera body 201 and lens mount 304 of lens barrel 302 are physically connected to each other by, for example, a bayonet mechanism. A controller (not illustrated) of camera body 201 and a controller (not illustrated) of interchangeable lens device 300 are electrically connected to each other. That is, camera mount 204 and lens mount 304 function as an interface that can transmit and receive a signal.

Imaging optical system 101 includes, for example, each lens group held in lens barrel 302 of interchangeable lens device 300 and parallel plate CG in camera body 201.

Imaging optical system 101 includes the actuator controlled by the controller and the lens frame. Each lens group constituting imaging optical system 101, aperture diaphragm A, and other components are disposed in the actuator and the lens frame so as to be movable during the zooming.

Camera system 200 is configured as described above. Consequently, camera system 200 having good various aberrations can be achieved.

(Schematic Configuration of Lens Barrel to which First Exemplary Embodiment is Applied) A schematic configuration of a lens barrel to which the imaging optical system of the first exemplary embodiment is applied will be described below with reference to FIG. 21.

Figure 21:
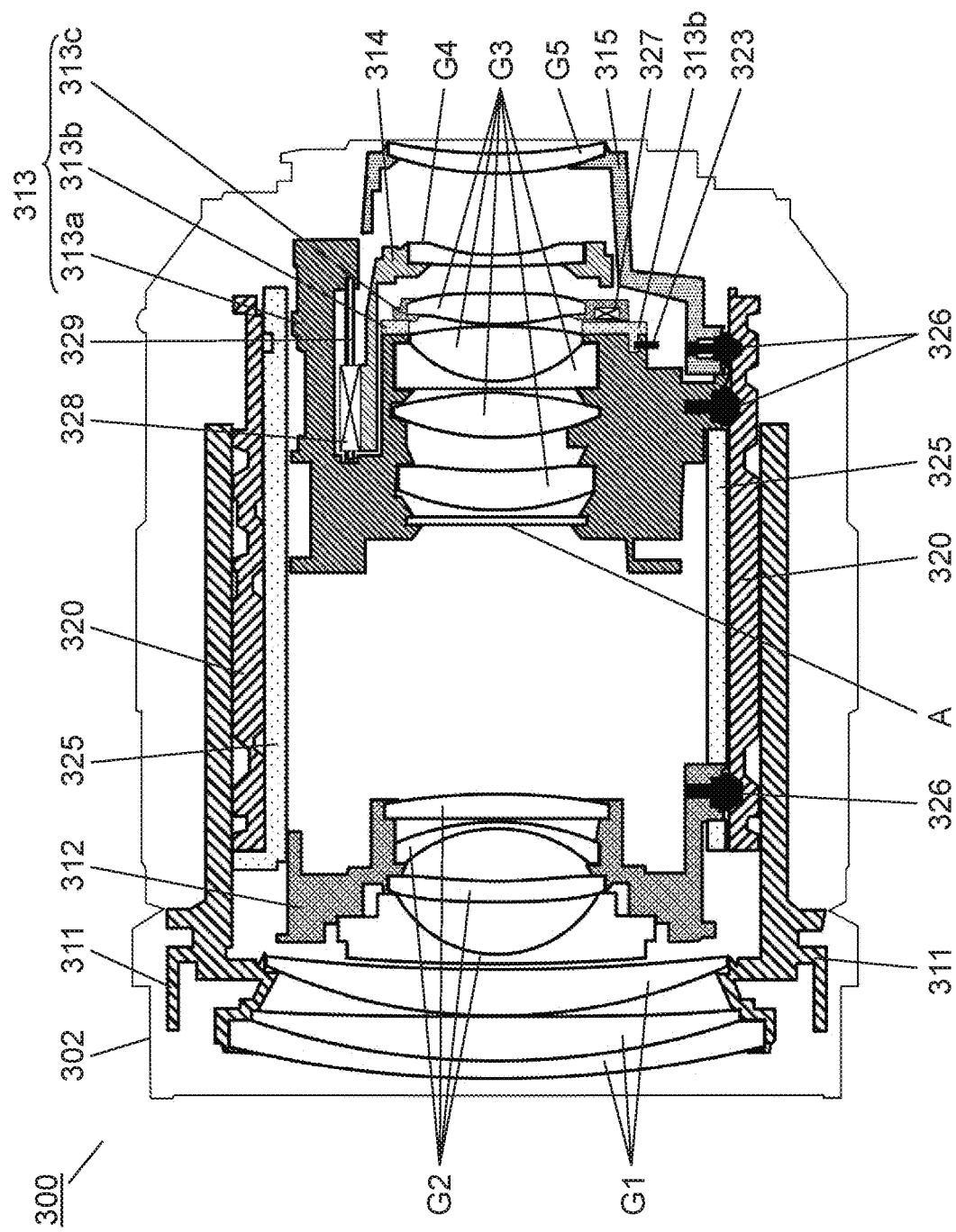
FIG. 21 is a schematic configuration diagram illustrating a lens barrel provided with the imaging optical system of the first exemplary embodiment.

FIG. 21 is a schematic configuration diagram illustrating lens barrel 302 provided with the imaging optical system of the first exemplary embodiment. Although an example in which the imaging optical system of the first exemplary embodiment is applied to the lens barrel is illustrated in FIG. 21, the similar effect can be obtained in the lens barrel to which the imaging optical system of any one of the second to sixth exemplary embodiments is applied. In the case that the imaging optical system of the first exemplary embodiment is applied to the lens barrel of the sixth exemplary embodiment, second lens group G2 to fifth lens group G5 of the first exemplary embodiment correspond to first lens group G1 to fourth lens group G4 in the lens barrel of the sixth exemplary embodiment.

As illustrated in FIG. 21, lens barrel 302 includes first group frame 311, second group frame 312, third group frame 313, fourth group frame 314, and fifth group frame 315, which hold each lens group of the imaging optical system.

First group frame 311 holds first lens group G1. Second group frame 312 holds second lens group G2. Third group frame 313 holds aperture diaphragm A and third lens group G3. Fourth group frame 314 holds fourth lens group G4. Fifth group frame 315 holds fifth lens group G5.

Second group frame 312, third group frame 313, and fifth group frame 315 are engaged with rectilinear fixing frame 325, cam tube 320, and cam pin 326, and move along the optical axis direction. First group frame 311 is engaged with a groove (not illustrated) in an outer peripheral surface of second group frame 312 via a pin (not illustrated) of first group frame 311, and moves along the optical axis direction.

Third group frame 313 includes, for example, actuator 328 and shaft 329. Actuator 328 is controlled by a controller (not illustrated), and drives fourth group frame 314 in the optical axis direction with respect to third group frame 313. Shaft 329 movably holds fourth group frame 314. Consequently, a cam configuration that drives each lens group during the zooming can be reduced. Resultantly, the configuration of lens barrel 302 can be simplified.

Third group frame 313 includes, for example, third group front frame 313a, OIS base frame 313b, OIS frame 313c, and actuator 327. Actuator 327 drives OIS frame 313c in a plane perpendicular to the optical axis with respect to OIS base frame 313b. Third group front frame 313a holds aperture diaphragm A and eighth lens element L8 to eleventh lens element L11. OIS frame 313c holds lens element LGpR1 by which twelfth lens element L12 of third lens group G3 is exemplified. OIS base frame 313b supports OIS frame 313c via a ball (not illustrated) or the like such that OIS frame 313c is movable from a reference position on the plane perpendicular to the optical axis. OIS is an abbreviation form for Optical Image Stabilizer, and indicates an optical image blur correction function.

The controller (not illustrated) controls actuator 327 to move OIS frame 313c holding lens element LGpR1. This enables the image blur correction.

OIS base frame 313b includes the relative position adjustment mechanism as described above. The relative position adjustment mechanism moves OIS base frame 313b in two directions (an X-direction and a Y-direction) perpendicular to the optical axis with respect to third group front frame 313a by stress of eccentric pin 323. Consequently, the relative position of lens element LGpR1 is adjusted based on the reference position. Specifically, during shipping adjustment of lens barrel 302, the relative position of lens element LGpR1 is adjusted by eccentric pin 323, and fixed using an adhesive after the adjustment. Consequently, the uneven blur can be prevented.

Other Exemplary Embodiments

The technique disclosed in the present disclosure is described above with the first to sixth exemplary embodiments as examples.

However, the technique in the present disclosure is not limited to the first to sixth exemplary embodiments, and can also be applied to exemplary embodiments in which changes, replacements, additions, omissions, and the like are made.

In the imaging optical systems of the first to sixth exemplary embodiments, the whole zooming range from the wide-angle end to the telephoto end is used by way of example. However, the whole zooming range is not necessarily used. For example, the range where the optical performance is ensured is cut out according to the desired zooming range, and may be used as the imaging optical system. That is, the imaging optical system whose range where the optical performance is ensured is cut out according to the desired zooming range may be used as the imaging optical system having the magnification lower than that of the imaging optical system described below in the first to sixth numerical examples corresponding to the first to sixth exemplary embodiments. An imaging optical system whose focal distance where the optical performance is ensured is cut out according to the desired zooming position, and may be used as a single-focus imaging optical system.

For example, in the case that the imaging optical system is used as the single-focus imaging optical system, lens group Gm, lens group Gp, and lens group Gf are as follows.

In the case that the imaging optical system is used as the single-focus imaging optical system, in the imaging optical system of any one of the first to sixth exemplary embodiments, lens group Gm (corresponding to second lens group G2 in the first to fifth exemplary embodiments, and corresponding to first lens group G1 in the sixth exemplary embodiment) located on that is closest to the object among the lens groups having the negative power is constructed with lens element LGmF1 having the negative power, lens element LGmF2 having the negative power, both the surfaces of lens element LGmF2 being an aspherical shape, and at least two lens elements having power, in order from the object side toward the image side. Lens element LGmF1 described above is the lens element having the strongest power among the lens elements located on the object side with respect to aperture diaphragm A. That is, lens element LGmF1 located on that is closest to the object in lens group Gm is the lens element having the strongest negative power among the lens elements located on the object side with respect to aperture diaphragm A.

In the case that the imaging optical system is used as the single-focus imaging optical system, in the imaging optical system of any one of the first to sixth exemplary embodiments, lens group Gp described above is the lens group (corresponding to third lens group G3 in the first to fifth exemplary embodiments, and corresponding to second lens group G2 in the sixth exemplary embodiment) having the positive power and located on the image side of lens group Gm. Lens group Gp includes lens element LGpF1 having the positive power and lens element LGpF2 having the positive power, in order from the object side toward the image side.

Aperture diaphragm A is provided on any one of the object side and the image side of lens element LGpF1 described above. That is, lens group Gp is (i) aperture diaphragm A, lens element LGpF1 having the positive power, and lens element LGpF2 having the positive power, or (ii) lens element LGpF1 having the positive power, aperture diaphragm A, and lens element LGpF2 having the positive power, in order from the object side toward the image side.

In the case that the imaging optical system is used as the single-focus imaging optical system, in the imaging optical system of any one of the first to sixth exemplary embodiments, lens group Gf described above is the lens group (corresponding to fourth lens group G4 in the first to fifth exemplary embodiments, and corresponding to third lens group G3 in the sixth exemplary embodiment) having the negative power and located on the image side of lens group Gf. Lens group Gf is the lens group that moves in the optical axis direction during the focusing from the infinity focusing state to the proximity focusing state. That is, in the single-focus imaging optical system, during the focusing, lens group Gp does not move in the optical axis direction, but lens group Gf moves in the optical axis direction.

In the imaging optical system of any one of the first to sixth exemplary embodiments, by way of example, the image blur correction lens element is moved in the direction perpendicular to the optical axis to perform the image blur correction, but the configuration is not limited thereto. That is, any movement system having the component in the direction perpendicular to the optical axis can correct the image blur. Therefore, for example, when complication of the lens barrel structure is permitted, the image blur correction may be performed while the image blur correction lens element is turned so as to have a turning center on the optical axis.

In the first to sixth exemplary embodiments, by way of example, each lens group constituting the imaging optical system is constructed only with the refraction type lens element that deflects the incident light beam by the refraction (that is, a lens element in which the deflection is performed at an interface between mediums having different refractive indexes), but the configuration is not limited thereto. For example, each lens group may be constructed with a diffraction type lens element that deflects the incident light beam by diffraction or a refraction-diffraction hybrid type lens element that deflects the incident light beam by a combination of the refraction and the diffraction. Alternatively, each lens group may be constructed with, for example, a refractive index distribution type lens element that deflects the incident light beam by a refractive index distribution in the medium. In particular, in the refraction-diffraction hybrid type lens element, more preferably wavelength dependence of diffraction efficiency is improved when a diffraction structure is formed at the interface between the mediums having different refractive indexes. Consequently, the camera system having good various aberrations can be constructed.

Numerical Examples

Numerical examples specifically performed in the configuration of the imaging optical system of any one of the first to sixth exemplary embodiments will be described below with reference to FIGS. 2, 3, 5, 6, 8, 9, 11, 12, 14, 15, 17, and 18.

In each numerical example, a unit of the length is (mm), and a unit of the view angle is (degrees) in Table. In each numerical example, r is a radius of curvature, d is an interplanar spacing, nd is a refractive index to the d line, and vd is an Abbe number to the d line. In each numerical example, a surface denoted by an asterisk * is an aspherical surface. The aspherical shape is defined by the following equation. In each numerical example, a diaphragm diameter is an open aperture diameter that is effective at each zoom position.

$$Z = \frac{h^2/r}{1 + \sqrt{1 - (1+\kappa)(h/r)^2}} + \Sigma A_n h^n \quad \text{[Mathematical Formula 1]}$$

where Z is a distance from a point on the aspherical surface having height h from the optical axis to a tangential plane at a peak of the aspherical surface, h is a height from the optical axis, r is a radius of curvature at the peak, K is a conic constant, and An is an aspherical coefficient of n-th order.

FIGS. 2, 5, 8, 11, 14, and 17 are views each illustrating a longitudinal aberration in the infinity focusing state of the imaging optical system according to any one of first to sixth numerical examples corresponding to the first to sixth exemplary embodiments.

In FIGS. 2, 5, 8, 11, 14, and 17, part (a) illustrates the longitudinal aberration at the wide-angle end, part (b) illustrates the longitudinal aberration at the intermediate position, and part (c) illustrates the longitudinal aberration at the telephoto end. Parts (a) to (c) of FIGS. 2, 5, 8, 11, 14, and 17 illustrate spherical aberration (SA) (mm), astigmatism (AST) (mm), and distortion (DIS) (%) in order from the left, respectively.

In the view of the SA, a vertical axis indicates an F number (denoted by "F"), a solid line indicates a characteristic with respect to the d-line, a short broken line indicates a characteristic with respect to the F-line, and a long broken line indicates a characteristic with respect to the C-line. In the view of the AST, the vertical axis indicates an imaged height (denoted by "H"), the solid line indicates a characteristic with respect to a sagittal plane (denoted by "s"), and the broken line indicates a characteristic with respect to a meridional plane (denoted by "m"). In the view of the DIS, the vertical axis indicates the imaged height (denoted by "H").

FIGS. 3, 6, 9, 12, 15, and 18 are views each illustrating a lateral aberration at the telephoto end of the imaging optical system of any one of the first to sixth numerical examples corresponding to the first to sixth exemplary embodiments.

Parts (a) to (c) of each lateral aberration diagram illustrate a characteristic in the basic state in which the image blur correction is not performed at the telephoto end. Parts (d) to (f) of each lateral aberration diagram illustrate a characteristic in the image blur correction state in which the image blur correction lens group is moved in the direction perpendicular to the optical axis by a predetermined amount at the telephoto end.

In the basic state of each lateral aberration diagram, part (a) illustrates a characteristic corresponding to the lateral aberration at an image point of 70% of the maximum imaged height, part (b) illustrates a characteristic corresponding to the lateral aberration at an axial image point, and part (c) illustrates a characteristic corresponding to the lateral aberration at the image point of −70% of the maximum imaged height. Similarly, in the image blur correction state of each lateral aberration diagram, part (d) illustrates a characteristic corresponding to the lateral aberration at an image point of 70% of the maximum imaged height, part (e) illustrates a characteristic corresponding to the lateral aberration at an axial image point, and part (0 illustrates a characteristic corresponding to the lateral aberration at the image point of −70% of the maximum imaged height.

In each lateral aberration diagram, a horizontal axis indicates a distance from a principal light beam on a pupil surface, the solid line indicates the characteristic with respect to the d-line, the short broken line indicates the characteristic with respect to the F-line, and the long broken line indicates the characteristic with respect to the C-line. In each lateral aberration diagram, a plane including the optical axis of first lens group G1 and the optical axis of lens element LGpR1 is used as the meridional plane.

For the imaging optical system of each numerical example, the movement amount in the direction perpendicular to the optical axis of the image blur correction lens group in the image blur correction state at the telephoto end is indicated as follows.

| First numerical example | 0.261 mm |
| Second numerical example | 0.251 mm |
| Third numerical example | 0.241 mm |
| Fourth numerical example | 0.238 mm |
| Fifth numerical example | 0.247 mm |
| Sixth numerical example | 0.168 mm |

At the telephoto end where the imaging distance is infinite, an image eccentric amount for the imaging optical system having the inclination of 0.4 degrees is equal to an image eccentric amount for translation of the image blur correction lens group in the direction perpendicular to the optical axis by the above value.

In the above state, as can be seen from the lateral aberration diagrams of parts (b), (e) in FIGS. 3, 6, 9, 12, 15, and 18, symmetry of the lateral aberration is good at the axial image point.

When the lateral aberration at the image point of +70% in the basic state illustrated in parts (a) of FIGS. 3, 6, 9, 12, 15, and 18 is compared to the lateral aberration at the image point of −70% in the basic state illustrated in parts (c) of FIGS. 3, 6, 9, 12, 15, and 18, the curvature is small, and the aberration curve has the substantially identical inclination. Thus, it is shown that an eccentric coma aberration and an eccentric astigmatism are small. The above result means that imaging performance is sufficiently obtained even in the image blur correction state.

For the identical image blur correction angle of the imaging optical system, a translation amount necessary for the image blur correction decreases with decreasing focal distance of the whole imaging optical system. That is, at any zoom position, it is shown that the sufficient image blur correction can be performed without decreasing the imaging performance with respect to the image blur correction angle of about 0.4 degrees.

First Numerical Example

A first numerical example of the imaging optical system corresponding to the first exemplary embodiment in FIG. 1 will be described below. Specifically as the first numerical example, surface data is indicated in (Table 1), aspherical data is indicated in (Table 2), and various pieces of data in the infinity focusing state are indicated in (Table 3A) to (Table 3D).

TABLE 1 surface data

| Surface number | r | d | nd | vd | Effective diameter |
|---|---|---|---|---|---|
| Object surface | ∞ | | | | |
| 1 | 140.11690 | 1.50000 | 1.71736 | 29.5 | 22.053 |
| 2 | 76.07590 | 4.19500 | 1.59349 | 67.0 | 21.549 |
| 3 | 870.25920 | 0.20000 | | | 21.326 |
| 4 | 50.70040 | 4.29880 | 1.61800 | 63.4 | 20.334 |
| 5 | 160.51860 | variable | | | 19.935 |
| 6 | 135.90400 | 0.90000 | 1.80420 | 46.5 | 12.421 |
| 7 | 10.93990 | 4.53860 | | | 9.444 |
| 8* | 65.33210 | 2.00000 | 1.80569 | 40.5 | 9.072 |
| 9* | 46.69250 | 5.42140 | | | 8.621 |
| 10 | −12.88280 | 0.75000 | 1.59282 | 68.6 | 8.089 |
| 11 | −22.48820 | 0.20000 | | | 8.348 |
| 12 | 45835.44100 | 2.04130 | 1.92286 | 20.9 | 8.299 |
| 13 | −47.05830 | variable | | | 8.356 |
| 14 (diaphragm) | ∞ | 2.30000 | | | CIR |
| 15* | 21.31170 | 3.72080 | 1.68823 | 31.1 | 7.716 |
| 16* | 68.99660 | 3.26220 | | | 7.892 |

TABLE 1-continued surface data

| Surface number | r | d | nd | vd | Effective diameter |
|---|---|---|---|---|---|
| 17 | 22.95640 | 4.20000 | 1.60801 | 46.2 | 7.998 |
| 18 | −38.47340 | 0.50000 | | | 7.793 |
| 19 | 198.78810 | 0.70000 | 2.00100 | 29.1 | 7.341 |
| 20 | 11.35080 | 4.90930 | 1.49700 | 81.6 | 6.856 |
| 21 | −80.59180 | 0.40000 | | | 6.909 |
| 22* | 28.66730 | 3.02830 | 1.55332 | 71.7 | 6.902 |
| 23* | −55.74090 | variable | | | 6.822 |
| 24* | 90.87910 | 1.00000 | 1.80569 | 40.5 | 6.047 |
| 25* | 19.35050 | variable | | | 6.005 |
| 26 | 28.78550 | 1.74580 | 1.92286 | 20.9 | 8.891 |
| 27 | 46.76110 | variable | | | 8.825 |
| 28 | ∞ | 4.20000 | 1.51680 | 64.2 | |
| 29 | ∞ | 1.00000 | | | |
| 30 | ∞ | BF | | | |
| Image surface | ∞ | | | | |

TABLE 2 aspherical data

Eighth surface

K = −3.53047E+00, A4 = 6.22293E−05, A6 = 2.99860E−07, A8 = −8.88228E−09
A10 = 2.33260E−10, A12 = −2.42110E−12, A14 = 1.08796E−14

Ninth surface

K = 0.00000E+00, A4 = 1.94271E−05, A6 = −1.64209E−07, A8 = 1.65145E−09
A10 = −7.38961E−12, A12 = 0.00000E+00, A14 = 0.00000E+00

Fifteenth surface

K = 0.00000E+00, A4 = −2.67495E−05, A6 = −4.32483E−07, A8 = 2.73657E−09
A10 = −1.48711E−10, A12 = 1.84758E−12, A14 = −8.18122E−15

Sixteenth surface

K = 0.00000E+00, A4 = 1.05076E−06, A6 = −4.17305E−07, A8 = −1.42321E−09
A10 = −2.80039E−11, A12 = 3.65868E−13, A14 = −3.35745E−16

Twenty-second surface

K = 4.53865E+00, A4 = −4.16794E−05, A6 = −9.89240E−07, A8 = 8.02776E−09
A10 = −2.75765E−10, A12 = 1.40896E−12, A14 = 0.00000E+00

Twenty-third surface

K = 0.00000E+00, A4 = −6.82010E−06, A6 = −1.14308E−06, A8 = 1.27628E−08
A10 = −2.59262E−10, A12 = 1.03955E−12, A14 = 0.00000E+00

Twenty-fourth surface

K = 0.00000E+00, A4 = 7.88246E−05, A6 = −2.82183E−06, A8 = 5.80673E−08
A10 = −5.12763E−10, A12 = 0.00000E+00, A14 = 0.00000E+00

Twenty-fifth surface

K = 0.00000E+00, A4 = 7.98435E−05, A6 = −2.79673E−06, A8 = 5.68685E−08
A10 = −5.36803E−10, A12 = 0.00000E+00, A14 = 0.00000E+00

(Various Pieces of Data in Infinity Focusing State)

TABLE 3A various pieces of data
Zoom ratio 4.63436

| | Wide angle | Intermediate | Telephoto |
|---|---|---|---|
| Focal distance | 12.4680 | 26.8405 | 57.7811 |
| F number | 2.92249 | 3.63149 | 4.11990 |
| Angle of view | 41.7785 | 21.8341 | 10.5494 |
| Imaged height | 10.0000 | 10.8150 | 10.8150 |
| Lens total length | 104.2337 | 111.6470 | 139.3998 |
| BF | 0.02537 | 0.03639 | −0.05336 |
| Diaphragm diameter CIR | 6.4200 | 6.4200 | 6.9760 |
| d5 | 0.5517 | 13.9307 | 33.6892 |
| d13 | 24.2114 | 7.1726 | 0.2000 |
| d23 | 2.7529 | 3.6118 | 2.9434 |
| d25 | 7.7397 | 7.5145 | 13.9936 |
| d27 | 11.9411 | 22.3695 | 31.6155 |
| Entrance pupil position | 21.1681 | 41.4264 | 96.0134 |
| Exit pupil position | −48.6220 | −59.0024 | −82.1297 |
| Front-side principal point position | 30.4406 | 56.0645 | 113.1170 |
| Rear-side principal point position | 91.7657 | 84.8065 | 81.6188 |

TABLE 3B single lens data

| Lens | Start surface | Focal distance |
|---|---|---|
| 1 | 1 | −234.3216 |
| 2 | 2 | 140.1864 |
| 3 | 4 | 118.1490 |
| 4 | 6 | −14.8420 |
| 5 | 8 | −213.3427 |
| 6 | 10 | −52.4000 |
| 7 | 12 | 50.9406 |
| 8 | 15 | 43.4242 |
| 9 | 17 | 24.2743 |
| 10 | 19 | −12.0486 |
| 11 | 20 | 20.3805 |

TABLE 3B-continued single lens data

| Lens | Start surface | Focal distance |
|---|---|---|
| 12 | 22 | 34.6566 |
| 13 | 24 | −30.7064 |
| 14 | 26 | 77.5271 |

TABLE 3C zoom lens group data

| Group | Start surface | Focal distance | Lens configuration length | Front-side principal point position | Rear-side principal point position |
|---|---|---|---|---|---|
| 1 | 1 | 89.29874 | 10.19380 | 1.54681 | 5.40022 |
| 2 | 6 | −14.54016 | 15.85130 | 0.19655 | 1.68770 |
| 3 | 14 | 20.06561 | 23.02060 | 9.64984 | 12.65650 |
| 4 | 24 | −30.70636 | 1.00000 | 0.70804 | 1.15076 |
| 5 | 26 | 77.52709 | 1.74580 | −1.38916 | −0.51084 |

TABLE 3D (zoom lens group magnification)

| Group | Start surface | Wide angle | Intermediate | Telephoto |
|---|---|---|---|---|
| 1 | 1 | 0.00000 | 0.00000 | 0.00000 |
| 2 | 6 | −0.21007 | −0.26040 | −0.40301 |
| 3 | 14 | −0.44048 | −0.68608 | −0.82413 |
| 4 | 24 | 1.96492 | 2.65669 | 3.78171 |
| 5 | 26 | 0.76793 | 0.63327 | 0.51517 |

Second Numerical Example

A second numerical example of the imaging optical system corresponding to the second exemplary embodiment in FIG. 4 will be described below. Specifically, as the second numerical example, the surface data is indicated in (Table 4), the aspherical data is indicated in (Table 5), and various pieces of data in the infinity focusing state are indicated in (Table 6A) to (Table 6D).

TABLE 4

(surface data)

| Surface number | r | d | nd | vd | Effective diameter |
|---|---|---|---|---|---|
| Object surface | ∞ | | | | |
| 1 | 124.29370 | 1.50000 | 1.71736 | 29.5 | 22.056 |
| 2 | 71.39080 | 4.13830 | 1.59349 | 67.0 | 21.531 |
| 3 | 632.35390 | 0.20000 | | | 21.326 |
| 4 | 52.37380 | 4.05700 | 1.61800 | 63.4 | 20.362 |
| 5 | 161.14700 | variable | | | 19.996 |
| 6 | 126.65120 | 0.90000 | 1.81139 | 43.9 | 12.414 |
| 7 | 11.15910 | 4.63130 | | | 9.444 |
| 8* | 121.16680 | 2.00000 | 1.61014 | 51.7 | 9.104 |
| 9* | 62.41230 | 5.31500 | | | 8.663 |
| 10 | −12.98050 | 0.75000 | 1.59282 | 68.6 | 8.082 |
| 11 | −24.07450 | 0.20000 | | | 8.336 |
| 12 | −669.40520 | 1.94950 | 1.92286 | 20.9 | 8.299 |
| 13 | −42.12300 | variable | | | 8.359 |
| 14 (diaphragm) | ∞ | 2.30000 | | | CIR |
| 15* | 21.24200 | 3.45900 | 1.68108 | 30.3 | 7.696 |
| 16* | 72.46610 | 3.90780 | | | 7.892 |
| 17 | 23.49350 | 4.20000 | 1.60930 | 48.9 | 7.951 |
| 18 | −39.35450 | 0.50000 | | | 7.738 |

TABLE 4-continued (surface data)

| Surface number | r | d | nd | vd | Effective diameter |
|---|---|---|---|---|---|
| 19 | 183.99350 | 0.70000 | 2.00100 | 29.1 | 7.301 |
| 20 | 11.42070 | 4.84830 | 1.49700 | 81.6 | 6.827 |
| 21 | −117.66870 | 0.40000 | | | 6.876 |
| 22* | 27.34430 | 3.08870 | 1.55332 | 71.7 | 6.883 |
| 23* | −56.77580 | variable | | | 6.806 |
| 24* | 83.90820 | 1.00000 | 1.80569 | 40.5 | 6.047 |
| 25* | 19.60440 | variable | | | 6.005 |
| 26 | 27.82830 | 1.72390 | 1.92286 | 20.9 | 8.847 |
| 27 | 43.00850 | variable | | | 8.772 |
| 28 | ∞ | 4.20000 | 1.51680 | 64.2 | |
| 29 | ∞ | 1.00000 | | | |
| 30 | ∞ | BF | | | |
| Image surface | ∞ | | | | |

TABLE 5

(aspherical data)

Eighth surface

K = 1.99619E+01, A4 = 8.16048E−05, A6 = 2.89057E−07,
A8 = −1.08616E−08 A10 = 2.61262E−10, A12 = −2.55306E−12,
A14 = 1.14365E−14

Ninth surface

K = 0.00000E+00, A4 = 3.11163E−05, A6 = −2.19578E−07,
A8 = −1.55407E−10 A10 = 1.05741E−11, A12 = 0.00000E+00,
A14 = 0.00000E+00

Fifteenth surface

K = 0.00000E+00, A4 = −2.34791E−05, A6 = −4.08367E−07,
A8 = 2.79647E−09 A10 = −1.51738E−10, A12 = 1.81493E−12,
A14 = −7.70176E−15

Sixteenth surface

K = 0.00000E+00, A4 = 3.44835E−06, A6 = −3.80576E−07,
A8 = −1.58733E−09 A10 = −3.09439E−11, A12 = 3.61840E−13,
A14 = −2.32930E−16

Twenty-second surface

K = 4.53865E+00, A4 = −4.47754E−05, A6 = −9.96447E−07,
A8 = 7.51677E−09 A10 = −2.87320E−10, A12 = 1.39416E−12,
A14 = 0.00000E+00

Twenty-third surface

K = 0.00000E+00, A4 = −4.90719E−06, A6 = −1.13060E−06,
A8 = 1.19488E−08 A10 = −2.70152E−10, A12 = 1.15917E−12,
A14 = 0.00000E+00

Twenty-fourth surface

K = 0.00000E+00, A4 = 8.14258E−05, A6 = −2.77854E−06,
A8 = 5.53028E−08 A10 = −4.71780E−10, A12 = 0.00000E+00,
A14 = 0.00000E+00

Twenty-fifth surface

K = 0.00000E+00, A4 = 8.29983E−05, A6 = −2.77231E−06,
A8 = 5.52907E−08 A10 = −5.06872E−10, A12 = 0.00000E+00,
A14 = 0.00000E+00

(Various Pieces of Data in Infinity Focusing State)

TABLE 6A (various pieces of data)
Zoom ratio 4.63425

| | Wide angle | Intermediate | Telephoto |
|---|---|---|---|
| Focal distance | 12.4680 | 26.8404 | 57.7799 |
| F number | 2.93525 | 3.66517 | 4.17097 |

TABLE 6A-continued (various pieces of data)
Zoom ratio 4.63425

|  | Wide angle | Intermediate | Telephoto |
|---|---|---|---|
| View angle | 41.7771 | 21.8739 | 10.5657 |
| Imaged height | 10.0000 | 10.8150 | 10.8150 |
| Lens total length | 104.6901 | 111.6259 | 139.7981 |
| BF | 0.02840 | 0.03794 | −0.05211 |
| Diaphragm diameter CIR | 6.4200 | 6.4200 | 6.9760 |
| d5 | 0.5000 | 13.4597 | 33.4122 |
| d13 | 24.8413 | 7.3143 | 0.2000 |
| d23 | 2.7577 | 3.6743 | 2.7577 |
| d25 | 7.6858 | 8.1093 | 14.1751 |
| d27 | 11.9081 | 22.0616 | 32.3364 |
| Entrance pupil position | 21.0668 | 40.2846 | 94.0042 |
| Exit pupil position | −48.8299 | −60.2145 | −83.1409 |
| Front-side principal point position | 30.3531 | 55.1685 | 111.6040 |
| Rear-side principal point position | 92.2221 | 84.7856 | 82.0181 |

TABLE 6B (single lens data)

| Lens | Start surface | Focal distance |
|---|---|---|
| 1 | 1 | −236.6187 |
| 2 | 2 | 135.2262 |
| 3 | 4 | 123.7896 |
| 4 | 6 | −15.1347 |
| 5 | 8 | −213.7098 |
| 6 | 10 | −48.7418 |
| 7 | 12 | 48.6365 |
| 8 | 15 | 42.9470 |
| 9 | 17 | 24.7712 |
| 10 | 19 | −12.1890 |
| 11 | 20 | 21.2109 |
| 12 | 22 | 33.7966 |
| 13 | 24 | −31.9727 |
| 14 | 26 | 81.0177 |

TABLE 6C (zoom lens group lens)

| Group | Start surface | Focal distance | Lens configuration length | Front-side principal point position | Rear-side principal point position |
|---|---|---|---|---|---|
| 1 | 1 | 90.09953 | 9.89530 | 1.37419 | 5.11054 |
| 2 | 6 | −14.76907 | 15.74580 | 0.14968 | 1.40517 |
| 3 | 14 | 20.47151 | 23.40380 | 9.90177 | 12.69126 |
| 4 | 24 | −31.97271 | 1.00000 | 0.72770 | 1.17002 |
| 5 | 26 | 81.01766 | 1.72390 | −1.55857 | −0.68486 |

TABLE 6D (zoom lens group magnification)

| Group | Start surface | Wide angle | Intermediate | Telephoto |
|---|---|---|---|---|
| 1 | 1 | 0.00000 | 0.00000 | 0.00000 |
| 2 | 6 | −0.21130 | −0.25940 | −0.39934 |
| 3 | 14 | −0.44023 | −0.68962 | −0.83090 |
| 4 | 24 | 1.91603 | 2.55818 | 3.67950 |
| 5 | 26 | 0.77642 | 0.65097 | 0.52526 |

Third Numerical Example

A third numerical example of the imaging optical system corresponding to the third exemplary embodiment in FIG. 7 will be described below. Specifically as the third numerical example, surface data is indicated in (Table 7), aspherical data is indicated in (Table 8), and various pieces of data in the infinity focusing state are indicated in (Table 9A) to (Table 9D).

TABLE 7

(surface data)

| Surface number | r | d | nd | vd | Effective diameter |
|---|---|---|---|---|---|
| Object surface | ∞ | | | | |
| 1 | 115.93830 | 1.50000 | 1.71736 | 29.5 | 21.648 |
| 2 | 67.86520 | 4.13480 | 1.59349 | 67.0 | 21.115 |
| 3 | 449.55820 | 0.20000 | | | 20.892 |
| 4 | 51.90540 | 4.09710 | 1.61800 | 63.4 | 19.995 |
| 5 | 166.74500 | variable | | | 19.612 |
| 6 | 100.55570 | 0.90000 | 1.85011 | 42.1 | 12.213 |
| 7 | 11.17920 | 4.61930 | | | 9.411 |
| 8* | 303.64950 | 2.00000 | 1.51760 | 63.5 | 9.021 |
| 9* | 79.13580 | 5.09900 | | | 8.592 |
| 10 | −12.31560 | 0.75000 | 1.59282 | 68.6 | 8.033 |
| 11 | −23.36210 | 0.20000 | | | 8.337 |
| 12 | −219.80790 | 1.96040 | 1.92286 | 20.9 | 8.333 |
| 13 | −36.34040 | variable | | | 8.417 |
| 14 (diaphragm) | ∞ | 2.30000 | | | CIR |
| 15* | 20.87890 | 2.45690 | 1.68893 | 31.1 | 7.863 |
| 16* | 107.85230 | 5.04170 | | | 7.961 |
| 17 | 26.65580 | 4.20000 | 1.62691 | 43.7 | 7.970 |
| 18 | −32.31080 | 0.50000 | | | 7.759 |
| 19 | −109.19700 | 0.70000 | 1.99522 | 27.4 | 7.332 |
| 20 | 12.39460 | 4.87970 | 1.49700 | 81.6 | 6.929 |
| 21 | −64.34830 | 0.40000 | | | 7.042 |
| 22* | 29.08590 | 3.10000 | 1.58699 | 59.5 | 7.098 |
| 23* | −55.77130 | variable | | | 7.093 |
| 24* | 150.04690 | 1.00000 | 1.80569 | 40.5 | 6.290 |
| 25* | 22.53300 | variable | | | 6.248 |
| 26 | 29.90380 | 1.73940 | 1.92286 | 20.9 | 8.906 |
| 27 | 49.69340 | variable | | | 8.844 |
| 28 | ∞ | 4.20000 | 1.51680 | 64.2 | |
| 29 | ∞ | 1.00000 | | | |
| 30 | ∞ | BF | | | |
| Image surface | ∞ | | | | |

TABLE 8

(aspherical data)

Eighth surface

K = 0.00000E+00, A4 = 8.41481E−05, A6 = 4.06802E−07,
A8 = −1.48458E−08 A10 = 3.48510E−10, A12 = −3.58432E−12,
A14 = 1.73908E−14
Ninth surface K = 0.00000E+00, A4 = 1.95072E−05, A6 = −1.21165E−07,
A8 = −3.89838E−09 A10 = 3.97125E−11, A12 = 0.00000E+00,
A14 = 0.00000E+00
Fifteenth surface K = 0.00000E+00, A4 = −1.26441E−06, A6 = −2.18351E−07,
A8 = 2.23556E−09 A10 = −1.25056E−10, A12 = 1.29159E−12,
A14 = −6.59727E−15
Sixteenth surface K = 0.00000E+00, A4 = 2.75736E−05, A6 = −1.69569E−07,
A8 = −8.34041E−10 A10 = −3.86512E−11, A12 = 9.87915E−14,
A14 = 5.15723E−17

TABLE 8-continued (aspherical data)

Twenty-second surface

K = 4.53865E+00, A4 = −4.14226E−05, A6 = −8.91467E−07,
A8 = 7.58704E−09 A10 = −2.22320E−10, A12 = 6.82602E−13,
A14 = 0.00000E+00

Twenty-third surface

K = 0.00000E+00, A4 = −7.95010E−06, A6 = −9.49523E−07,
A8 = 1.05037E−08 A10 = −2.31190E−10, A12 = 8.31223E−13,
A14 = 0.00000E+00

Twenty-fourth surface

K = 0.00000E+00, A4 = 1.08170E−04, A6 = −2.53610E−06,
A8 = 3.93661E−08 A10 = −2.89378E−10, A12 = 0.00000E+00,
A14 = 0.00000E+00

Twenty-fifth surface

K = 0.00000E+00, A4 = 1.13589E−04, A6 = −2.54770E−06,
A8 = 3.92112E−08 A10 = −3.05452E−10, A12 = 0.00000E+00,
A14 = 0.00000E+00

(Various Pieces of Data in Infinity Focusing State)

TABLE 9A (various pieces of data)
Zoom ratio 4.63422

| | Wide angle | Intermediate | Telephoto |
|---|---|---|---|
| Focal distance | 12.4681 | 26.8404 | 57.7798 |
| F number | 2.92793 | 3.65313 | 4.14126 |
| View angle | 41.7664 | 21.9171 | 10.5545 |
| Imaged height | 10.0000 | 10.8150 | 10.8150 |
| Lens total length | 105.0295 | 111.9287 | 140.7183 |
| BF | 0.02802 | 0.03775 | −0.04650 |
| Diaphragm diameter CIR | 6.5250 | 6.5250 | 7.0620 |
| d5 | 0.5000 | 12.8474 | 33.0442 |
| d13 | 24.5675 | 7.0402 | 0.2000 |
| d23 | 3.0816 | 4.1000 | 3.0816 |
| d25 | 8.1182 | 7.8779 | 13.3915 |
| d27 | 11.7559 | 23.0472 | 34.0692 |
| Entrance pupil position | 20.8380 | 38.9845 | 93.7145 |
| Exit pupil position | −52.0710 | −63.3446 | −86.5003 |
| Front-side principal point position | 30.3222 | 54.4588 | 112.8782 |
| Rear-side principal point position | 92.5614 | 85.0884 | 82.9385 |

TABLE 9B (single lens data)

| Lens | Start surface | Focal distance |
|---|---|---|
| 1 | 1 | −231.1705 |
| 2 | 2 | 134.1388 |
| 3 | 4 | 120.3119 |
| 4 | 6 | −14.8638 |
| 5 | 8 | −207.4109 |
| 6 | 10 | −45.0747 |
| 7 | 12 | 46.9371 |
| 8 | 15 | 37.1534 |
| 9 | 17 | 23.9561 |
| 10 | 19 | −11.1526 |
| 11 | 20 | 21.3621 |
| 12 | 22 | 33.0130 |
| 13 | 24 | −33.0252 |
| 14 | 26 | 78.0742 |

TABLE 9C (zoom lens group data)

| Group | Start surface | Focal distance | Lens configuration length | Front-side principal point position | Rear-side principal point position |
|---|---|---|---|---|---|
| 1 | 1 | 88.72878 | 9.93190 | 1.32319 | 5.07192 |
| 2 | 6 | −14.31899 | 15.52870 | 0.18072 | 1.34116 |
| 3 | 14 | 20.96489 | 23.57830 | 10.41456 | 12.31310 |
| 4 | 24 | −33.02517 | 1.00000 | 0.65396 | 1.09821 |
| 5 | 26 | 78.07423 | 1.73940 | −1.31159 | −0.44016 |

TABLE 9D (zoom lens group magnification)

| Group | Start surface | Wide angle | Intermediate | Telephoto |
|---|---|---|---|---|
| 1 | 1 | 0.00000 | 0.00000 | 0.00000 |
| 2 | 6 | −0.20792 | −0.25334 | −0.39419 |
| 3 | 14 | −0.46076 | −0.73243 | −0.88085 |
| 4 | 24 | 1.89786 | 2.59546 | 3.84280 |
| 5 | 26 | 0.77288 | 0.62813 | 0.48804 |

Fourth Numerical Example

A fourth numerical example of the imaging optical system corresponding to the fourth exemplary embodiment in FIG. 10 will be described below. Specifically, as the fourth numerical example, surface data is indicated in (Table 10), aspherical data is indicated in (Table 11), and various pieces of data in the infinity focusing state are indicated in (Table 12A) to (Table 12D).

TABLE 10

(surface data)
Surface data

| Surface number | r | d | nd | vd | Effective diameter |
|---|---|---|---|---|---|
| Object surface | ∞ | | | | |
| 1 | 135.16250 | 1.50000 | 1.71736 | 29.5 | 22.398 |
| 2 | 72.11820 | 4.36010 | 1.59349 | 67.0 | 21.857 |
| 3 | 790.20610 | 0.20000 | | | 21.643 |
| 4 | 50.28130 | 4.40750 | 1.61800 | 63.4 | 20.614 |
| 5 | 162.92050 | variable | | | 20.220 |
| 6 | 96.45270 | 0.90000 | 1.88300 | 40.8 | 11.915 |
| 7 | 11.11750 | 4.77320 | | | 9.260 |
| 8* | −396.79630 | 2.00000 | 1.51760 | 63.5 | 8.870 |
| 9* | 175.07390 | 4.80450 | | | 8.508 |
| 10 | −12.24460 | 0.75000 | 1.59387 | 66.9 | 7.986 |
| 11 | −23.61010 | 0.20000 | | | 8.306 |
| 12 | −176.40500 | 2.00630 | 1.92286 | 20.9 | 8.324 |
| 13 | −33.62740 | variable | | | 8.421 |
| 14 (diaphragm) | ∞ | 1.53080 | | | CIR |
| 15* | 18.08250 | 2.76550 | 1.68893 | 31.1 | 7.930 |
| 16* | 131.52500 | 4.08410 | | | 7.875 |
| 17 | 36.49880 | 4.20000 | 1.57658 | 42.5 | 7.626 |
| 18 | −20.85700 | 0.50000 | | | 7.440 |
| 19 | −31.14780 | 0.70000 | 1.99195 | 26.6 | 6.978 |
| 20 | 13.89760 | 4.99570 | 1.49700 | 81.6 | 6.748 |
| 21 | −28.68020 | 0.40000 | | | 6.975 |
| 22* | 29.47400 | 3.10000 | 1.58699 | 59.5 | 7.018 |
| 23* | −52.26740 | variable | | | 6.974 |
| 24* | −289.06210 | 1.00000 | 1.58699 | 59.5 | 6.178 |
| 25* | 21.45410 | variable | | | 6.188 |
| 26 | 29.83220 | 1.76670 | 1.84666 | 23.8 | 8.874 |

TABLE 10-continued (surface data)
Surface data

| Surface number | r | d | nd | vd | Effective diameter |
|---|---|---|---|---|---|
| 27 | 51.29650 | variable | | | 8.822 |
| 28 | ∞ | 4.20000 | 1.51680 | 64.2 | |
| 29 | ∞ | 1.00000 | | | |
| 30 | ∞ | BF | | | |
| Image surface | ∞ | | | | |

TABLE 11

(aspherica data)

Eighth surface

K = 0.00000E+00, A4 = 1.00075E−04, A6 = 2.67945E−07,
A8 = −1.50094E−08 A10 = 3.65562E−10, A12 = −3.87661E−12,
A14 = 1.83152E−14

Ninth surface

K = 0.00000E+00, A4 = 3.36259E−05, A6 = −3.17271E−07,
A8 = −2.07768E−09 A10 = 1.71320E−11, A12 = 0.00000E+00,
A14 = 0.00000E+00

Fifteenth surface

K = 0.00000E+00, A4 = 1.69020E−05, AG = 1.00433E−07,
A8 = 5.21866E−09 A10 = −9.78881E−11, A12 = 1.45031E−12,
A14 = −3.64471E−15

Sixteenth surface

K = 0.00000E+00, A4 = 5.59440E−05, A6 = 2.34295E−07,
A8 = 3.16770E−09 A10 = −9.31279E−12, A12 = 2.53688E−13,
A14 = 4.34360E−15

Twenty-second surface

K = 4.53865E+00, A4 = −5.72496E−05, A6 = −8.58523E−07,
A8 = 7.90840E−09 A10 = −1.77922E−10, A12 = 3.82054E−13,
A14 = 0.00000E+00

Twenty-third surface

K = 0.00000E+00, A4 = −2.61556E−05, A6 = −8.63483E−07,
A8 = 1.09617E−08 A10 = −1.91537E−10, A12 = 5.16628E−13,
A14 = 0.00000E+00

Twenty-fourth surface

K = 0.00000E+00, A4 = 1.86067E−04, A6 = −4.82396E−06,
A8 = 7.41794E−08 A10 = −5.13206E−10, A12 = 0.00000E+00,
A14 = 0.00000E+00

Twenty-fifth surface

K = 0.00000E+00, A4 = 1.94211E−04, A6 = −4.84034E−06,
A8 = 7.21369E−08 A10 = −5.09876E−10, A12 = 0.00000E+00,
A14 = 0.00000E+00

(Various Pieces of Data in Infinity Focusing State)

TABLE 12A (various pieces of data)
Zoom ratio 4.63376

| | Wide angle | Intermediate | Telephoto |
|---|---|---|---|
| Focal distance | 12.4683 | 26.8395 | 57.7752 |
| F number | 2.92739 | 3.65906 | 4.14030 |
| View angle | 41.7734 | 21.8572 | 10.5331 |
| Imaged height | 10.0000 | 10.8150 | 10.8150 |
| Lens total length | 105.0236 | 112.5104 | 140.8015 |
| BF | 0.01932 | 0.03546 | −0.05735 |
| Diaphragm diameter CIR | 6.6650 | 6.6650 | 7.2030 |
| d5 | 0.5000 | 13.3360 | 33.3988 |
| d13 | 25.1558 | 7.8469 | 0.9692 |
| d23 | 3.1697 | 3.7055 | 3.1697 |
| d25 | 8.2922 | 6.8974 | 13.8634 |
| d27 | 11.7422 | 24.5447 | 33.3133 |
| Entrance pupil position | 20.9289 | 40.3653 | 96.7328 |
| Exit pupil position | −51.4321 | −61.7674 | −85.3680 |
| Front-side principal point position | 30.3757 | 55.5491 | 115.3807 |
| Rear-side principal point position | 92.5553 | 85.6708 | 83.0262 |

TABLE 12B (single lens data)

| Lens | Start surface | Focal distance |
|---|---|---|
| 1 | 1 | −217.6988 |
| 2 | 2 | 133.4170 |
| 3 | 4 | 115.9479 |
| 4 | 6 | −14.3016 |
| 5 | 8 | −234.4128 |
| 6 | 10 | −43.9108 |
| 7 | 12 | 44.7187 |
| 8 | 15 | 30.1313 |
| 9 | 17 | 23.6528 |
| 10 | 19 | −9.6135 |
| 11 | 20 | 19.5993 |
| 12 | 22 | 32.5638 |
| 13 | 24 | −33.9838 |
| 14 | 26 | 81.1443 |

TABLE 12C (zoom lens group data)

| Group | Start surface | Focal distance | Lens configuration length | Front-side principal point position | Rear-side principal point position |
|---|---|---|---|---|---|
| 1 | 1 | 87.85887 | 10.46760 | 1.60854 | 5.56398 |
| 2 | 6 | −14.25269 | 15.43400 | −0.05210 | 0.91085 |
| 3 | 14 | 21.11225 | 22.27610 | 9.73062 | 10.99134 |
| 4 | 24 | −33.98384 | 1.00000 | 0.58589 | 0.95652 |
| 5 | 26 | 81.14431 | 1.76670 | −1.28132 | −0.43652 |

TABLE 12D (zoom lens group magnification)

| Group | Start surface | Wide angle | Intermediate | Telephoto |
|---|---|---|---|---|
| 1 | 1 | 0.00000 | 0.00000 | 0.00000 |
| 2 | 6 | −0.20882 | −0.25718 | −0.40312 |
| 3 | 14 | −0.46374 | −0.73036 | −0.87570 |
| 4 | 24 | 1.87535 | 2.60848 | 3.60613 |
| 5 | 26 | 0.78145 | 0.62348 | 0.51656 |

Fifth Numerical Example

A fifth numerical example of the imaging optical system corresponding to the fifth exemplary embodiment in FIG. 13 will be described below. Specifically, as the fifth numerical example, the surface data is indicated in (Table 13), the aspherical data is indicated in (Table 14), and various pieces of data in the infinity focusing state are indicated in (Table 15A) to (Table 15D).

TABLE 13

(surface data)
Surface data

| Surface number | r | d | nd | vd | Effective diameter |
|---|---|---|---|---|---|
| Object surface | ∞ | | | | |
| 1 | 54.68100 | 1.50000 | 1.76182 | 26.6 | 24.616 |
| 2 | 32.82140 | 9.36600 | 1.63658 | 46.6 | 22.508 |
| 3 | 580.36840 | variable | | | 22.141 |
| 4 | 105.08370 | 0.90000 | 1.76416 | 46.6 | 15.942 |
| 5 | 12.18440 | 5.70200 | | | 10.946 |
| 6* | 178.03120 | 2.00000 | 1.58699 | 59.5 | 10.803 |
| 7* | 72.78390 | 6.01450 | | | 10.200 |
| 8 | −15.79720 | 0.75000 | 1.55010 | 72.3 | 9.566 |
| 9 | −38.36620 | 0.20000 | | | 9.720 |
| 10 | 246.39640 | 1.98350 | 1.92501 | 20.5 | 9.628 |
| 11 | −70.24510 | variable | | | 9.646 |
| 12 (diaphragm) | ∞ | 0.82080 | | | 6.921 |
| 13* | 17.20220 | 2.73740 | 1.68590 | 38.3 | 7.998 |
| 14* | 79.25880 | 3.13140 | | | 7.827 |
| 15 | 33.46240 | 4.20000 | 1.57668 | 40.2 | 7.923 |
| 16 | −22.40720 | 0.50000 | | | 7.793 |
| 17 | −33.16650 | 0.70000 | 1.99659 | 29.4 | 7.401 |
| 18 | 14.35710 | 5.09370 | 1.49700 | 81.6 | 7.218 |
| 19 | −26.38940 | 0.40000 | | | 7.484 |
| 20* | 31.88940 | 3.10000 | 1.56798 | 62.2 | 7.586 |
| 21* | −46.70960 | variable | | | 7.602 |
| 22* | 550.04530 | 1.00000 | 1.64062 | 58.6 | 5.920 |
| 23* | 18.60810 | variable | | | 6.027 |
| 24 | 24.75620 | 1.77990 | 1.60713 | 34.7 | 7.551 |
| 25 | 73.48980 | variable | | | 7.572 |
| 26 | −40.51080 | 1.50000 | 1.72916 | 54.7 | 9.200 |
| 27 | −82.77720 | 11.70000 | | | 9.511 |
| 28 | ∞ | 4.20000 | 1.51680 | 64.2 | |
| 29 | ∞ | 1.00000 | | | |
| 30 | ∞ | BF | | | |
| Image Plane | ∞ | | | | |

TABLE 14

(aspherical data)

Surface 6

K = 0.00000E+00, A4 = 9.03227E−05, A6 = 2.37974E−07,
A8 = −9.40223E−09 A10 = 1.59850E−10, A12 = −1.17710E−12,
A14 = 3.76057E−15

Surface 7

K = 0.00000E+00, A4 = 6.41410E−05, A6 = −1.45091E−07,
A8 = −5.10014E−10 A10 = 8.20552E−12, A12 = 0.00000E+00,
A14 = 0.00000E+00

Thirteenth surface

K = 0.00000E+00, A4 = 2.00288E−05, A6 = 1.02099E−07,
A8 = 5.54625E−09 A10 = −1.03623E−10, A12 = 1.28036E−12,
A14 = −5.36079E−15

Fourteenth surface

K = 0.00000E+00, A4 = 6.33712E−05, A6 = 2.70325E−07,
A8 = 2.75300E−09 A10 = −1.47997E−11, A12 = 1.73066E−13,
A14 = 1.74151E−16

Twentieth surface

K = 4.53865E+00, A4 = −5.87475E−05, A6 = −7.42444E−07,
A8 = 8.86640E−09 A10 = −1.29300E−10, A12 = −1.91561E−13,
A14 = 0.00000E+00

Twenty-first surface

K = 0.00000E+00, A4 = −3.23199E−05, A6 = −7.64616E−07,
A8 = 1.41535E−08 A10 = −2.05627E−10, A12 = 3.91779E−13,
A14 = 0.00000E+00

TABLE 14-continued (aspherical data)

Twenty-second surface

K = 0.00000E+00, A4 = 1.95149E−04, A6 = −4.77097E−06,
A8 = 7.13337E−08 A10 = −5.05341E−10, A12 = 0.00000E+00,
A14 = 0.00000E+00

Twenty-third surface

K = 0.00000E+00, A4 = 2.04564E−04, A6 = −4.76772E−06,
A8 = 6.63174E−08 A10 = −4.66752E−10, A12 = 0.00000E+00,
A14 = 0.00000E+00

(Various Pieces of Data in Infinity Focusing State)

TABLE 15A

Zoom ratio 4.63447

| | Wide angle | Intermediate | Telephoto |
|---|---|---|---|
| Focal distance | 12.4680 | 26.8474 | 57.7825 |
| F number | 2.92725 | 3.57203 | 4.14033 |
| View angle | 41.6249 | 21.6929 | 10.3795 |
| Imaged height | 9.9600 | 10.8150 | 10.8150 |
| Lens total length | 111.6531 | 114.4265 | 139.5001 |
| BF | 0.00020 | 0.04282 | −0.01968 |
| Diaphragm diameter CIR | 6.9210 | 6.9210 | 7.3140 |
| d3 | 0.5000 | 15.3503 | 37.7357 |
| d11 | 31.8886 | 10.7749 | 1.6792 |
| d21 | 3.0172 | 5.5567 | 5.0638 |
| d23 | 3.5057 | 5.2825 | 6.6779 |
| d25 | 2.4622 | 7.1401 | 18.0840 |
| Entrance pupil position | 24.7084 | 47.6398 | 107.1162 |
| Exit pupil position | −39.6165 | −45.4085 | −52.4469 |
| Front-side principal point position | 33.2526 | 58.6288 | 101.2139 |
| Rear-side principal point position | 99.1851 | 87.5791 | 81.7176 |

TABLE 15B single lens data

| Lens | Start surface | Focal distance |
|---|---|---|
| 1 | 1 | −111.0660 |
| 2 | 2 | 54.2879 |
| 3 | 4 | −18.1120 |
| 4 | 6 | −211.2302 |
| 5 | 8 | −49.4003 |
| 6 | 10 | 59.2714 |
| 7 | 13 | 31.4670 |
| 8 | 15 | 23.9302 |
| 9 | 17 | −9.9807 |
| 10 | 18 | 19.5192 |
| 11 | 20 | 33.8494 |
| 12 | 22 | −30.0864 |
| 13 | 24 | 60.6521 |
| 14 | 26 | −110.4617 |

TABLE 15C (zoom lens group data)

| Group | Start surface | Focal distance | Lens configuration length | Front-side principal point position | Rear-side principal point position |
|---|---|---|---|---|---|
| 1 | 1 | 109.38949 | 10.86600 | −1.14641 | 3.20698 |
| 2 | 4 | −15.43257 | 17.55000 | 1.19226 | 3.35725 |
| 3 | 12 | 20.61438 | 20.68330 | 8.59944 | 10.31336 |

TABLE 15C-continued (zoom lens group data)

| Group | Start surface | Focal distance | Lens configuration length | Front-side principal point position | Rear-side principal point position |
|---|---|---|---|---|---|
| 4 | 22 | −30.08638 | 1.00000 | 0.63133 | 1.02136 |
| 5 | 24 | 60.65213 | 1.77990 | −0.55494 | 0.13253 |
| 6 | 26 | −110.46172 | 17.40000 | −0.84407 | 1.20628 |

TABLE 15D (zoom lens group magnification)

| Group | Start surface | Wide angle | Intermediate | Telephoto |
|---|---|---|---|---|
| 1 | 1 | 0.00000 | 0.00000 | 0.00000 |
| 2 | 4 | −0.18241 | −0.22124 | −0.32579 |
| 3 | 12 | −0.39405 | −0.64826 | −0.84772 |
| 4 | 22 | 1.95781 | 2.37527 | 3.73197 |
| 5 | 24 | 0.70086 | 0.62321 | 0.44354 |
| 6 | 26 | 1.15565 | 1.15604 | 1.15548 |

Sixth Numerical Example

A sixth numerical example of the imaging optical system corresponding to the sixth exemplary embodiment in FIG. 16 will be described below. Specifically, as the sixth numerical example, the surface data is indicated in (Table 16), the aspherical data is indicated in (Table 17), and various pieces of data in the infinity focusing state are indicated in (Table 18A) to (Table 18D).

TABLE 16

(surface data)

| Surface number | r | d | nd | vd | Effective diameter |
|---|---|---|---|---|---|
| Object surface | ∞ | | | | |
| 1 | 24.04020 | 1.50000 | 1.77915 | 48.4 | 15.226 |
| 2 | 13.10020 | 7.59700 | | | 11.873 |
| 3* | 100.00000 | 2.00000 | 1.49700 | 81.5 | 11.293 |
| 4* | 22.56320 | 9.26460 | | | 10.078 |
| 5 | −12.91350 | 0.50000 | 1.62559 | 57.5 | 8.240 |
| 6 | −24.38080 | 0.20000 | | | 8.437 |
| 7 | −183.97510 | 1.75010 | 1.93167 | 21.6 | 8.332 |
| 8 | −44.54820 | variable | | | 8.400 |
| 9 (diaphragm) | ∞ | 2.30050 | | | 7.953 |
| 10* | 18.47360 | 4.67390 | 1.60853 | 51.4 | 9.206 |
| 11* | 2005.60030 | 4.42840 | | | 9.022 |
| 12 | 43.00800 | 4.20000 | 1.48068 | 78.9 | 8.747 |
| 13 | −26.68600 | 0.50000 | | | 8.574 |
| 14 | −102.25970 | 0.70000 | 1.89445 | 34.9 | 8.047 |
| 15 | 12.80000 | 5.19980 | 1.50728 | 78.4 | 7.599 |
| 16 | −58.37020 | 0.40000 | | | 7.652 |
| 17* | 39.70760 | 3.00650 | 1.54410 | 56.1 | 7.611 |
| 18* | −50.38080 | variable | | | 7.609 |
| 19 | 62.15800 | 1.00000 | 1.54410 | 56.1 | 6.529 |
| 20 | 18.01200 | variable | | | 6.497 |
| 21 | 18.93690 | 1.36790 | 1.74855 | 25.0 | 7.864 |
| 22 | 21.69990 | variable | | | 7.786 |
| 23 | ∞ | 4.20000 | 1.51680 | 64.2 | |
| 24 | ∞ | 1.00000 | | | |
| 25 | ∞ | BF | | | |
| Image Plane | ∞ | | | | |

TABLE 17

(aspherical data)

Third surface

K = 0.00000E+00, A4 = 3.70366E−05, A6 = 2.08955E−07,
A8 = −3.29468E−10 A10 = 3.14359E−11, A12 = −3.42505E−13,
A14 = 1.58879E−15

Fourth surface

K = 0.00000E+00, A4 = −1.26178E−05, A6 = 1.08059E−07,
A8 = 8.50520E−10 A10 = −1.10182E−12, A12 = 0.00000E+00,
A14 = 0.00000E+00

Tenth surface

K = 0.00000E+00, A4 = 6.15568E−06, A6 = −7.84848E−08,
A8 = 5.88884E−09 A10 = −9.45609E−11, A12 = 7.64206E−13,
A14 = −2.14344E−15

Twelfth surface

K = 0.00000E+00, A4 = 5.06873E−05, A6 = 6.17630E−09,
A8 = 4.65143E−09 A10 = −6.47121E−11, A12 = 4.40234E−13,
A14 = −6.15734E−16

Seventeenth surface

K = 4.53865E+00, A4 = −3.67533E−05, A6 = −4.36894E−07,
A8 = −2.90366E−09 A10 = −6.32751E−13, A12 = −1.66994E−12,
A14 = 0.00000E+00

Eighteenth surface

K = 0.00000E+00, A4 = −2.30362E−05, A6 = −6.61346E−07,
A8 = 7.28056E−09 A10 = −2.15522E−10, A12 = 3.46336E−13,
A14 = 0.00000E+00

(Various Pieces of Data in Infinity Focusing State)

TABLE 18A

Zoom ratio 2.80721

| | Wide angle | Intermediate | Telephoto |
|---|---|---|---|
| Focal distance | 12.4680 | 20.8895 | 35.0003 |
| F number | 2.43181 | 3.03603 | 4.00451 |
| View angle | 41.6257 | 28.3677 | 17.3592 |
| Imaged height | 9.9600 | 10.8150 | 10.8150 |
| Lens total length | 101.3887 | 97.0533 | 105.1587 |
| BF | 0.00413 | 0.03424 | −0.04954 |
| Diaphragm diameter CIR | 7.9530 | 7.9530 | 8.0260 |
| d8 | 24.5094 | 9.4496 | 0.1994 |
| d18 | 2.7052 | 2.7052 | 4.1289 |
| d20 | 5.9185 | 4.1992 | 4.7952 |
| d22 | 12.4628 | 24.8764 | 40.2960 |
| Entrance pupil position | 18.3838 | 16.2111 | 13.8915 |
| Exit pupil position | −46.3087 | −56.4657 | −73.2462 |
| Front-side principal point position | 27.4953 | 29.3772 | 32.1558 |
| Rear-side principal point position | 88.9207 | 76.1638 | 70.1584 |

TABLE 18B (single lens data)

| Lens | Start surface | Focal distance |
|---|---|---|
| 1 | 1 | −39.3070 |
| 2 | 3 | −59.1341 |
| 3 | 5 | −44.6368 |
| 4 | 7 | 62.7134 |
| 5 | 10 | 30.6127 |
| 6 | 12 | 34.9429 |
| 7 | 14 | −12.6821 |
| 8 | 15 | 21.2161 |
| 9 | 17 | 41.2980 |
| 10 | 19 | −46.9861 |
| 11 | 21 | 163.9386 |

TABLE 18C (zoom lens group data)

| Group | Start surface | Focal distance | Lens configuration length | Front-side principal point position | Rear-side principal point position |
|---|---|---|---|---|---|
| 1 | 1 | −18.66741 | 22.81170 | 5.80338 | 8.73939 |
| 2 | 9 | 22.42767 | 25.40910 | 10.38371 | 12.09858 |
| 3 | 19 | −46.98609 | 1.00000 | 0.91920 | 1.26636 |
| 4 | 21 | 163.93863 | 1.36790 | −4.42407 | −3.70166 |

TABLE 18D (zoom lens group magnification)

| Group | Start surface | Wide angle | Intermediate | Telephoto |
|---|---|---|---|---|
| 1 | 1 | 0.00000 | 0.00000 | 0.00000 |
| 2 | 9 | −0.49613 | −0.74398 | −1.07334 |
| 3 | 19 | 1.54731 | 1.89403 | 2.49336 |
| 4 | 91 | 0.87004 | 0.79414 | 0.70059 |

(Values Corresponding to Conditions)

As described above, the imaging optical system of any one of the first to sixth exemplary embodiments is specifically implemented in the first to sixth numerical examples.

(Table 1) illustrates values corresponding to the conditions (1) to (15) in each numerical example.

TABLE 1

| Condition | First numerical example | Second numerical example | Third numerical example | Fourth numerical example | Fifth numerical example | Sixth numerical example |
|---|---|---|---|---|---|---|
| (1) | 3.4830 | 3.445 | 2.980 | 2.417 | 2.524 | 2.455 |
| (2) | 0.837 | 0.871 | 0.906 | 0.993 | 0.948 | 0.820 |
| (3) | 1.80569 | 1.61014 | 1.5176 | 1.5176 | 1.58699 | 1.497 |
| (4) | 40.5 | 51.7 | 63.5 | 63.5 | 59.5 | 81.5 |
| (5) | 0.157 | 0.185 | 0.237 | 0.197 | 0.158 | 0.192 |
| (6) | 1.609 | 1.642 | 1.681 | 1.693 | 1.653 | 1.799 |
| (7) | 1.80569 | 1.80569 | 1.80569 | 1.58699 | 1.64062 | 1.5441 |
| (8) | 40.5 | 40.5 | 40.5 | 59.5 | 58.6 | 56.1 |
| (9) | 2.463 | 2.564 | 2.649 | 2.726 | 2.413 | 3.769 |
| (10) | 1.80420 | 1.81139 | 1.85011 | 1.88300 | 1.76416 | 1.77915 |
| (11) | 46.5 | 43.9 | 42.1 | 40.8 | 46.6 | 48.4 |
| (12) | 1.019 | 1.025 | 1.029 | 1.018 | 1.056 | 1.450 |
| (13) | 0.369 | 0.376 | 0.392 | 0.416 | 0.333 | 0.216 |
| (14) | 1.402 | 1.203 | 1.076 | 0.945 | 1.147 | 1.302 |
| (15) | 0.082 | 0.075 | 0.048 | 0.048 | 0.129 | −0.007 |

As illustrated in (Table 1), it is shown that the imaging optical system implemented in any one of the first to sixth numerical examples satisfies the conditions (1) to (15).

Therefore, the compact, high-magnification imaging optical system having good imaging performance in the whole zoom range, and the imaging device and camera system provided with the imaging optical system can be constructed.

Further, since the above exemplary embodiments illustrate the technique in the present disclosure, various modifications, substitutions, additions and omissions can be made within the scope of claims and the scope of equivalents thereof.

INDUSTRIAL APPLICABILITY

For example, the imaging optical system of the present disclosure can be applied to a digital still camera, an interchangeable lens system digital camera, a digital video camera, a camera of a portable telephone, a camera of a personal digital assistance (PDA), a surveillance camera of a surveillance system, a Web camera, and an in-vehicle camera. In particular, the present disclosure is suitable for an imaging optical system, such as a digital still camera and a digital video camera, in which high image quality is required.

REFERENCE MARKS IN THE DRAWINGS

G1: first lens group
G2: second lens group
G3: third lens group
G4: fourth lens group
G5: fifth lens group
G6: sixth lens group
Gf, Gm, Gp: lens group
L1: first lens element
L2: second lens element
L3: third lens element
L4: fourth lens element
L5: fifth lens element
L6: sixth lens element
L7: seventh lens element
L: eighth lens element
L9: ninth lens element
L10: tenth lens element
L11: eleventh lens element
L12: twelfth lens element
L13: thirteenth lens element
L14: fourteenth lens element
LGmF1, LGmF2, LGmR1, LGmR2, LGmR3: lens element
LGpF1, LGpF2, LGpR1, LGpR2, LGpR3: lens element
A: aperture diaphragm
CG: parallel plate
S: image plane
100: imaging device
101: imaging optical system
102: imaging element
104: casing
200: camera system
201: camera body
202: imaging element
203: monitor 204: camera mount
205: finder
300: interchangeable lens device
302: lens barrel
304: lens mount
311: first group frame
312: second group frame
313: third group frame
313a: third group front frame
313b: OIS base frame
313c: OIS frame
314: fourth group frame
315: fifth group frame
320: cam tube
323: eccentric pin
325: rectilinear fixing frame
326: cam pin
327, 328: actuator
329: shaft

The invention claimed is:

1. An imaging optical system comprising a plurality of lens groups, wherein a distance between the lens groups changes during zooming, wherein the plurality of lens groups of the imaging optical system includes:
a lens group Gm having negative power; and
a lens group Gf having power,
wherein, of any lens group having negative power, the lens group Gm is positioned closest to an object,
wherein the lens group Gm includes, in the order from an object side toward an image side,
a lens element LGmF1 having the negative power;
a lens element LGmF2 having the negative power, both surfaces of the lens element LGmF2 each having an aspherical shape, and
at least two additional lens elements having power,
and wherein the lens group Gf moves in an optical axis direction during focusing from an infinity focusing state to a proximity focusing state.

2. The imaging optical system according to claim 1, wherein
the lens element LGmF1 is a lens element having a strongest power among lens elements located on the object side with respect to an aperture diaphragm, in order from the object side toward the image side.

3. The imaging optical system according to claim 1, wherein assuming that t_L2F2 (70%) is a thickness of a lens element having 70% of a height from an effective diameter of an object-side surface of the lens element LGmF2, which is a second lens element from the object side of the lens group Gm, and that ct LGmF2 is a center thickness of the lens element LGmF2, which is the second lens element from the object side of the lens group Gm, a condition (12) below is satisfied $$0.8 < t\_LGmF2(70\%)/ct\_LGmF2 < 1.5 \tag{12}$$

4. The imaging optical system according to claim 1, wherein a lens element LGmR2, which is a second lens element from the image side of the lens group Gm, has a meniscus shape having a convex surface on the image side.

5. The imaging optical system according to claim 1, wherein the lens group Gm includes the lens element LGmF1 having the negative power, and the lens element LGmF2 having the negative power, in order from the object side toward the image side, and wherein the at least two additional lens elements include a lens element LGmR1 having positive power, and a lens element LGmR2 having negative power, in order from the image side toward the object side.

6. The imaging optical system according to claim 1, wherein assuming that THGm_A is an air distance between the lens element LGmF1, which is a first lens element from the object side of the lens group Gm, and the lens element LGmF2, which is a second lens element from the object side of the lens group Gm, and that THGm_B is an air distance between a lens element LGmR2, which is a second lens element from the image side of the lens group Gm, and a lens element LGmR3, which is a third lens element from the image side of the lens group Gm, a condition (2) below is satisfied $$0.5 < THGm\_A/THGm\_B < 1.5 \tag{2}$$

7. The imaging optical system according to claim 1, wherein assuming that nd LGmF1 is a refractive index of the lens element LGmF1 which is closest to the object side of the lens group Gm, and that vd LGmF1 is an Abbe number of the lens element LGmF1 which is closest to the object side of the lens group Gm, conditions (10), (11) below are satisfied $$1.75 < nd\_LGmF1 \tag{10}$$

$$25 < vd\_LGmF1 \tag{11}$$

8. The imaging optical system according to claim 1, wherein assuming that nd_LGmF2 is a refractive index of the lens element LGmF2, which is a second lens element from the object side of the lens group Gm, and that vd_LGmF2 is an Abbe number of the lens element LGmF2, which is the second lens element from the object side of the lens group Gm, conditions (3), (4) below are satisfied $$1.45 < nd\_LGmF2 \tag{3}$$

$$35 < vd\_LGmF2 \tag{4}$$

9. The imaging optical system according to claim 1, further comprising a lens group Gp having positive power on the image side of the lens group Gm,
wherein the lens group Gp includes a lens element LGpF1 having the positive power, and a lens element LGpF2 having the positive power, in order from the object side toward the image side, and includes an aperture diaphragm provided on any one of the object side and the image side of the lens element LGpF1.

10. The imaging optical system according to claim 9, wherein the lens group Gp includes a lens element LGpR1 having the positive power, a lens element LGpR2 having the positive power, and a lens element LGpR3 having negative power, in order from the image side toward the object side.

11. The imaging optical system according to claim 1, further comprising a lens group Gp having positive power on the image side of the lens group Gm,
wherein assuming that THGp_A is an air distance between a lens element LGpF1, which is a first lens element from the object side of the lens group Gp, and a lens element LGpF2, which is a second lens element from the object side of the lens group Gp, and that THGp_B is a center distance between a lens element which is closest to the object side of the lens group Gp and a lens element which is closest to the image side of the lens group Gp, a condition (5) below is satisfied $$0.05 < THGp\_A/THGp\_B < 0.5 \tag{5}$$

12. The imaging optical system according to claim 9, wherein the lens group Gf has negative power and is provided on the image side of the lens element of the lens group Gp which is closest to the image side, wherein assuming that THGp_A is an air distance between the lens element LGpF1 and the lens element LGpF2, and that THGp_B is a center distance between a lens element of the lens group Gp which is closest to the object side and the lens element of the lens group Gp which is closest to the image side, a condition (5) below is satisfied $$0.05 < THGp\_A/THGp\_B < 0.5 \qquad (5).$$

13. The imaging optical system according to claim 1, further comprising a lens group Gp having positive power on the image side of the lens group Gm, wherein at least the lens group Gm and the lens group Gp move in an optical axis direction such that a distance between the lens group Gm and the lens group Gp changes during zooming from a wide-angle end to a telephoto end in imaging, and assuming that f_LGpF1 is a focal distance of a lens element LGpF1 of the lens group Gp which is closest to the object side, and that fw is a focal distance at the wide-angle end, a condition (1) below is satisfied $$0.5 < f\_LGpF1/fw < 15 \qquad (1).$$

14. The imaging optical system according to claim 1, further comprising a lens group Gp having positive power on the image side of the lens group Gm, wherein at least the lens group Gm and the lens group Gp move in an optical axis direction such that a distance between the lens group Gm and the lens group Gp changes during zooming from a wide-angle end to a telephoto end in imaging, and assuming that f Gp is a focal distance of the lens group Gp, and that fw is a focal distance of a whole system at the wide-angle end, a condition (6) below is satisfied $$1.0 < f\_Gp/fw < 7 \qquad (6).$$

15. The imaging optical system according to claim 1, further comprising a lens group Gp having positive power on the image side of the lens group Gm, wherein the lens group Gf has negative power and is provided on the image side of the lens group Gp, wherein assuming that nd_LGf is a refractive index of a lens element constituting the lens group Gf, and that vd_LGf is an Abbe number of a lens element constituting the lens group Gf, conditions (7), (8) below are satisfied $$1.50 < nd\_LGf \qquad (7)$$

$$35 < vd\_LGf \qquad (8).$$

16. The imaging optical system according to claim 1, further comprising a lens group Gp having positive power on the image side of the lens group Gm, wherein the lens group Gf has negative power and is provided on the image side of the lens group Gp, wherein at least the lens group Gm and the lens group Gp move in an optical axis direction such that a distance between the lens group Gm and the lens group Gp changes during zooming from a wide-angle end to a telephoto end in imaging, and assuming that f Gf is a focal distance of the lens group Gf, and that fw is a focal distance of a whole system at the wide-angle end, a condition (9) below is satisfied $$1.5 < |f\_Gf|/fw < 5 \qquad (9).$$

17. A camera system comprising:

an interchangeable lens device including the imaging optical system according to claim 1; and a camera body that is detachably connected to the interchangeable lens device with a camera mount interposed between the camera body and the interchangeable lens device, the camera body including an imaging element that receives an optical image formed by the imaging optical system and converts the optical image into an electric image signal, wherein the interchangeable lens device forms the optical image on the imaging element.

18. An imaging device that converts an optical image of an object into an electric image signal and performs at least one of display and storage of the converted image signal, the imaging device comprising:

the imaging optical system according to claim 1 that forms the optical image of the object; and an imaging element that converts the optical image formed by the imaging optical system into the electric image signal.

19. The imaging optical system according to claim 1, wherein assuming that ct_LGmF2 is a center thickness of the lens element LGmF2, which is a second lens element from the object side of the lens group Gm, and that THGm_B is an air distance between a lens element LGmR2, which is a second lens element from the image side of the lens group Gm, and a lens element LGmR3, which is a third lens element from the image side of the lens group Gm, a condition (13) below is satisfied $$0.1 < ct\_LGmF2/THGm\_B < 1.2 \qquad (13).$$

20. The imaging optical system according to claim 1, wherein assuming that R2_LGmF1 is a radius of curvature on the image side of the lens element LGmF1, the lens element LGmF1 being located closest to the object of the lens group Gm, and that R1_LGmF2 is a radius of curvature on the object side of the lens element LGmF2, which is a second lens element from the object side of the lens group Gm, a condition (14) below is satisfied $$0.1 < (R1\_LGmF2 + R2\_LGmF1)/(R1\_LGmF2 - R2\_LGmF1) < 4.0 \qquad (14).$$

21. The imaging optical system according to claim 4, wherein assuming that R2_LGmF1 is a radius of curvature on the image side of the lens element LGmF1, and R1_LGmR2 is a radius of curvature on the image side of the lens element LGmR2, a condition (15) below is satisfied $$-0.50 < (R1\_LGmR2 + R2\_LGmF1)/(R1\_LGmR2 - R2\_LGmF1) < 1.00 \qquad (15).$$

* * * * *